(12) United States Patent
Durrant

(10) Patent No.: US 12,552,876 B2
(45) Date of Patent: Feb. 17, 2026

(54) ANTI-FUCOSYL-GM1 ANTIBODIES

(71) Applicant: Scancell Limited, Oxford (GB)

(72) Inventor: Linda Gillian Durrant, Oxford (GB)

(73) Assignee: Scancell Limited, Oxford (GB)

( * ) Notice: Subject to any disclaimer, the term of this patent is extended or adjusted under 35 U.S.C. 154(b) by 994 days.

(21) Appl. No.: 17/639,467

(22) PCT Filed: Sep. 2, 2020

(86) PCT No.: PCT/EP2020/074441
§ 371 (c)(1),
(2) Date: Mar. 1, 2022

(87) PCT Pub. No.: WO2021/043810
PCT Pub. Date: Mar. 11, 2021

(65) Prior Publication Data
US 2022/0267466 A1 Aug. 25, 2022

(30) Foreign Application Priority Data
Sep. 3, 2019 (GB) ...................................... 1912657

(51) Int. Cl.
*C07K 16/30* (2006.01)
*C07K 16/28* (2006.01)

(52) U.S. Cl.
CPC .......... *C07K 16/3084* (2013.01); *C07K 16/28* (2013.01); *C07K 2317/24* (2013.01); *C07K 2317/33* (2013.01); *C07K 2317/56* (2013.01); *C07K 2317/92* (2013.01)

(58) Field of Classification Search
None
See application file for complete search history.

(56) References Cited

U.S. PATENT DOCUMENTS

2017/0247466 A1   8/2017  Jackson

FOREIGN PATENT DOCUMENTS

| WO | 9915201 A1 | 4/1999 |
| WO | 2004011476 A1 | 2/2004 |
| WO | 2007067992 A2 | 6/2007 |
| WO | 2016049256 A1 | 3/2016 |

OTHER PUBLICATIONS

Fredman, P., et al., "Binding specificity of monoclonal antibodies to ganglioside, Fuc-GM1", Biochim Biophys Acta, 875(2), Feb. 12, 1986, 316-323.
Kusunoki, S., et al., "Unique localization of fucosyl GM1 in rabbit spinal cord and peripheral nerve: Immunohistochemical study using monoclonal anti-fucosyl GM1 antibody CRD73-6", Biochimica et Biophysica Acta, 1214(1), Aug. 25, 1994, 27-31.
Altschul, S. F. et al., "Basic Local Alignment Search Tool", J. Mol. Biol., 215, 1990, 403-410.
Altschul, S. F. et al., "Gapped BLAST and PSI-BLAST: a new generation of protein database search programs", Nucleic Acids Research, vol. 25, No. 17, 1997, 3389-3402.
Alvarez-Rueda, N. et al., "Binding Activities and Antitumor Properties of a New Mouse/Human Chimeric Antibody Specific for GD2 Ganglioside Antigen", Clin. Cancer Res. 2007, 13(18 Suppl), Sep. 15, 2007, 5613s-5620s.
Ausubel, F. et al., "Short Protocols in Molecular Biology, Third Edition", John Wiley & Sons, New York, Biochemical Education, 24(1), 1996, 1995, 836.
Barbas III, C. et al., "In Vitro Evolution of a Neutralizing Human Antibody to Human Immunodeficiency Virus Type 1 to Enhance Affinity and Broaden Strain Cross-Reactivity", Proc. Natl. Acad. Sci. USA, vol. 91, Medical Sciences, Apr. 1994, 3809-3813.
Brezicka, F. et al., "Immunohistological Detection of Fucosyl-Gm1 Ganglioside in Human Lung Cancer and Normal Tissues with Monoclonal Antibodies", Cancer Research, vol. 49, Mar. 1, 1989, 1300-1305.
Chou, H. et al., "A Mutation in Human CMP-sialic Acid Hydroxylase Occurred After the Homo-Pan Divergence", Proc. Natl. Acad. Sci. USA, vol. 95, Evolution, Sep. 1998, 11751-11756.
Dickler, M. et al., "Immunogenicity of a Fucosyl-GM1-Keyhole Limpet Hemocyanin Conjugate Vaccine in Patients with Small Cell Lung Cancer", Clin. Cancer Res., vol. 5, Oct. 1999, 2773-2779.
Drivsholm, L. et al., "Fucosyl-GM1 in Small-Cell Lung Cancer. A Comparison with the Tumour Marker Neuron-Specific Enolase", Annals of Oncol., vol. 5, 1994, 623-626.
Eppstein, D. et al., "Biological Activity of Liposome-Encapsulated Murine Interferon γ is Mediated by a Cell Membrane Receptor", Proc. Natl. Acad. Sci. USA, vol. 82, Cell Biology, Jun. 1985, 3688-3692.
Gram, H. et al., "In Vitro Selection and Affinity Maturation of Antibodies from a Naive Combinatorial Immunoglobulin Library", Proc. Natl. Acad. Sci. USA, vol. 89, Biochemistry, Apr. 1992, 3576-3580.
Hellstrom, I. et al., "Highly Tumor-Reactive, Internalizing, Mouse Monoclonal Antibodies to Ley-Related Cell Surface Antigens", Cancer Research, vol. 50, Apr. 1, 1990, 2183-2190.
Holliger, P. et al., "Diabodies: small bivalent and bispecific antibody fragments", PNAS USA, 90, 1993, 6444-6448.
Houghton, A. et al., "Mouse Monoclonal IgG3 Antibody Detecting GD3 Ganglioside: A Phase I Trial in Patients with Malignant Melanoma", Proc. Natl. Acad. Sci. USA, vol. 82, Feb. 1985, 1242-1246.

(Continued)

*Primary Examiner* — Ruixiang Li
(74) *Attorney, Agent, or Firm* — Elmore Patent Law Group, P.C.; Mahreen Chaudhry Hoda; Carolyn S. Elmore

(57) ABSTRACT

The present invention relates to specific binding members, such as antibodies and fragments thereof, that are capable of specifically binding fucosyl-GM1 (Fuc-GM1). It also relates to the use of such binding members in medicine and to nucleic acids encoding such binding members, to methods for detecting Fuc-GM1, as well as methods for treating various diseases, including cancer, using anti-Fuc-GM1 antibodies.

Figure 1:
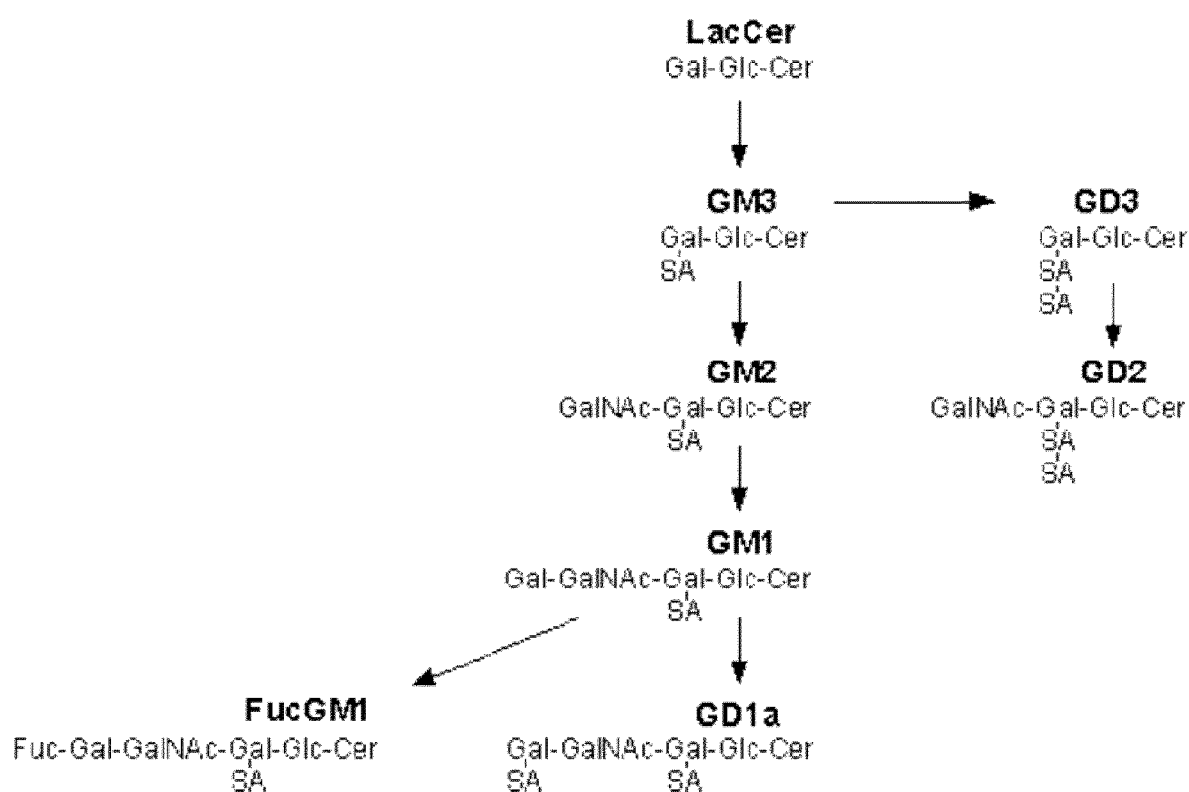

10 Claims, 21 Drawing Sheets
Specification includes a Sequence Listing.

(56) References Cited

OTHER PUBLICATIONS

Huston, J. et al., "Protein Engineering of Antibody Binding Sites: Recovery of Specific Activity in an Anti-Digoxin Single-Chain Fv Analogue Produced in *Escherichia coli*", Proc. Natl. Acad. Sci. USA, vol. 85, Biochemistry, Aug. 1998, 5879-5883.

Hwang, K. et al., "Hepatic Uptake and Degradation of Unilamellar Sphingomyelin/Cholesterol Liposomes: A Kinetic Study", Proc. Natl. Acad. Sci. USA, vol. 77, No. 7, Biophysics, Jul. 1980, 4030-4034.

Irie, R. et al., "Regression of Cutaneous Metastatic Melanoma by Intralesional Injection with Human Monoclonal Antibody to Ganglioside GD2", Proc. Natl. Acad. Sci. USA, vol. 83, Immunology, Nov. 1986, 8694-8698.

Karlin, S. et al., "Applications and statistics for multiple high-scoring segments in molecular sequences", Proc. Natl. Acad. Sci. USA, vol. 90, Jun. 1993, 5873-5877.

Karlin, S. et al., "Methods for Assessing the Statistical Significance of Molecular Sequence Features by Using General Scoring Schemes", Proc. Natl. Acad. Sci. USA, vol. 87, Evolution, Mar. 1990, 2264-2268.

Krug, L. et al., "Vaccination of Patients with Small-Cell Lung Cancer with Synthetic Fucosyl GM-1 Conjugated to Keyhole Limpet Hemocyanin", Clin. Cancer Res., vol. 10, Sep. 15, 2004, 6094-6100.

LeFranc, M. et al., "IMGT, the International ImMunoGeneTics Information System", Nucleic Acids Res., vol. 37, doi:10.1093/nar/gkn838, Oct. 31, 2008, D1006-D1012.

Loo, D. et al., "The Glycotope-Specific RAV12 Monoclonal Antibody Induces Oncosis In Vitro and has Antitumor Activity Against Gastrointestinal Adenocarcinoma Tumor Xenografts In Vivo", Mol. Cancer Ther., 6(3), Correction, 6(5), May 2007, p. 1682, Mar. 2007, 856-865.

Martin-Satue, M. et al., "Enhanced Expression of a(1,3)-Fucosyltransferase Genes Correlates with E-Selectin-Mediated Adhesion and Metastatic Potential of Human Lung Adenocarcinoma Cells", Cancer Research, vol. 58, Apr. 1, 1998, 1544-15550.

Miotti, S. et al., "Level of Anti-Mouse-Antibody Response Induced by Bi-Specific Monoclonal Antibody OC/TR in Ovarian-Carcinoma Patients is Associated with Longer Survival", Int. J. Cancer (Pred. Oncol.), vol. 84, 1998, 62-68.

Myers, E. W. et al., "Approximate Matching of Regular Expressions", Bulletin of Mathematical Biology vol. 51, No. 1, 1989, 5-37.

Nilsson, O. et al., "Detection of a Ganglioside Antigen Associated with Small Cell Lung Carcinomas Using Monoclonal Antibodies Directed Against Fucosyl-GM1", Cancer Res., vol. 46, Mar. 1986, 1403-1407.

Pearson, W. R. et al., "Improved tools for biological sequence comparison", Proc. Natl. Acad. Sci. USA, vol. 85, Apr. 1988, 2444-2448.

Schier, R. et al., "Isolation of Picomolar Affinity Anti-c-erbB-2 Single-chain Fv by Molecular Evolution of the Complementarity Determining Regions in the Center of the Antibody Binding Site", J. Mol. Bio., vol. 263, Aug. 1996, 551-567.

Schroff, R. et al., "Human Anti-Murine Immunoglobulin Responses in Patients Receiving Monoclonal Antibody Therapy", Cancer Res., vol. 45, Feb. 1985, 879-885.

Tokuda, N. et al., "Genetic Mechanisms for the Synthesis of Fucosyl GM1 in Small Cell Lung Cancer Cell Lines", Glycobio., vol. 16, No. 10, Jul. 2006, 916-925.

Torelli, A. et al., "ADVANCE and ADAM: two algorithms for the analysis of global similarity between homologous informational sequences", CABIOS, vol. 10, No. 1, 1994, 3-5.

Traunecker, A. et al., "Bispecific single chain molecules (Janusins) target cytotoxic lymphocytes on HIV infected cells", The EMBO Journal, 10(12), 1991, 3655-3659.

Vangsted, A. et al., "Immunochemical Detection of a Small Cell Lung Cancer-Associated Ganglioside (FucGm1) Antigen in Serum", Cancer res., vol. 51, Jun. 1, 1991, 2879-2884.

Ward, E. et al., "Binding Activities of a Repertoire of Single Immunoglobulin Variable Domains Secreted from *Escherichia coli*", Nature, vol. 341, Oct. 12, 1989, 544-546.

Yandim, M. et al., "Therapeutic Potential of Targeting Ceramide/Glucosylceramide Pathway in Cancer", Cancer Chemother. Pharmacol. (2013), 71, Oct. 17, 2012, 13-20.

Zhang, G. et al., "Suppression of Human Prostate Tumor Growth by a Unique Prostate-Specific Monoclonal Antibody F77 Targeting a Glycolipid Marker", PNAS, vol. 107, No. 2, Jan. 12, 2010, 732-737.

Zhang, S. et al., "Selection of Tumor Antigens as Targets for Immune Attack Using Immunohistochemistry: I. Focus on Gangliosides", Int. J. Cancer, vol. 73, May 5, 1997, 42-49.

Zhong, L. et al., "A Monoclonal Antibody that Induces Neuronal Apoptosis Binds a Metastasis Marker", Downloaded from cancerres.aacrjournals.org on Jun. 9, 2013. © 2001 American Association for Cancer Research.

Figure 2a

FL133_63H

```
<---------------------------- FR1 – IMGT ---------------------------->  _____
 1          5          10         15         20         25         30
 D  V  Q  L  Q  E  S  G  P     D  L  V  K  P  S  Q  S  L  S  L  T  C  T  V  T  G  Y  S  I
gat gtg cag ctt cag gag tca gga cct ... gac ctg gtg aaa cct tct cag tca ctt tca ctc acc tgc act gtc act ggc tac tcc atc __ CDR1 - IMGT _____  <--------------------------FR2 - IMGT --------------------------> _____ CDR2
        35         40         45         50         55         60
 T     S  G  Y  S  W  H  W  I  R  Q  F  P  G  N  K  L  E  W  V  G  Y  I  H  Y  R
acc ... ... ... agt ggt tat agc tgg cac tgg atc cgg cag ttt cca gga aac aaa ctg gaa tgg gtg ggc tac ata cac tac cgt ...

- IMGT _____  <----------------------------------------------- FR3 - IMGT ----------------------------
            65         70         75         80         85         90
      G  N  T  N  Y  N  P  S  L  K     S  R  I  S  I  T  R  D  T  Y  K  N  Q  L  F  L  R
... ... ggt aac act aac tac aac cca tct ctc aaa ... agt cga atc tca atc act cga gac aca tac aag aac cag ctc ttc ctg cgg -------------------------------------------------------->  _____ CDR3 - IMGT _____
         95         100        104
 L  N  S  V  T  T  E  D  T  A  T  Y  Y  C  A  Q  E  P  V  R  N  Y  A  M  D  Y  W  G  Q  G
ttg aat tct gtg act act gag gac aca gcc aca tat tat tgt gca caa gaa cct gtg agg aac tat gct atg gac tac tgg ggt caa gga T  S  V  T  V  S  S  A  T  T  T  A           (SEQ ID NO : 5)
acc tca gtc acc gtc tcc tca gct aca aca aca gcc cc    (SEQ ID NO : 6)
```

Figure 2b

FL133_67H

```
<---------------------------- FR1 – IMGT ---------------------------->  _____
 1          5          10         15         20         25         30
 D  V  Q  L  Q  E  S  G  P     D  L  V  K  P  S  Q  S  L  S  L  T  C  T  V  T  G  Y  S  I
gat gtg cag ctt cag gag tca gga cct ... gac ctg gtg aaa cct tct cag tca ctt tca ctc acc tgc act gtc act ggc tac tcc atc __ CDR1 - IMGT _____  <--------------------------FR2 - IMGT --------------------------> _____ CDR2
        35         40         45         50         55         60
 T     S  G  Y  S  W  H  W  I  R  Q  F  P  G  N  K  L  E  W  V  G  Y  I  H  Y  R
acc ... ... ... agt ggt tat agc tgg cac tgg atc cgg cag ttt cca gga aac aaa ctg gaa tgg gtg ggc tac ata cac tac cgt ...

- IMGT _____  <----------------------------------------------- FR3 - IMGT ----------------------------
            65         70         75         80         85         90
      G  N  T  N  Y  N  P  S  L  K     S  R  I  S  I  T  R  D  T  Y  K  N  Q  F  F  L  Q
... ... ggt aac act aac tac aac cca tct ctc aaa ... agt cga atc tca atc act cga gac aca tac aag aac cag ttc ttc ctg cag -------------------------------------------------------->  _____ CDR3 - IMGT _____
         95         100        104
 L  N  S  V  T  T  E  D  T  A  T  Y  Y  C  A  Q  E  P  V  R  N  Y  A  M  D  Y  W  G  Q
ttg aat tct gtg act act gag gac aca gcc aca tat tat tgt gca caa gaa cct gtg agg aac tat gct atg gac tac tgg ggt caa G  T  S  V  T  V  S  S  A  T  T  T  A  P  S  I  Y  P  L        (SEQ ID NO: 7)
gga acc tca gtc acc gtc tcc tca gct aca aca aca gcc cca tca atc tat cca ctg     (SEQ ID NO: 8)
```

Figure 2c

FL134_33H

```
<-------------------------- FR1 – IMGT -------------------------------->
1         5         10        15        20        25        30
A   V   Q   L   Q   E   S   G   P       D   L   V   K   P   S   Q   S   L   S   L   T   C   T   V   T   G   Y   S   I
gct gtg caa ctt cag gag tca gga cct ... gac ctg gtg aaa cct tct cag tca ctt tca ctc acc tgt act gtc act ggc tac tcc atc __ CDR1 - IMGT _____ <------------------FR2 - IMGT --------------------> _____ CDR2
        35            40              45              50              55              60
T       S   G   Y   S   W   H   W   I   R   Q   F   P   G   N   K   L   E   W   V   G   Y   I   H   Y   R
acc ... ... ... agt ggt tat agc tgg cac tgg atc cgg cag ttt cca gga aac aaa ctg gaa tgg gtg ggc tac ata cac tac cgt ...

- IMGT _____ <------------------------------------------------ FR3 - IMGT ------------------------------
        65              70              75              80              85              90
    G   N   T   N   Y   N   P   S   L   K       S   R   V   S   I   T   R   D   T   Y   K   N   Q   F   F   L   Q
... ... ggt aac act aat tac aac cca tct ctc aaa ... agt cga gtc tca atc act cga gac aca tac aag aac cag ttc ttc cta cag ---------------------------------------------------> _____ CDR3 - IMGT _____
        95              100     104
L   N   S   L   T   T   E   D   T   A   T   Y   Y   C   A   Q   E   P   V   R   N   Y   A   M   D   F   W   G   Q   G
tta aat tct ctg act act gag gac aca gcc aca tat tat tgt gca caa gaa cct gtg agg aac tat gct atg gac ttt tgg ggt caa gga T   S   V   T   V   S   S   A           (SEQ ID NO: 9)
acc tca gtc acc gtc tcc agc gct         (SEQ ID NO: 10)
```

Figure 2d

FL133_63K

```
<-------------------------- FR1 – IMGT -------------------------------->
1         5         10        15        20        25        30
D   I   V   M   S   Q   S   P   A   T   L   S   V   T   P   G   D   R   V   S   L   S   C   R   A   S   Q   S   I
gac att gtg atg agt cag tct cca gcc acc ctg tct gtg act cca gga gat aga gtc tct ctt tcc tgc agg gcc agc cag agt att ...

__ CDR1 - IMGT _____ <------------------FR2 - IMGT --------------------> _____ CDR2
        35            40              45              50              55              60
        G   D   D   L   H   W   Y   Q   Q   K   S   H   E   S   P   R   L   L   I   K   Y   V
... ... ... ... ggc gac gac tta cac tgg tat caa caa aaa tca cat gag tct cca agg ctt ctc atc aaa tat gtt ... ... ...

- IMGT _____ <------------------------------------------------ FR3 - IMGT ------------------------------
        65              70              75              80              85              90
    S   Q   S   I   S   G   I   P       S   R   F   S   G   S   G       S   G   S   Y   F   T   L   T
... ... ... tcc caa tcc atc tct ggg atc ccc ... tcc agg ttc agt ggc agt gga ... ... tca ggg tca tat ttc act ctc act ---------------------------------------------------> _____ CDR3 - IMGT _____
        95              100     104
I   N   S   V   E   P   E   D   V   G   V   Y   Y   C   Q   N   G   H   G   F   P   P   T   F   G   G   G   T   K
atc aac agt gtg gaa cct gaa gat gtt gga gta tat tac tgt caa aat ggt cac ggc ttt cct ccg acg ttc ggt gga ggc acc aag
(SEQ ID NO: 11)
(SEQ ID NO: 12)
```

Figure 2e

FL133_67K

```
<------------------------------ FR1 – IMGT ------------------------------>
  1        5         10        15        20        25        30
  D  I  V  M  S  Q  S  P  A  T  L  S  V  T  P  G  D  R  V  S  L  S  C  R  A  S  Q  S  I
  gac att gtg atg agt cag tct cca gcc acc ctg tct gtg act cca gga gat aga gtc tct ctt tcc tgc agg gcc agc cag agt att ...

__ CDR1 - IMGT _____  <---------------------------FR2 - IMGT ---------------------------->_____CDR2
           35              40           45           50           55           60
              S  D  D  L  H  W  Y  Q  Q  K  S  H  E  S  P  R  L  L  I  K  Y  V
  ... ... ... ... agc gac gac tta cac tgg tat caa caa aaa tca cat gag tct cca agg ctt ctc atc aaa tat gtt ... ... ...

- IMGT _____  <------------------------------------------------------ FR3 - IMGT ----------------------------
           65           70           75           80           85           90
              S  Q  Y  I  S  G  I  P     S  R  F  S  G  S  G     S  G  S  D  F  T  L  T
  ... ... ... tcc caa tac atc tct ggg atc ccc ... tcc agg ttc agt ggc agt gga ... ... tca ggg tca gat ttc act ctc act ------------------------------------------------------------> _____ CDR3 - IMGT _____
              95          100         104
  I  K  S  V  E  P  E  D  V  G  V  Y  Y  C  Q  N  G  Y  S  F  P  P  T  F  G  G  G  T  K
  atc aag agt gtg gaa cct gaa gat gtt gga gta tat tac tgt caa aat ggt tac agc ttt cct ccg acg ttc ggt gga ggc acc aag
  (SEQ ID NO: 13)
  (SEQ ID NO: 14)
```

Figure 2f

FL134_33K

```
<------------------------------ FR1 – IMGT ------------------------------>
  1        5         10        15        20        25        30
  D  I  V  M  T  Q  S  P  D  T  L  S  V  T  P  G  D  R  V  S  L  S  C  R  A  S  Q  S  I
  gac att gtg atg act cag tct cca gac acc ctg tct gtg act cca gga gat aga gtc tct ctt tcc tgc agg gcc agc cag agt att ...

__ CDR1 - IMGT _____  <---------------------------FR2 - IMGT ---------------------------->_____CDR2
           35              40           45           50           55           60
              S  D  D  L  H  W  Y  Q  Q  K  S  H  E  S  P  R  L  L  I  K  Y  V
  ... ... ... ... agc gac gac tta cac tgg tat caa caa aaa tca cat gag tct cca aga ctt ctc atc aaa tat gtt ... ... ...

- IMGT _____  <------------------------------------------------------ FR3 - IMGT ----------------------------
           65           70           75           80           85           90
              S  Q  S  I  S  G  I  P     S  R  F  S  G  S  G     S  R  S  D  F  T  L  T
  ... ... ... tct caa tcc atc tct ggg atc ccc ... tcc agg ttc agt ggc agt gga ... ... tca aga tca gat ttc act ctc act ------------------------------------------------------------> _____ CDR3 - IMGT _____
              95          100         104
  I  N  S  V  E  P  E  D  V  G  L  Y  Y  C  Q  N  G  H  G  F  P  P  T  F  G  G  G  T  K
  atc aac agt gtg gaa cct gaa gat gtt gga cta tat tac tgt caa aat ggt cac ggc ttt cct ccg acg ttc ggt gga ggc acc aag L  E  I  K  R  T          (SEQ ID NO: 15)
  ctg gaa atc aaa cgt acg    (SEQ ID NO: 16)
```

Figure 3a 134 heavy chain DNA sequence
Gctgtgcaacttcaggagtcaggacctgacctggtgaaaccttctcagtcactttcactcacctgtactgtcactggctactccat
caccagtggttatagctggcactggatccggcagtttccaggaaacaaactggaatgggtgggctacatacactaccgtggt
aacactaattacaacccatctctcaaaagtcgagtctcaatcactcgagacacatacaagaaccagttcttcctacagttaaatt
ctctgactactgaggacacagccacatattattgtgcacaagaacctgtgaggaactatgctatggacttttggggtcaagga
acctcagtcaccgtctccagc
Gcttccaccaagggcccatcggtcttccccctggcaccctcctccaagagcacctctgggggcacagcggccctgggctgcct
ggtcaaggactacttccccgaaccggtgacggtgtcgtggaactcaggcgccctgaccagcggcgtgcacaccttcccggct
gtcctacagtcctcaggactctactccctcagcagcgtggtgaccgtgccctccagcagcttgggcacccagacctacatctgc
aacgtgaatcacaagcccagcaacaccaaggtggacaagaaagttgagcccaaatcttgtgacaaaactcacacatgccca
ccgtgcccagcacctgaactcctggggggaccgtcagtcttcctcttccccccaaaacccaaggacaccctcatgatctcccgg
acccctgaggtcacatgcgtggtggtggacgtgagccacgaagaccctgaggtcaagttcaactggtacgtggacggcgtg
gaggtgcataatgccaagacaaagccgcgggaggagcagtacaacagcacgtaccgtgtggtcagcgtcctcaccgtcctg
caccaggactggctgaatggcaaggagtacaagtgcaaggtctccaacaaagccctcccagcccccatcgagaaaaccatc
tccaaagccaaagggcagccccgagaaccacaggtgtacaccctgcccccatcccgggatgagctgaccaagaaccaggtc
agcctgacctgcctggtcaaaggcttctatcccagcgacatcgccgtggagtgggagagcaatgggcagccggagaacaac
tacaagaccacgcctcccgtgctggactccgacggctccttcttcctctacagcaagctcaccgtggacaagagcaggtggca
gcaggggaacgtcttctcatgctccgtgatgcatgaggctctgcacaaccactacacgcagaagagcctctccctgtctccgg
gtaaa (SEQ ID NO: 17)

134 heavy chain protein sequence
AVQLQESGPDLVKPSQSLSLTCTVTGYSITSGYSWHWIRQFPGNKLEWVGYIHYRGNTNY
NPSLKSRVSITRDTYKNQFFLQLNSLTTEDTATYYCAQEPVRNYAMDFWGQGTSVTVSSA STKGPSVFPLAPSSKSTSGGTAALGCLVKDYFPEPVTVSWNSGALTSGVHTFPAVLQSSG
LYSLSSVVTVPSSSLGTQTYICNVNHKPSNTKVDKKVEPKSCDKTHTCPPCPAPELLGGP
SVFLFPPKPKDTLMISRTPEVTCVVVDVSHEDPEVKFNWYVDGVEVHNAKTKPREEQYNS
TYRVVSVLTVLHQDWLNGKEYKCKVSNKALPAPIEKTISKAKGQPREPQVYTLPPSRDEL
TKNQVSLTCLVKGFYPSDIAVEWESNGQPENNYKTTPPVLDSDGSFFLYSKLTVDKSRWQ
QGNVFSCSVMHEALHNHYTQKSLSLSPGK (SEQ ID NO: 18)

Figure 3b 134 light chain DNA sequence
Gacattgtgatgactcagtctccagacaccctgtctgtgactccaggagatagagtctctctttcctgcagggccagccagagt
attagcgacgacttacactggtatcaacaaaaatcacatgagtctccaagacttctcatcaaatatgtttctcaatccatctctgg
gatcccctccaggttcagtggcagtggatcaagatcagatttcactctcactatcaacagtgtggaacctgaagatgttggact
atattactgtcaaaatggtcacggcttcctccgacgttcggtggaggcaccaagctggaaatcaaa
Cgtacggtagcggccccatctgtcttcatcttcccgccatctgatgagcagttgaaatctggaactgcctctgttgtgtgcctgct
gaataacttctatcccagagaggccaaagtacagtggaaggtggataacgcccctccaatcgggtaactcccaggagagtgtc
acagagcaggacagcaaggacagcacctacagcctcagcagcaccctgacgctgagcaaagcagactacgagaaacaca
aagtctacgcctgcgaagtcacccatcagggcctgagctcgcccgtcacaaagagcttcaacaggggagagtgt (SEQ ID NO: 19)

134 light chain protein sequence
DIVMTQSPDTLSVTPGDRVSLSCRASQSISDDLHWYQQKSHESPRLLIKYVSQSISGIPS
RFSGSGSRSDFTLTINSVEPEDVGLYYCQNGHGFPPTFGGGTKLEIKRTVAAPSVFIFPP
SDEQLKSGTASVVCLLNNFYPREAKVQWKVDNALQSGNSQESVTEQDSKDSTYSLSSTLT
LSKADYEKHKVYACEVTHQGLSSPVTKSFNRGEC (SEQ ID NO: 20)

Figure 6
A
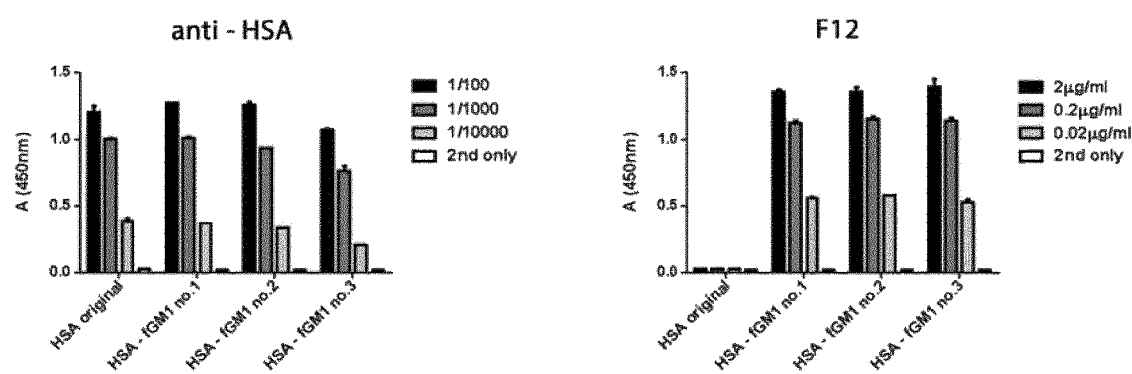
B
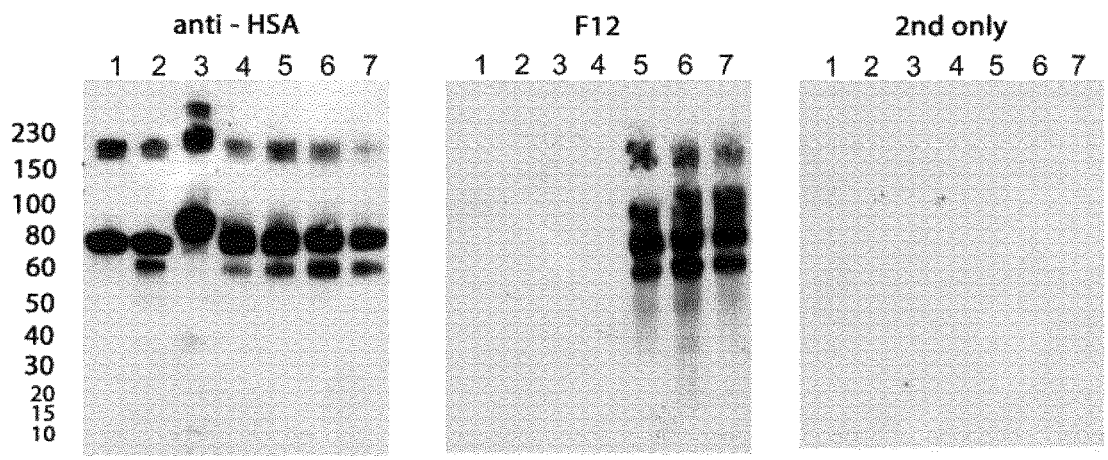

Figure 13
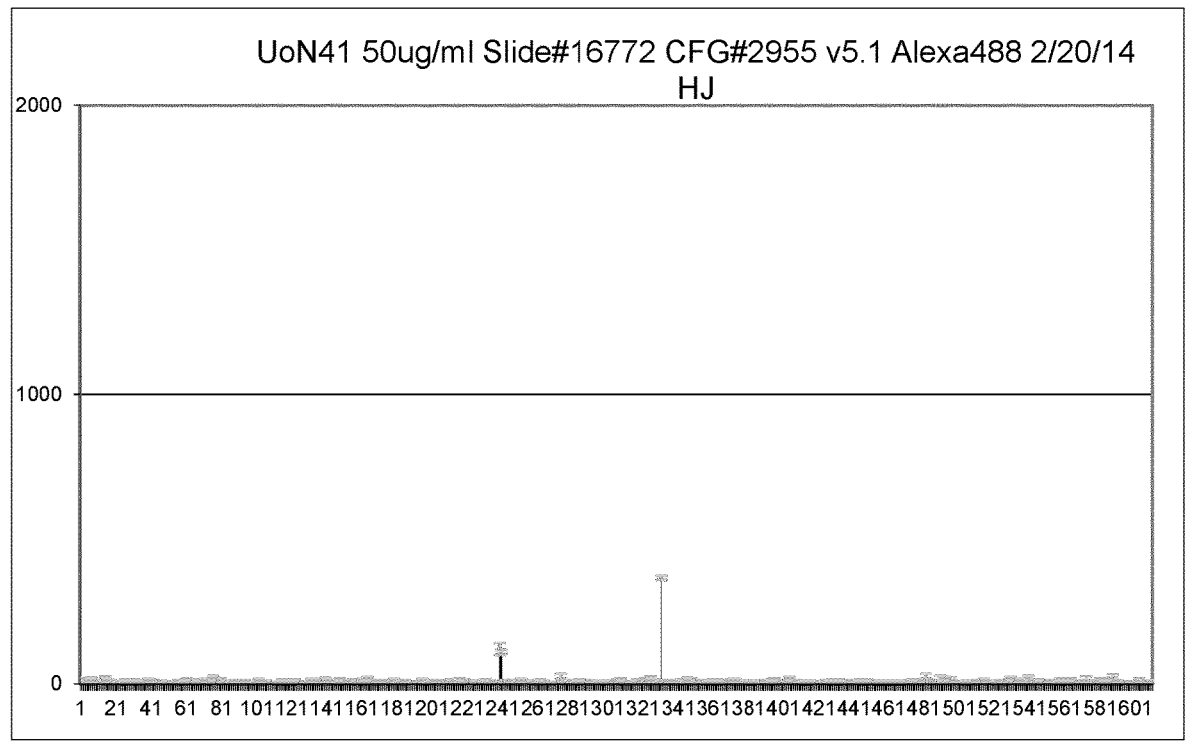
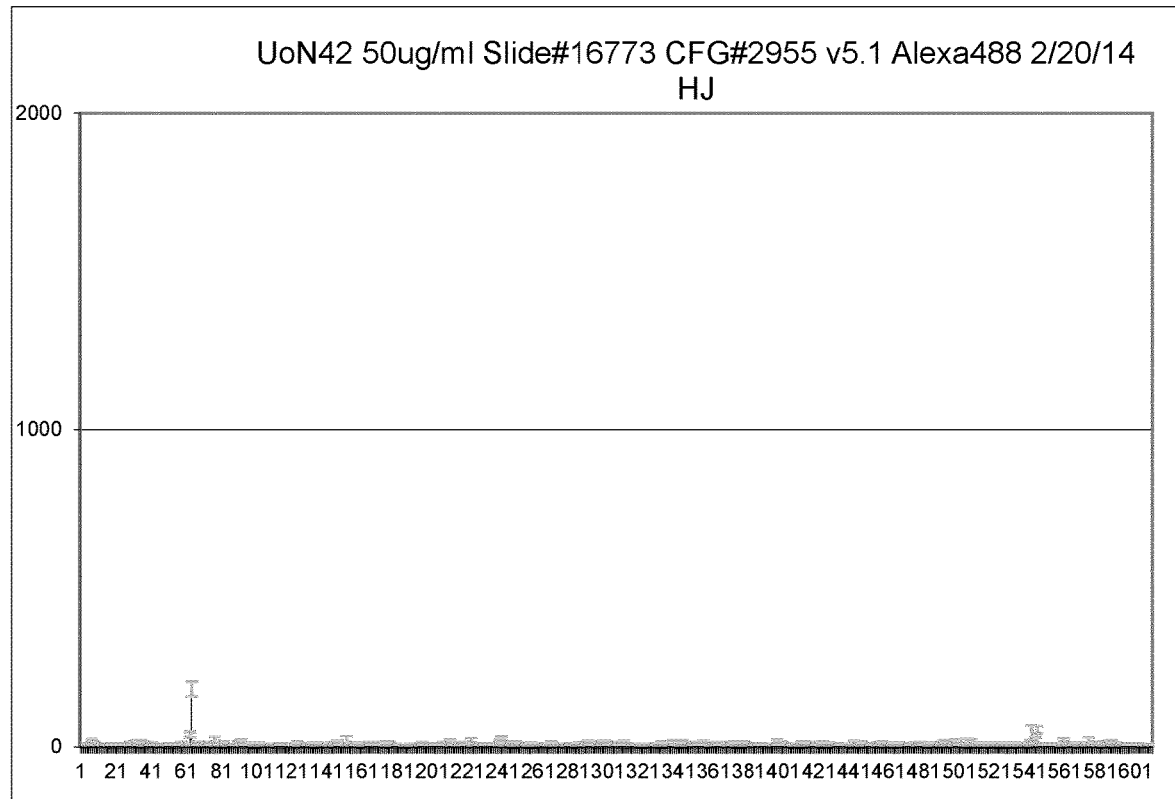

Figure 17
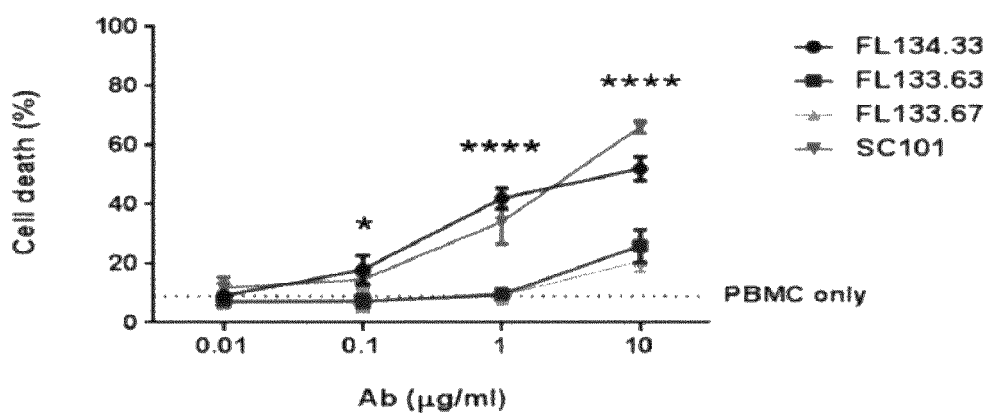
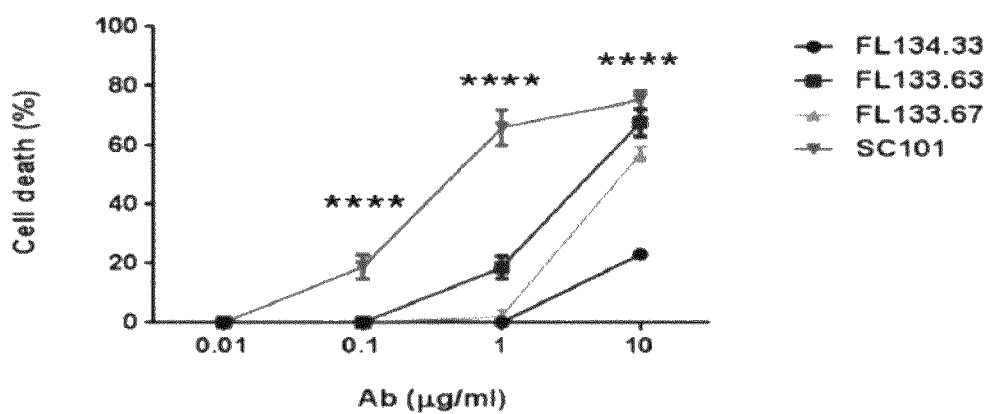

Figure 18

Figure 19

Figure 21
A
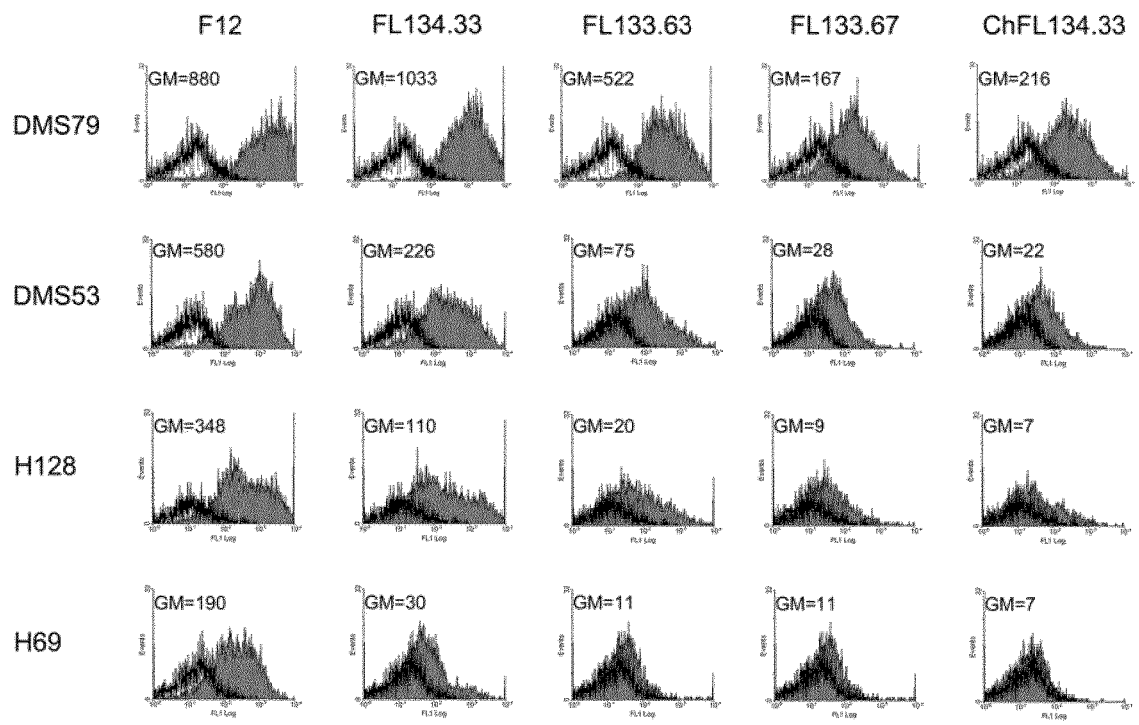
B
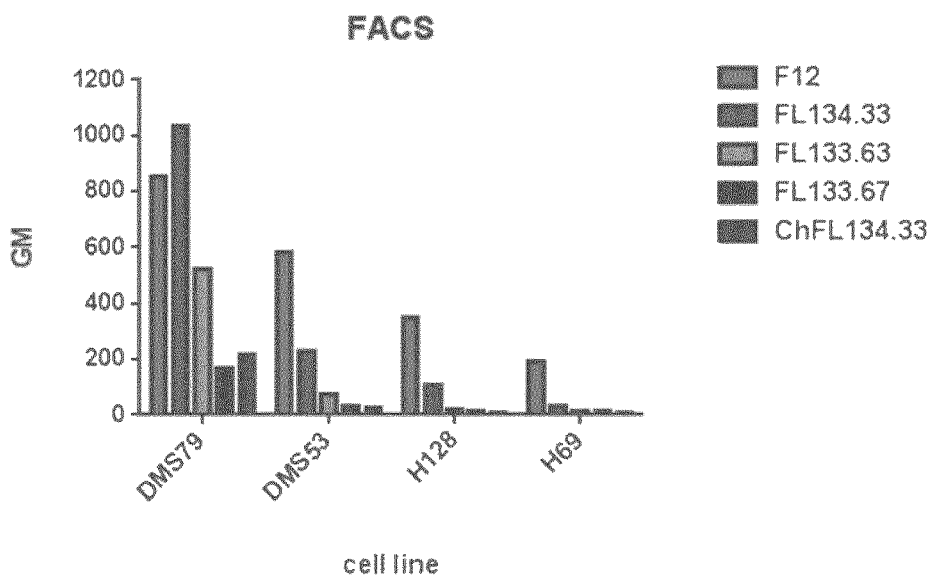

ANTI-FUCOSYL-GM1 ANTIBODIES

RELATED APPLICATIONS

This application is a U.S. National Stage entry of International Application No. PCT/EP2020/074441, filed Sep. 2, 2020, published in English. This application also claims priority to Great Britain Patent Application No. 1912657.2 filed on Sep. 3, 2019, the entirety of which is incorporated herein by reference.

SEQUENCE LISTING

The ASCII text file named "Sequence Listing SEP-25_ST25.txt" created Sep. 22, 2025, comprising 33,244 bytes, is hereby incorporated by reference in its entirety.

The present invention relates to specific binding members, such as antibodies and fragments thereof, that are capable of specifically binding fucosyl-GM1 (Fuc-GM1). It also relates to the use of such binding members in medicine and to nucleic acids encoding such binding members, to methods for detecting Fuc-GM1, as well as methods for treating various diseases, including cancer, using anti-Fuc-GM1 antibodies.

Fucα1-2Galβ1-3GalNAcβ1-4(Neu5Acα2-3)Galβ1-4Glc-ceramide (hereinafter referred to as Fuc-GM1 glycolipid) is a sphingolipid monosialoganglioside composed of a ceramide lipid component, which anchors the molecule in the cell membrane, and a carbohydrate component that is exposed at the cell surface. It is biosynthesized (FIG. 1) by successive additions of sugars and sialic acids to ceramide (a sphingosine and a fatty acid) through different glucosyltransferases (Type I transmembrane protein glycosylceramide synthetase, β-galactosyltransferase, GM1 synthetase, α1,2-fucosyltransferases) (Kartal Yandim, Apohan, and Baran 2013; Tokuda et al. 2006). Overexpression of some of these enzymes have been related to small cell lung cancer (SCLC) (Martin-Satue et al. 1998) further suggesting that Fuc-GM1 participates in tumour development. Carbohydrate antigens are the most abundantly expressed antigens on the cell surface of cancers (Feizi 1985). In some tumour types, such as SCLC, initial responses to chemotherapy are impressive, but chemo-refractory relapses rapidly follows. Intervention with novel immunotherapeutics may succeed in overcoming drug resistant relapse (Johnson 1995). Several carbohydrate antigens, such as gangliosides GD3 and GD2, have been shown to function as effective targets for passive immunotherapy with monoclonal antibodies (mAbs) (Irie and Morton 1986; Houghton et al. 1985). Ganglioside antigens have also been demonstrated to be effective targets for active immunotherapy with vaccines in clinical trials (Krug et al. 2004; Dickler et al. 1999; Livingston et al. 1994). Indeed, serum derived from SCLC patients who developed antibody titers to Fuc-GM1 following vaccination with KLH conjugated antigen, demonstrated specific binding to tumour cells and tumour specific complement dependent cytotoxicity (CDC). Anti-Fuc-GM1 titer associated toxicities were mild and transient and three patients with limited-stage SCLC were relapse-free at 18, 24, and 30 months (Krug et al. 2004; Dickler et al. 1999).

Fuc-GM1 expression has been shown in a high percentage, 75-90%, of SCLC cases (Drivsholm et al. 1994) and unlike other ganglioside antigens, Fuc-GM1 glycolipid has little or no expression in normal tissues (Nilsson et al. 1984; Krug et al. 2004; Brezicka et al. 1989; Zhang et al. 1997; Brezicka et al. 2000; Fredman et al. 1986; Brezicka et al. 1991; Nilsson et al. 1986). The presence of Fuc-GM1 has been demonstrated in culture media from SCLC cell lines, in tumour extracts and serum of nude mouse xenografts and in the serum of SCLC patients with extensive-stage disease (Vangsted et al. 1991; Vangsted et al. 1994). These reports provide convincing evidence for Fuc-GM1 as a highly specific tumour antigen, which may be targeted by an immunotherapeutic.

Accordingly, effective agents that recognise lung cancer antigens, targeting mainly glycosphingolipids such as Fuc-GM1 glycolipid, and methods of using such agents, are desired. A mAb ("F12") that binds Fuc-GM1 is known in the art (Brezicka et al. 1989; Brezicka et al. 2000). In addition WO2007/067992 and WO2016/049256A1 disclose anti-Fc-GM1 antibodies.

In a first aspect, the present invention provides an isolated specific binding member capable of binding specifically to Fucα1-2Galβ1-3GalNAcβ1-4(Neu5Acα2-3)Galβ1-4Glc-ceramide (Fuc-GM1 glycolipid), but not capable of binding to Fucα1-2Galβ1-3GalNAcβ1-4(Neu5Acα2-3)Galβ1-4Glc (free sugar). Isolated binding members of the present invention bind to Fuc-GM1 glycolipid but not to the free sugar. As described in detail in the examples herein, initially mAbs were raised against Fuc-GM1 glycolipid formulated in liposomes with an immune adjuvant to ensure that the antibodies recognised Fuc-GM1 within cell membranes. However, this failed to induce a high affinity antibody response. To improve the immunogenicity of Fuc-GM1 glycolipid, it was conjugated to the T cell carrier human serum albumin (HSA). This was achieved by removal of one of the lipid chains by ozonolysis and chemical conjugation to HSA to provide T cell help for affinity maturation. Further immunisations were with Fuc-GM1-HSA. Unexpectedly this produced IgG antibodies that bound to Fuc-GM1 glycolipid but not to the free sugar. This requirement for a lipid chain to be present for antibody binding is highly surprising as antibodies generally will not bind to hydrophobic moieties such as lipids. Interestingly, despite the fact they were raised against Fuc-GM1-HSA, they bound with 1,000 to 10,000 fold higher affinity to Fuc-GM1 glycolipid and to tumour cells. The anti-FucGM1 mab, F12, shown herein to also bind GM1, whereas the binding members of the present invention do not cross react with GM1.

The inventors have provided specific binding members which demonstrate potent in vivo anti-tumour activity. The specific binding members of the invention display potent immune-mediated cytotoxic activity against human SCLC cells in vitro via antibody-dependent cell-mediated cytotoxicity (ADCC) and CDC. By immunising with cells/glycan conjugates, the inventors have produced an anti-Fuc-GM1 glycolipid mAb. Examples of these mAbs are the IgG3 murine mAbs referred to herein as "FL133.63" (FIGS. 2a & d) and "FL133.67" (FIGS. 2b & e), the IgG1 mAb "FL134.33" (FIGS. 2c & f) and hIgG1 chimeric Ab "CH134" (FIG. 3).

The specific binding members of the present invention have a very restrictive normal distribution as normal tissues do not express 2-hydoxy fatty acid-containing lipids. However, they bind strongly to SCLC. The specificity is reflected in distinct sequence of FL133.63/FL133.67/FL134.33/CH134.33 variable heavy and light chain regions. The specific binding members of the present invention may be attached to SCLC specific ganglioside expressed on 2-hydoxy fatty acid-containing lipids.

The specific binding members of the present invention preferably comprise one or more binding domains selected from the binding domains having the amino acid sequence substantially as set out as residues 27 to 38 (CDRH1), 54 to 65 (CDRH2) or 105 to 116 (CDRH3) of FIG. 2a, b, c or 3a. The specific binding member may comprise a binding domain which comprises an amino acid sequence substantially as set out as residues 105 to 116 (CDRH3) of the amino acid sequence of FIG. 2a, b, c or 3a. Such a specific binding member may additionally comprise one or both, preferably both, of the binding domains having an amino acid sequence substantially as set out as residues 27 to 38 (CDRH1) and residues 56 to 65 (CDRH2) of the amino acid sequence shown in FIGS. 2a, b, c and 3a. Preferred specific binding members comprise:

(a) the CDRH1, CDRH2 and CDRH3 of FIG. 2a,
(b) the CDRH1, CDRH2 and CDRH3 of FIG. 2b,
(c) the CDRH1, CDRH2 and CDRH3 of FIG. 2c, or
(d) the CDRH1, CDRH2 and CDRH3 of FIG. 3a.

The binding member may comprise an amino acid sequence substantially as set out as 1-127 (VH) of FIG. 2a, b, c or 3a.

The specific binding member may comprise one or more binding domains selected from binding domains having the amino acid sequence of residues 27 to 38 (CDRL1), 56 to 65 (CDRL2) or 105 to 113 (CDRL3) of FIG. 2d, e, f or 3b. The binding member may comprise a binding domain having an amino acid sequence substantially as set out as residues 105 to 113 (CDRL3) of the amino acid sequence of FIG. 2d, e, f or 3b. Such a specific binding member may additionally comprise one or both, preferably both, of the binding domains having an amino acid sequence substantially as set out as residues 27 to 38 (CDRL1) and residues 56 to 65 (CDRL2) of the amino acid sequence shown in FIG. 2d, e, f or 3b. Preferred specific binding members comprise:

(a) the CDRH1, CDRH2 and CDRH3 of FIG. 2d,
(b) the CDRH1, CDRH2 and CDRH3 of FIG. 2e,
(c) the CDRH1, CDRH2 and CDRH3 of FIG. 2f, or
(d) the CDRH1, CDRH2 and CDRH3 of FIG. 3b.

Specific binding members which comprise a plurality of binding domains of the same or different sequence, or combinations thereof, are included within the present invention. Therefor each binding domain may be carried by a human antibody framework. For example, one or more binding domains may be substituted for the complementary determining regions (CDRs) of a whole human antibody or of the variable region thereof.

One isolated specific binding member of the invention comprises the amino acid sequence substantially as set out as residues 1 to 124 (VL) of the amino acid sequence shown in FIG. 2d, e, f or 3b.

The isolated specific binding member of the invention may comprise one or more, preferably all, of the binding domains having an amino acid sequence substantially as set out as residues 27 to 38 (CDRH1), 56 to 65 (CDRH2) or 105 to 116 (CDRH3) of FIG. 2a, b, c or 3a in combination with one or more, preferably all, of the binding domains having an amino acid sequence substantially as set out as residues 27 to 38 (CDRL1), 56 to 65 (CDRL2) or 105 to 113 (CDRL3) of FIG. 2d, e, f or 3b.

Preferred isolated specific binding members of the invention comprise:

(a) one or more, preferably all, of the binding domains having an amino acid sequence substantially as set out as residues 27 to 38 (CDRH1), 56 to 65 (CDRH2) or 105 to 116 (CDRH3) of FIG. 2a in combination with one or more, preferably all, of the binding domains having an amino acid sequence substantially as set out as residues 27 to 38 (CDRL1), 56 to 65 (CDRL2) or 105 to 113 (CDRL3) of FIG. 2d;

(b) one or more, preferably all, of the binding domains having an amino acid sequence substantially as set out as residues 27 to 38 (CDRH1), 56 to 65 (CDRH2) or 105 to 116 (CDRH3) of FIG. 2b in combination with one or more, preferably all, of the binding domains having an amino acid sequence substantially as set out as residues 27 to 38 (CDRL1), 56 to 65 (CDRL2) or 105 to 113 (CDRL3) of FIG. 2e;

(c) one or more, preferably all, of the binding domains having an amino acid sequence substantially as set out as residues 27 to 38 (CDRH1), 56 to 65 (CDRH2) or 105 to 116 (CDRH3) of FIG. 2c in combination with one or more, preferably all, of the binding domains having an amino acid sequence substantially as set out as residues 27 to 38 (CDRL1), 56 to 65 (CDRL2) or 105 to 113 (CDRL3) of FIG. 2f; or (d) one or more, preferably all, of the binding domains having an amino acid sequence substantially as set out as residues 27 to 38 (CDRH1), 56 to 65 (CDRH2) or 105 to 116 (CDRH3) of FIG. 3a in combination with one or more, preferably all, of the binding domains having an amino acid sequence substantially as set out as residues 27 to 38 (CDRL1), 56 to 65 (CDRL2) or 105 to 113 (CDRL3) of FIG. 3b.

The binding member may comprise an amino acid sequence substantially as set out as residues 1 to 127 (VH) of the amino acid sequence of FIG. 2a, b, c or 3a, and an amino acid sequence substantially as set out as residues 1 to 124 (VL) of the amino acid sequence of FIG. 2d, e, f or 3b. preferably, the binding member comprises:

(a) an amino acid sequence substantially as set out as residues 1 to 127 (VH) of the amino acid sequence of FIG. 2a, and an amino acid sequence substantially as set out as residues 1 to 124 (VL) of the amino acid sequence of FIG. 2d, (b) an amino acid sequence substantially as set out as residues 1 to 127 (VH) of the amino acid sequence of FIG. 2b, and an amino acid sequence substantially as set out as residues 1 to 124 (VL) of the amino acid sequence of FIG. 2e, (c) an amino acid sequence substantially as set out as residues 1 to 127 (VH) of the amino acid sequence of FIG. 2c, and an amino acid sequence substantially as set out as residues 1 to 124 (VL) of the amino acid sequence of FIG. 2f, or (d) an amino acid sequence substantially as set out as residues 1 to 127 (VH) of the amino acid sequence of FIG. 3a, and an amino acid sequence substantially as set out as residues 1 to 124 (VL) of the amino acid sequence of FIG. 3b.

Once a single, archetypal mAb, for example an Fuc-GM1 glycolipid mAb, has been isolated that has the desired properties described herein, it is straightforward to generate other mAbs with similar properties, by using art-known methods. For example, the method of Jespers et al., 1994 (Jespers et al. 1994), may be used to guide the selection of mAbs having the same epitope and therefore similar properties to the archetypal mAb. Using phage display, first the heavy chain of the archetypal antibody is paired with a repertoire of (preferably human) light chains to select a ganglioside-binding mAb, and then the new light chain is paired with a repertoire of (preferably human) heavy chains to select a (preferably human) ganglioside-binding mAb having the same epitope as the archetypal mAb.

The specific binding member may be an antibody or an antibody fragment, Fab, (Fab')2, scFv, Fv, dAb, Fd or a diabody. The antibody may be a polyclonal antibody. The antibody may be a monoclonal antibody (mAb). Antibodies of the invention may be humanised, chimeric or veneered antibodies, or may be non-human antibodies of any species.

Murine or chimeric antibodies carry an increased risk of adverse anti-murine antibody (HAMA) reactions in patients (Schroff et al. 1985; Azinovic et al. 2006; Miotti et al. 1999; D'Arcy and Mannik 2001). Accordingly, most approved therapeutic mAbs are either humanised or fully human IgG antibodies.

The specific binding member of the invention may comprise a heavy chain having an amino acid sequence substantially as set out in FIG. 2a and a light chain having an amino acid sequence substantially as set out in FIG. 2d.

The specific binding member of the invention may comprise a heavy chain having an amino acid sequence substantially as set out in FIG. 2b and a light chain having an amino acid sequence substantially as set out in FIG. 2e.

The specific binding member of the invention may comprise a heavy chain having an amino acid sequence substantially as set out in FIG. 2c and/a light chain having an amino acid sequence substantially as set out in FIG. 2f.

The specific binding member of the invention may comprise a heavy chain having an amino acid sequence substantially as set out in FIG. 3a and a light chain having an amino acid sequence substantially as set out in FIG. 3b.

The invention further provides a binding member which competes for binding to Fuc-GM1 containing gangliosides with an antibody comprising a VH chain having the amino acid sequence of residues 1 to 127 of FIG. 2a, b, c or 3a and a VL chain having the amino acid sequence of residues 1 to 124 of FIG. 2d, e, f or 3b, preferably the VH chain of FIG. 2a in combination with the VL chain of FIG. 2d, the VH chain of FIG. 2b in combination with the VL chain of FIG. 2e, the VH chain of FIG. 2c in combination with the VL chain of FIG. 2f, the VH chain of FIG. 3a in combination with the VL chain of FIG. 3b.

Specific binding members that are capable of binding specifically to Fuc-GM1 glycolipid but not to the free sugar (Fucα1-2Galβ1-3GalNAcβ1-4(Neu5Acα2-3)Galβ1-4Glc) and are at least 90%, at least 95% or at least 99% identical in the VH and/or VL domain to the VH or VL domains of FIG. 2 or 3 are included in the invention. Specific binding members that are capable of binding specifically to Fuc-GM1 and are at least 90%, at least 95% or at least 99% identical to the heavy chain and/or light chain of FIG. 2 or 3 are included in the invention. Preferably such antibodies differ from the sequences of FIG. 2 or 3 by a small number of functionally inconsequential amino acid substitutions (e.g., conservative substitutions), deletions, or insertions.

Specific binding members of the invention may carry a detectable or functional label.

In further aspects, the invention provides an isolated nucleic acid encoding a specific binding member of the invention, and methods of preparing specific binding members of the invention which comprise expressing said nucleic acids under conditions to bring about expression of said binding member, and recovering the binding member. Isolated nucleic acids encoding specific binding members that are capable of binding specifically to Fuc-GM1 glycolipid but not to the free sugar (Fucα1-2Galβ1-3GalNAcβ1-4 (Neu5Acα2-3)Galβ1-4Glc) and are at least 90%, at least 95% or at least 99% identical to the sequences provided herein are included in the invention.

Specific binding members of the invention may be used in a method of treatment or diagnosis of the human or animal body, such as a method of treatment of a tumour in a patient (preferably human) which comprises administering to said patient an effective amount of a specific binding member of the invention. The invention also provides a specific binding member of the present invention for use in medicine, preferably for use in treating a tumour, as well as the use of a specific binding member of the present invention in the manufacture of a medicament for the diagnosis or treatment of a tumour. The tumour may be small cell lung cancer (SCLC).

Disclosed herein is the antigen to which the specific binding members of the present invention bind. A Fuc-GM1 glycolipid which is capable of being bound, preferably specifically, by a specific binding member of the present invention may be provided. The Fuc-GM1 glycolipid may be provided in isolated form, and may be used in a screen to develop further specific binding members therefor. For example, a library of compounds may be screened for members of the library which bind specifically to the Fuc-GM1. The Fuc-GM1 may on a lipid backbone.

In a further aspect the invention provides an isolated specific binding member of the first aspect of the invention, for use in the diagnosis or prognosis of SCLC.

The invention further provides a method for diagnosis of cancer comprising using a specific binding member of the invention to detect Fuc-GM1 containing GSL in a sample from an individual. In the diagnostic method, the pattern of gangliosides detected by the binding member may be used to stratify therapy options for the individual.

These and other aspects of the invention are described in further detail below.

As used herein, a "specific binding member" is a member of a pair of molecules which have binding specificity for one another. The members of a specific binding pair may be naturally derived or wholly or partially synthetically produced. One member of the pair of molecules has an area on its surface, which may be a protrusion or a cavity, which specifically binds to and is therefore complementary to a particular spatial and polar organisation of the other member of the pair of molecules. Thus, the members of the pair have the property of binding specifically to each other. Examples of types of specific binding pairs are antigen-antibody, biotin-avidin, hormone-hormone receptor, receptor-ligand, enzyme-substrate. The present invention is generally concerned with antigen-antibody type reactions, although it also concerns small molecules which bind to the antigen defined herein.

As used herein, "treatment" includes any regime that can benefit a human or non-human animal, preferably mammal. The treatment may be in respect of an existing condition or may be prophylactic (preventative treatment).

As used herein, a "tumour" is an abnormal growth of tissue. It may be localised (benign) or invade nearby tissues (malignant) or distant tissues (metastatic). Tumours include neoplastic growths which cause cancer and include SCLC, as well as cancerous tissues or cell lines.

The term "antibody" as used herein refers to immunoglobulin molecules and immunologically active portions of immunoglobulin molecules, i.e., molecules that contain an antigen binding site that specifically binds an antigen, whether natural or partly or wholly synthetically produced. The term also covers any polypeptide or protein having a binding domain which is, or is homologous to, an antibody binding domain. These can be derived from natural sources, or they may be partly or wholly synthetically produced. Examples of antibodies of the invention are the immunoglobulin isotypes (e.g., IgG, IgE, IgM, IgD and IgA) and their isotypic subclasses; fragments which comprises an antigen binding domain such as Fab, scFv, Fv, dAb, Fd; and diabodies. Preferred isotypes are IgG1 and IgG3. Antibodies may be polyclonal or monoclonal. A monoclonal antibody may be referred to as a "mAb".

It is possible to take monoclonal and other antibodies and use techniques of recombinant DNA technology to produce other antibodies or chimeric molecules which retain the specificity of the original antibody. Such techniques may involve introducing DNA encoding the immunoglobulin variable region, or the CDRs, of an antibody to the constant regions, or constant regions plus framework regions, of a different immunoglobulin. See, for instance, EP-A-184187, GB 2188638A or EP-A-239400. A hybridoma or other cell producing an antibody may be subject to genetic mutation or other changes, which may or may not alter the binding specificity of antibodies produced.

As antibodies can be modified in a number of ways, the term "antibody" should be construed as covering any specific binding member or substance having a binding domain with the required specificity. Thus, this term covers antibody fragments, derivatives, functional equivalents and homologues of antibodies, humanised antibodies, including any polypeptide comprising an immunoglobulin binding domain, whether natural or wholly or partially synthetic. Chimeric molecules comprising an immunoglobulin binding domain, or equivalent, fused to another polypeptide are therefore included. Cloning and expression of chimeric antibodies are described in EP-A-0120694 and EP-A-0125023. A humanised antibody may be a modified antibody having the variable regions of a non-human, e.g., murine, antibody and the constant region of a human antibody. Methods for making humanised antibodies are described in, for example, U.S. Pat. No. 5,225,539.

It has been shown that fragments of a whole antibody can perform the function of binding antigens. Examples of binding fragments are (i) the Fab fragment consisting of VL, VH, CL and CH1 domains; (ii) the Fd fragment consisting of the VH and CH1 domains; (iii) the Fv fragment consisting of the VL and VH domains of a single antibody; (iv) the dAb fragment (Ward et al. 1989) which consists of a VH domain; (v) isolated CDR regions; (vi) F(ab')2 fragments, a bivalent fragment comprising two linked Fab fragments; (vii) single chain Fv molecules (scFv), wherein a VH domain and a VL domain are linked by a peptide linker which allows the two domains to associate to form an antigen binding site (Bird et al. 1988; Huston et al. 1988); (viii) bispecific single chain Fv dimers (PCT/US92/09965) and; (ix) "diabodies", multivalent or multispecific fragments constructed by gene fusion (WO94/13804; (Holliger, Prospero, and Winter 1993)).

Diabodies are multimers of polypeptides, each polypeptide comprising a first domain comprising a binding region of an immunoglobulin light chain and a second domain comprising a binding region of an immunoglobulin heavy chain, the two domains being linked (e.g., by a peptide linker) but unable to associated with each other to form an antigen binding site: antigen binding sites are formed by the association of the first domain of one polypeptide within the multimer with the second domain of another polypeptide within the multimer (WO94/13804).

Where bispecific antibodies are to be used, these may be conventional bispecific antibodies, which can be manufactured in a variety of ways (Holliger and Winter 1993), e.g., prepared chemically or from hybrid hybridomas, or may be any of the bispecific antibody fragments mentioned above. It may be preferable to use scFv dimers or diabodies rather than whole antibodies. Diabodies and scFv can be constructed without an Fc region, using only variable domains, potentially reducing the effects of anti-idiotypic reaction.

Other forms of bispecific antibodies include the single chain "Janusins" described in (Traunecker, Lanzavecchia, and Karjalainen 1991).

Bispecific diabodies, as opposed to bispecific whole antibodies, may also be useful because they can be readily constructed and expressed in E. coli. Diabodies (and many other polypeptides such as antibody fragments) of appropriate binding specificities can be readily selected using phage display (WO94/13804) from libraries. If one arm of the diabody is to be kept constant, for instance, with a specificity directed against antigen X, then a library can be made where the other arm is varied and an antibody of appropriate specificity selected.

A "binding domain" is the part of a specific binding member which comprises the area which specifically binds to and is complementary to part or all of an antigen. Where the binding member is an antibody or antigen-binding fragment thereof, the binding domain may be a CDR. Where an antigen is large, an antibody may only bind to a particular part of the antigen, which part is termed an epitope. An antigen binding domain may be provided by one or more antibody variable domains. An antigen binding domain may comprise an antibody light chain variable region (VL) and an antibody heavy chain variable region (VH).

"Specific" is generally used to refer to the situation in which one member of a specific binding pair will not show any significant binding to molecules other than its specific binding partner(s), and, e.g., has less than about 30%, preferably 20%, 10%, or 1% cross reactivity with any other molecule. The term is also applicable where e.g., an antigen binding domain is specific for a particular epitope which is carried by a number of antigens, in which case, the specific binding member carrying the antigen binding domain will be able to bind to the various antigens carrying the epitope.

"Isolated" refers to the state in which specific binding members of the invention or nucleic acid encoding such binding members will preferably be, in accordance with the present invention. Members and nucleic acid will generally be free or substantially free of material with which they are naturally associated such as other polypeptides or nucleic acids with which they are found in their natural environment, or the environment in which they are prepared (e.g., cell culture) when such preparation is by recombinant DNA technology practiced in vitro or in vivo. Specific binding members and nucleic acid may be formulated with diluents or adjuvants and still for practical purposes be isolated—for example, the members will normally be mixed with gelatin or other carriers if used to coat microtitre plates for use in immunoassays, or will be mixed with pharmaceutically acceptable carriers or diluents when used in diagnosis or therapy. Specific binding members may be glycosylated, either naturally or by systems of heterologous eukaryotic cells, or they may be (for example if produced by expression in a prokaryotic cell) unglycosylated.

By "substantially as set out" it is meant that the amino acid sequence(s) of the invention will be either identical or highly homologous to the amino acid sequence(s) referred to. By "highly homologous" it is contemplated that there may be from 1 to 5, from 1 to 4, from 1 to 3, 2 or 1 substitutions may be made in the sequence.

The invention also includes within its scope polypeptides having the amino acid sequence as set out in FIG. 2 or 3, polynucleotides having the nucleic acid sequences as set out in FIG. 2 or 3 and sequences having substantial identity thereto, for example at least 70%, at least 80%, at least 85%, at least 90%, at least 95% or at least 99% identity thereto. The percent identity of two amino acid sequences or of two nucleic acid sequences is generally determined by aligning the sequences for optimal comparison purposes (e.g., gaps can be introduced in the first sequence for best alignment with the second sequence) and comparing the amino acid residues or nucleotides at corresponding positions. The "best alignment" is an alignment of two sequences that results in the highest percent identity. The percent identity is determined by comparing the number of identical amino acid residues or nucleotides within the sequences (i.e., % identity=number of identical positions/total number of positions×100).

The determination of percent identity between two sequences can be accomplished using a mathematical algorithm known to those of skill in the art. An example of a mathematical algorithm for comparing two sequences is the algorithm of Karlin and Altschul, 1990 (Karlin and Altschul 1990), modified as in Karlin and Altschul, 1993 (Karlin and Altschul 1993). The NBLAST and XBLAST programs of Altschul et al., 1990 (Altschul et al. 1990) have incorporated such an algorithm. BLAST nucleotide searches can be performed with the NBLAST program, score=100, word length=12 to obtain nucleotide sequences homologous to a nucleic acid molecules of the invention. BLAST protein searches can be performed with the XBLAST program, score=50, word length=3 to obtain amino acid sequences homologous to a protein molecule of the invention. To obtain gapped alignments for comparison purposes, Gapped BLAST can be utilised as described in Altschul et al., 1997 (Altschul et al. 1997). Alternatively, PSI-Blast can be used to perform an iterated search that detects distant relationships between molecules (Id.). When utilizing BLAST, Gapped BLAST, and PSI-Blast programs, the default parameters of the respective programs (e.g., XBLAST and NBLAST) can be used. See http://www.ncbi.nlm.nih.gov. Another example of a mathematical algorithm utilised for the comparison of sequences is the algorithm of Myers and Miller, 1989 (Myers and Miller 1989). The ALIGN program (version 2.0) which is part of the GCG sequence alignment software package has incorporated such an algorithm. Other algorithms for sequence analysis known in the art include ADVANCE and ADAM as described in Torellis and Robotti, 1994 (Torelli and Robotti 1994); and FASTA described in Pearson and Lipman, 1988 (Pearson and Lipman 1988). Within FASTA, ktup is a control option that sets the sensitivity and speed of the search.

Isolated specific binding members of the present invention are capable of binding to a specific glycosphingolipid (GSL) but not to the free sugar of the glycosphingolipid. Highly unusually, binding members of the invention require the presence of the lipid in order to bind. GSL are a highly diverse group of molecules which structurally consist of glycans attached to a ceramide lipid moiety (sphingosine linked to fatty acid by amide linkage). Ceramide structures vary in length and saturation which add to the diversity of GSL species but the major source of diversity comes from the glycan head group. In comparison to amino acids or nucleic acids which can only bind linearly; carbohydrates can bind to each other in multiple points. The class switched and affinity maturated antibody targeting domains, comprising the amino acid sequences substantially as set out as residues 105 to 116 (CDRH3) of FIG. 2a, b, c or 3a and 105 to 113 (CDRL3) of FIG. 2d, e, f or 3b, may be carried in a structure which allows the binding of these regions to a Fuc-GM1 ganglioside.

The structure for carrying the binding domains of the invention will generally be of an antibody heavy or light chain sequence or substantial portion thereof in which the binding domains are located at locations corresponding to the CDR3 region of naturally-occurring VH and VL antibody variable domains encoded by rearranged immunoglobulin genes. The structures and locations of immunoglobulin variable domains may be determined by reference to http://www.imgt.org/. The amino acid sequence substantially as set out as residues 105 to 116 of FIG. 2a, b, c or 3a may be carried as the CDR3 in a human heavy chain variable domain or a substantial portion thereof, and the amino acid sequence substantially as set out as residues and 105 to 113 of FIG. 2d, e, f or 3b may be carried as the CDR3 in a human light chain variable domain or a substantial portion thereof.

The variable domains may be derived from any germline or rearranged human variable domain, or may be a synthetic variable domain based on consensus sequences of known human variable domains. The CDR3-derived sequences of the invention may be introduced into a repertoire of variable domains lacking CDR3 regions, using recombinant DNA technology. For example, Marks et al., 1992 (Marks et al. 1992) describe methods of producing repertoires of antibody variable domains in which consensus primers directed at or adjacent to the 5' end of the variable domain area are used in conjunction with consensus primers to the third framework region of human VH genes to provide a repertoire of VH variable domains lacking a CDR3. Marks et al., 1992 (Marks et al. 1992) further describe how this repertoire may be combined with a CDR3 of a particular antibody. Using analogous techniques, the CDR3-derived sequences of the present invention may be shuffled with repertoires of VH or VL domains lacking a CDR3, and the shuffled complete VH or VL domains combined with a cognate VL or VH domain to provide specific binding members of the invention. The repertoire may then be displayed in a suitable host system such as the phage display system of WO92/01047 so that suitable specific binding members may be selected. A repertoire may consist of from anything from $10^4$ individual members upwards, for example from $10^6$ to $10^8$ or $10^{10}$ members.

Analogous shuffling or combinatorial techniques are also disclosed by Stemmer, 1994 (Stemmer 1994) who describes the technique in relation to a beta-lactamase gene but observes that the approach may be used for the generation of antibodies. A further alternative is to generate novel VH or VL regions carrying the CDR3-derived sequences of the invention using random mutagenesis of, for example, the Fuc-GM1 VH or VL genes to generate mutations within the entire variable domain. Such a technique is described by Gram et al., 1992 (Gram et al. 1992), who used error-prone PCR.

Another method which may be used is to direct mutagenesis to CDR regions of VH or VL genes. Such techniques are disclosed by Barbas et al., 1994 (Barbas et al. 1994) and Schier et al., 1996 (Schier et al. 1996). A substantial portion of an immunoglobulin variable domain will generally comprise at least the three CDR regions, together with their intervening framework regions. The portion may also include at least about 50% of either or both of the first and fourth framework regions, the 50% being the C-terminal 50% of the first framework region and the N-terminal 50% of the fourth framework region. Additional residues at the N-terminal or C-terminal end of the substantial part of the variable domain may be those not normally associated with naturally occurring variable domain regions. For example, construction of specific binding members of the present invention made by recombinant DNA techniques may result in the introduction of N- or C-terminal residues encoded by linkers introduced to facilitate cloning or other manipulation steps, including the introduction of linkers to join variable domains of the invention to further protein sequences including immunoglobulin heavy chains, other variable domains (for example in the production of diabodies) or protein labels as discussed in more detail below.

The invention provides specific binding members comprising a pair of binding domains based on the amino acid sequences for the VL and VH regions substantially as set out in FIGS. 2 and 3, i.e., amino acids 1 to 127 (VH) of FIG. 2a, b, c or 3a and amino acids 1 to 124 (VL) of FIG. 2d, e, f or 3b. Single binding domains based on either of these sequences form further aspects of the invention. In the case of the binding domains based on the amino acid sequence for the VH region substantially set out in FIG. 2a, b, c or 3a, such binding domains may be used as targeting agents since it is known that immunoglobulin VH domains are capable of binding target antigens in a specific manner. In the case of either of the single chain specific binding domains, these domains may be used to screen for complementary domains capable of forming a two-domain specific binding member which has in vivo properties as good as or equal to the FL133/4 antibodies disclosed herein.

This may be achieved by phage display screening methods using the so-called hierarchical dual combinatorial approach as disclosed in WO92/01047 in which an individual colony containing either an H or L chain clone is used to infect a complete library of clones encoding the other chain (L or H) and the resulting two-chain specific binding member is selected in accordance with phage display techniques such as those described in that reference. This technique is also disclosed in Marks et al., 1992 (Marks et al. 1992).

Specific binding members of the present invention may further comprise antibody constant regions or parts thereof. For example, specific binding members based on the VL region shown in FIG. 2d, e, f or 3b may be attached at their C-terminal end to antibody light chain constant domains. Similarly, specific binding members based on VH region shown in FIG. 2a, b, c or 3a may be attached at their C-terminal end to all or part of an immunoglobulin heavy chain derived from any antibody isotype, e.g., IgG, IgA, IgE and IgM and any of the isotype sub-classes, particularly IgG1, IgG2 and IgG4.

Specific binding members of the present invention can be used in methods of diagnosis and treatment of tumours in human or animal subjects.

When used in diagnosis, specific binding members of the invention may be labelled with a detectable label, for example a radiolabel such as $^{131}$I or $^{99}$Tc, which may be attached to specific binding members of the invention using conventional chemistry known in the art of antibody imaging. Labels also include enzyme labels such as horseradish peroxidase. Labels further include chemical moieties such as biotin which may be detected via binding to a specific cognate detectable moiety, e.g., labelled avidin.

Specific binding members of the invention may be labelled with a functional label. Functional labels include substances which are designed to be targeted to the site of cancer to cause destruction thereof. Such functional labels include toxins such as ricin and enzymes such as bacterial carboxypeptidase or nitroreductase, which are capable of converting prodrugs into active drugs. In addition, the specific binding members may be attached or otherwise associated with chemotherapeutic or cytotoxic agents, such as maytansines (DM1 and DM4), onides, auristatins, calicheamicin, duocamycin, doxorubicin or radiolabels, such as $^{90}$Y or $^{131}$I.

Furthermore, the specific binding members of the present invention may be administered alone or in combination with other treatments, either simultaneously or sequentially, dependent upon the condition to be treated. Thus, the present invention further provides products containing a specific binding member of the present invention and an active agent as a combined preparation for simultaneous, separate or sequential use in the treatment of a tumour. Active agents may include chemotherapeutic or cytotoxic agents including, 5-Fluorouracil, cisplatin, Mitomycin C, oxaliplatin and tamoxifen, which may operate synergistically with the binding members of the present invention. Other active agents may include suitable doses of pain relief drugs such as non-steroidal anti-inflammatory drugs (e.g., aspirin, paracetamol, ibuprofen or ketoprofen) or opitates such as morphine, or anti-emetics.

Whilst not wishing to be bound by theory, the ability of the binding members of the invention to synergise with an active agent to enhance tumour killing may not be due to immune effector mechanisms but rather may be a direct consequence of the binding member binding to cell surface bound Fuc-GM1 gangliosides. Cancer immunotherapy, involving antibodies to immune checkpoint molecules, have shown effectiveness to various malignances and in combinations with different immune-oncology treatment modalities.

Specific binding members of the present invention will usually be administered in the form of a pharmaceutical composition, which may comprise at least one component in addition to the specific binding member. The pharmaceutical composition may comprise, in addition to active ingredient, a pharmaceutically acceptable excipient, diluent, carrier, buffer, stabiliser or other materials well known to those skilled in the art. Such materials should be non-toxic and should not interfere with the efficacy of the active ingredient. The precise nature of the carrier or other material will depend on the route of administration, which may be oral, or by injection, e.g., intravenous. It is envisaged that injections will be the primary route for therapeutic administration of the compositions although delivery through a catheter or other surgical tubing is also used. Some suitable routes of administration include intravenous, subcutaneous, intraperitoneal and intramuscular administration. Liquid formulations may be utilised after reconstitution from powder formulations.

For intravenous injection, or injection at the site of affliction, the active ingredient will be in the form of a parenterally acceptable aqueous solution which is pyrogen-free and has suitable pH, isotonicity and stability. Those of relevant skill in the art are well able to prepare suitable solutions using, for example, isotonic vehicles such as Sodium Chloride Injection, Ringer's Injection, Lactated Ringer's Injection. Preservatives, stabilisers, buffers, antioxidants and/or other additives may be included, as required.

Pharmaceutical compositions for oral administration may be in tablet, capsule, powder or liquid form. A tablet may comprise a solid carrier such as gelatin or an adjuvant. Liquid pharmaceutical compositions generally comprise a liquid carrier such as water, petroleum, animal or vegetable oils, mineral oil or synthetic oil. Physiological saline solution, dextrose or other saccharide solution or glycols such as ethylene glycol, propylene glycol or polyethylene glycol may be included. Where the formulation is a liquid it may be, for example, a physiologic salt solution containing non-phosphate buffer at pH 6.8-7.6, or a lyophilised powder.

The composition may also be administered via microspheres, liposomes, other microparticulate delivery systems or sustained release formulations placed in certain tissues including blood. Suitable examples of sustained release carriers include semi-permeable polymer matrices in the form of shared articles, e.g., suppositories or microcapsules. Implantable or microcapsular sustained release matrices include polylactides (U.S. Pat. No. 3,773,919; EP-A-0058481) copolymers of L-glutamic acid and gamma ethyl-L-glutamate (Sidman et al. 1983), poly(2-hydroxyethyl-methacrylate). Liposomes containing the polypeptides are prepared by well-known methods: DE 3,218, 121A; (Eppstein et al. 1985); (Hwang, Luk, and Beaumier 1980); EP-A-0052522; EP-A-0036676; EP-A-0088046; EP-A-0143949; EP-A-0142541; JP-A-83-11808; U.S. Pat. Nos. 4,485,045 and 4,544,545. Ordinarily, the liposomes are of the small (about 200-800 Angstroms) unilamellar type in which the lipid content is greater than about 30 mol. % cholesterol, the selected proportion being adjusted for the optimal rate of the polypeptide leakage. The composition may be administered in a localised manner to a tumour site or other desired site or may be delivered in a manner in which it targets tumour or other cells.

The compositions are preferably administered to an individual in a "therapeutically effective amount", this being sufficient to show benefit to the individual. The actual amount administered, and rate and time-course of administration, will depend on the nature and severity of what is being treated. Prescription of treatment, e.g., decisions on dosage etc., is within the responsibility of general practitioners and other medical doctors, and typically takes account of the disorder to be treated, the condition of the individual patient, the site of delivery, the method of administration and other factors known to practitioners. The compositions of the invention are particularly relevant to the treatment of existing tumours, especially cancer, and in the prevention of the recurrence of such conditions after initial treatment or surgery. Examples of the techniques and protocols mentioned above can be found in Remington's Pharmaceutical Sciences, 16th edition, Oslo, A. (ed), 1980 (Remington 1980).

The optimal dose can be determined by physicians based on a number of parameters including, for example, age, sex, weight, severity of the condition being treated, the active ingredient being administered and the route of administration. In general, a serum concentration of polypeptides and antibodies that permits saturation of receptors is desirable. A concentration in excess of approximately 0.1 nM is normally sufficient. For example, a dose of 100 mg/m$^2$ of antibody provides a serum concentration of approximately 20 nM for approximately eight days.

As a rough guideline, doses of antibodies may be given weekly in amounts of 10-300 mg/m$^2$. Equivalent doses of antibody fragments should be used at more frequent intervals in order to maintain a serum level in excess of the concentration that permits saturation of the Fuc-GM1 carbohydrate. The dose of the composition will be dependent upon the properties of the binding member, e.g., its binding activity and in vivo plasma half-life, the concentration of the polypeptide in the formulation, the administration route, the site and rate of dosage, the clinical tolerance of the patient involved, the pathological condition afflicting the patient and the like, as is well within the skill of the physician. For example, doses of 300 µg of antibody per patient per administration are preferred, although dosages may range from about 10 µg to 6 mg per dose. Different dosages are utilised during a series of sequential inoculations; the practitioner may administer an initial inoculation and then boost with relatively smaller doses of antibody.

This invention is also directed to optimised immunisation schedules for enhancing a protective immune response against cancer.

The binding members of the present invention may be generated wholly or partly by chemical synthesis. The binding members can be readily prepared according to well-established, standard liquid or, preferably, solid-phase peptide synthesis methods, general descriptions of which are broadly available (see, for example, in J. M. Stewart and J. D. Young, 1984 (Stewart and Young 1984), in M. Bodanzsky and A. Bodanzsky, 1984 (Bodanzsky and Bodanzsky 1984) or they may be prepared in solution, by the liquid phase method or by any combination of solid-phase, liquid phase and solution chemistry, e.g., by first completing the respective peptide portion and then, if desired and appropriate, after removal of any protecting groups being present, by introduction of the residue X by reaction of the respective carbonic or sulfonic acid or a reactive derivative thereof.

Another convenient way of producing a binding member according to the present invention is to express the nucleic acid encoding it, by use of nucleic acid in an expression system.

The present invention further provides an isolated nucleic acid encoding a specific binding member of the present invention. Nucleic acid includes DNA and RNA. In a preferred aspect, the present invention provides a nucleic acid which codes for a specific binding member of the invention as defined above. Examples of such nucleic acid are shown in FIGS. 2 and 3. The skilled person will be able to determine substitutions, deletions and/or additions to such nucleic acids which will still provide a specific binding member of the present invention.

The present invention also provides constructs in the form of plasmids, vectors, transcription or expression cassettes which comprise at least one nucleic acid as described above. The present invention also provides a recombinant host cell which comprises one or more constructs as above. As mentioned, a nucleic acid encoding a specific binding member of the invention forms an aspect of the present invention, as does a method of production of the specific binding member which method comprises expression from encoding nucleic acid. Expression may conveniently be achieved by culturing under appropriate conditions recombinant host cells containing the nucleic acid. Following production by expression, a specific binding member may be isolated and/or purified using any suitable technique, then used as appropriate.

Systems for cloning and expression of a polypeptide in a variety of different host cells are well known. Suitable host cells include bacteria, mammalian cells, yeast and baculovirus systems. Mammalian cell lines available in the art for expression of a heterologous polypeptide include Chinese hamster ovary cells, HeLa cells, baby hamster kidney cells, NSO mouse melanoma cells and many others. A common, preferred bacterial host is *E. coli*. The expression of antibodies and antibody fragments in prokaryotic cells such as *E. coli* is well established in the art. For a review, see for example Plückthun, 1991 (Pluckthun 1991). Expression in eukaryotic cells in culture is also available to those skilled in the art as an option for production of a specific binding member, see for recent review, for example Reff, 1993 (Reff 1993); Trill et al., 1995 (Trill, Shatzman, and Ganguly 1995).

Suitable vectors can be chosen or constructed, containing appropriate regulatory sequences, including promoter sequences, terminator sequences, polyadenylation sequences, enhancer sequences, marker genes and other sequences as appropriate. Vectors may be plasmids, viral e.g., 'phage, or phagemid, as appropriate. For further details see, for example, Sambrook et al., 1989 (Sambrook 1989). Many known techniques and protocols for manipulation of nucleic acid, for example in preparation of nucleic acid constructs, mutagenesis, sequencing, introduction of DNA into cells and gene expression, and analysis of proteins, are described in detail in Ausubel et al., 1992 (Ausubel 1992).

Thus, a further aspect of the present invention provides a host cell containing nucleic acid as disclosed herein. A still further aspect provides a method comprising introducing such nucleic acid into a host cell. The introduction may employ any available technique. For eukaryotic cells, suitable techniques may include calcium phosphate transfection, DEAE-Dextran, electroporation, liposome-mediated transfection and transduction using retrovirus or other virus, e.g., vaccinia or, for insect cells, baculovirus. For bacterial cells, suitable techniques may include calcium chloride transformation, electroporation and transfection using bacteriophage. The introduction may be followed by causing or allowing expression from the nucleic acid, e.g., by culturing host cells under conditions for expression of the gene.

The nucleic acid of the invention may be integrated into the genome (e.g., chromosome) of the host cell. Integration may be promoted by inclusion of sequences which promote recombination with the genome, in accordance with standard techniques.

The present invention also provides a method which comprises using a construct as stated above in an expression system in order to express a specific binding member or polypeptide as above.

Preferred features of each aspect of the invention are as for each of the other aspects mutatis mutandis. The prior art documents mentioned herein are incorporated to the fullest extent permitted by law.

The FL133/4 mAbs disclosed herein exhibited potent in vitro cytotoxic activity through ADCC and CDC.

The invention will now be described further in the following non-limiting examples and accompanying drawings, in which:

FIG. 1. Biosynthesis pathway of Fuc-GM1 glycolipid. Cer, ceramide; Fuc, fucose; FucGm1, fucosyl-GM1; Gal, galactose; GalNac, N-acetylgalactosamine; Glc, glucose; LacCer lactosylceramide; SA, sialic acid.

FIG. 2a: Amino acid and nucleotide sequence of the mouse FL133.63 IgG3 heavy chain variable domain. Numbers refer to the standardised IMGT system for the numbering of antibody sequences (Lefranc et al. 2009). FIG. 2b: Amino acid and nucleotide sequence of mouse FL133.67 IgG3 heavy chain variable domain. Numbers refer to the standardised IMGT system for the numbering of antibody sequences (Lefranc et al. 2009). FIG. 2c: Amino acid and nucleotide sequence of mouse FL134.33 IgG1 heavy chain. Numbers refer to the standardised IMGT system for the numbering of antibody sequences (Lefranc et al. 2009). FIG. 2d: Amino acid and nucleotide sequence of mouse FL133.63 kappa chain. Numbers refer to the standardised IMGT system for the numbering of antibody sequences (Lefranc et al. 2009). FIG. 2e: Amino acid and nucleotide sequence of mouse FL133.67 kappa chain. Numbers refer to the standardised IMGT system for the numbering of antibody sequences (Lefranc et al. 2009). FIG. 2f: Amino acid and nucleotide sequence of mouse FL134.33 kappa chain. Numbers refer to the standardised IMGT system for the numbering of antibody sequences (Lefranc et al. 2009).

FIG. 3a: Amino acid and nucleotide sequence of mouse FL134.33 heavy chain variable region chimerised to human IgG1 heavy chain constant region. FIG. 3b: Amino acid and nucleotide sequence of mouse FL134.33 kappa chain variable region chimerised to human kappa chain constant region.

Figure 4:
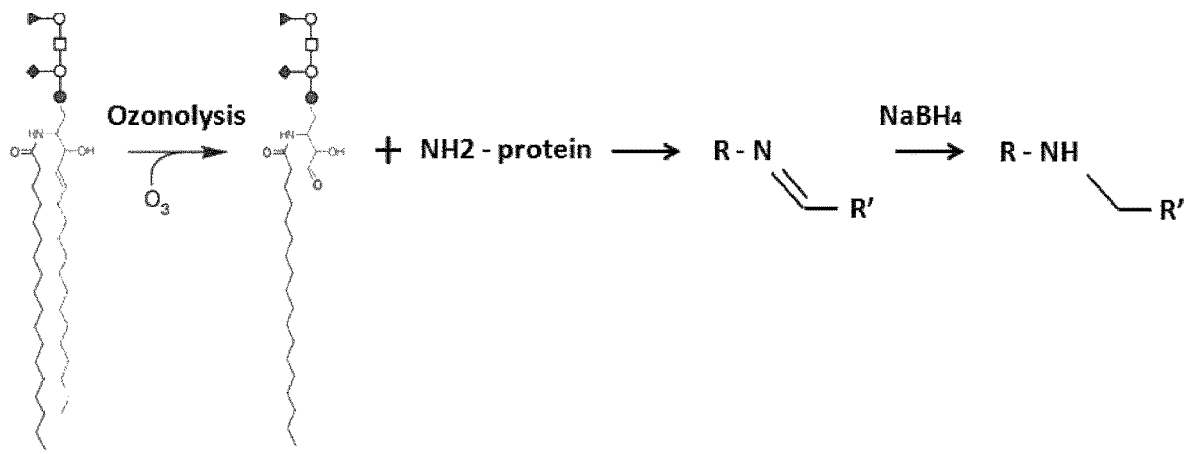

FIG. 4: Schematic illustration of ozonolysis of GSL fucosyl GM1 and its subsequent attachment to a protein carrier via reductive amination. Reactive ozone attacks the double bond in the sphingosine moiety of the GSL and generates stable a free aldehyde group which can then be used to attach the GSL to protein by process of reductive amination. Here, an aldehyde reacts with the primary amine to first form an unstable Shiff bases which needs to be further reduced to form stable secondary amine.

Figure 5:
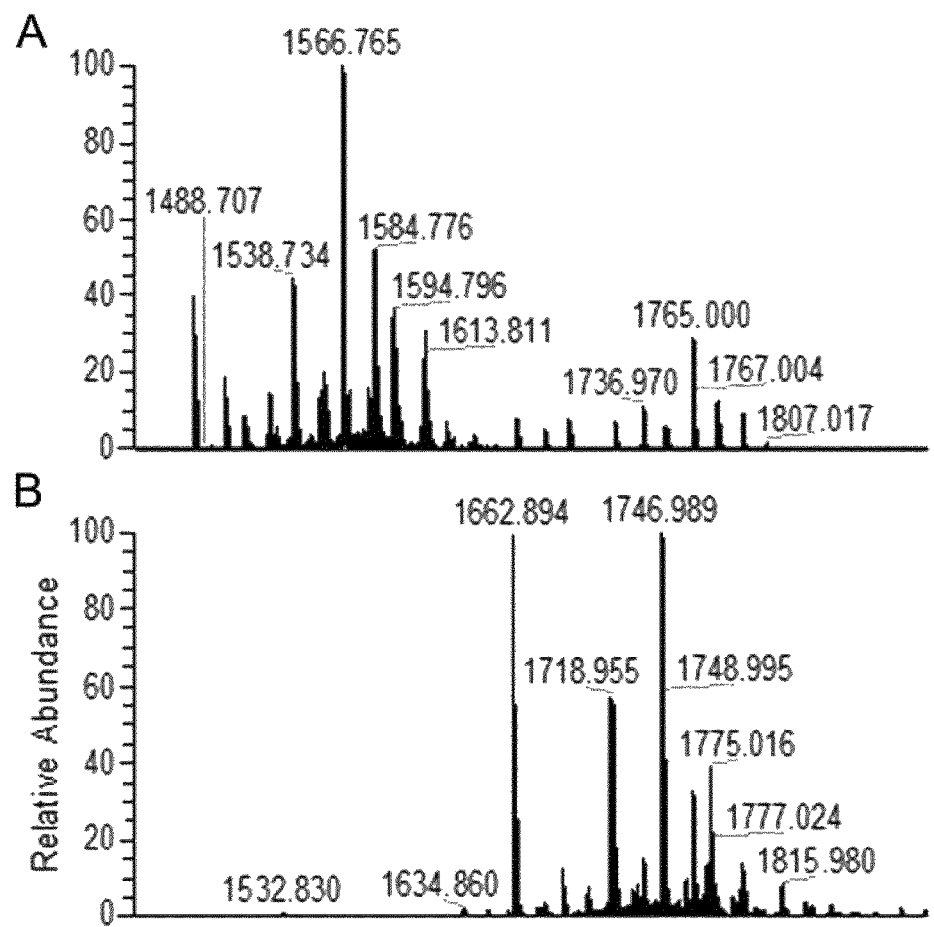

FIG. 5: Fourier Transform Mass Spectrophometric analysis of ozonolysed and original fucosyl GM1. A) ozonolysed and B) original fucosyl GM1 tested by FTMS and analysed using High Resolution Mass Spectrometry system, Exactive. Analysis shows a variety of fucosyl GM1 species depending on the lengths of the fatty acyl chains. Fucosyl GM1 ions were singly charged. Legends show molecular weights of the species present.

FIG. 6: Detection of HSA-fucosyl GM1 conjugates by ELISA and western blot analysis. A) Three samples of HSA-fucosyl GM1 conjugates detected by ELISA, reading absorbance at 450 nm against 620 nm background. Plates were coated with either HSA or HSA-fucosyl GM1 conjugates. Primary antibodies were either mouse serum containing anti-HSA IgG antibodies (MOD6 6L) or anti-fucosyl GM1 mAb F12. Primary antibodies were detected using anti-mouse IgG-biotin and Streptavidin-HRP. Wells, where no primary antibodies were added served as negative controls. B) Western blot analysis of the three samples of HSA-fucosyl GM1 conjugates detected either by mouse serum containing anti-HSA IgG antibodies (MOD6 6L) or anti-fucosyl GM1 mAb F12. Lanes 1-4 were used as controls where lane 1=original HSA, lane 2=HSA which was taken through the reactive amination procedure but no ganglioside was added, lane3=HSA-Lewis Y conjugate, lane 4=HSA-GD3 conjugate, lane 5=HSA-fucosyl GM1 conjugate sample 1, lane 6=HSA-fucosyl GM1 conjugate sample 2 and lane 7=HSA-fucosyl GM1 conjugate sample 3. Primary antibodies were detected using anti-mouse IgG-HRP. An identical membrane blotted with secondary antibodies only was used as negative control. Positive bands were developed by ECL.

Figure 7:
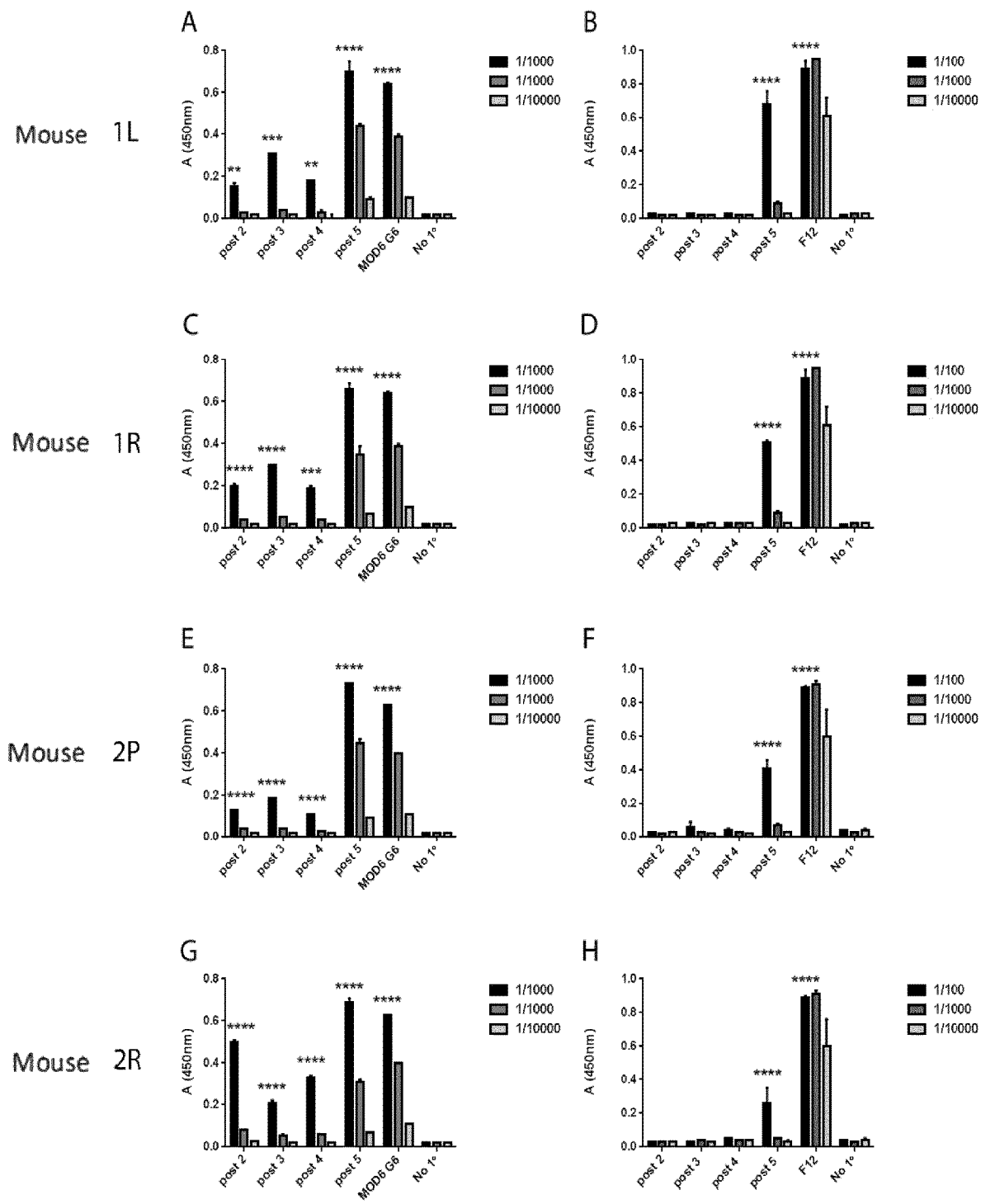

FIG. 7: Binding of mice sera IgG to HSA-Fuc-GM1 conjugate and purified Fuc-GM1. Mice sera IgG were screened for binding to either HSA-Fuc-GM1 conjugate (A, C, E, G) or to purified Fuc-GM1 (B, D, F, H). Mice sera were analysed by ELISA, reading absorbance at 450 nm against 620 nm background. Secondary antibody only was used as negative control. Mouse serum containing anti-HSA IgG antibodies and anti-Fuc-GM1 mAb F12 were used as positive controls. * represents p<0.05 compared to no primary antibody, analysed 1/100 dilution only.

Figure 8:
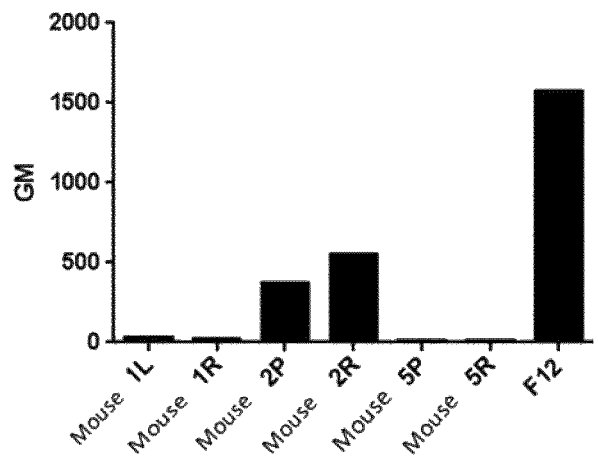

FIG. 8: Binding of mouse serum IgG to the surface of DMS79 cells. Binding of mouse sera IgG to the cell surface of the Fuc-GM1 positive cell line DMS79. Cells were first incubated with mouse sera at a 1/100 dilution. Binding of the primary antibodies were detected with anti-mouse IgG FITC at 10 µg/ml. Cells were analysed by flow cytometry. Isotype IgG1 was used as negative control (data not shown) and mAb F12 was used as positive control, both used at 10 µg/ml. The intensity of antibody binding is expressed by geometric mean.

Figure 9:
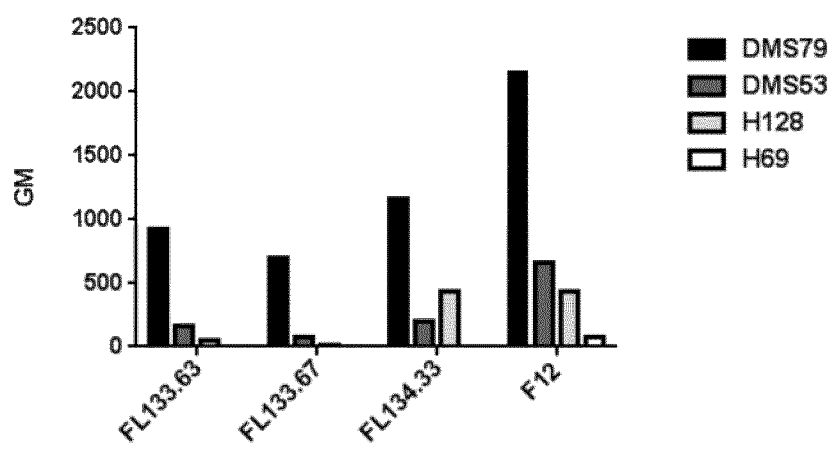

FIG. 9. Binding of Fuc-GM1-specific mAbs to the cell surface of Fuc-GM1 expressing cells. Binding of purified mAbs FL133.63, FL133.67 and FL134.33 to the cell surface of the Fuc-GM1 positive cell lines DMS79, DMS53, H128 and H69 was assessed by indirect immunofluorescence and flow cytometric analysis. Surface binding was detected with anti-mouse IgG FITC. Isotype IgG1 was used as negative control (data not shown) and mAb F12 was used as positive control. The intensity of antibody binding is expressed as geometric mean.

Figure 10:
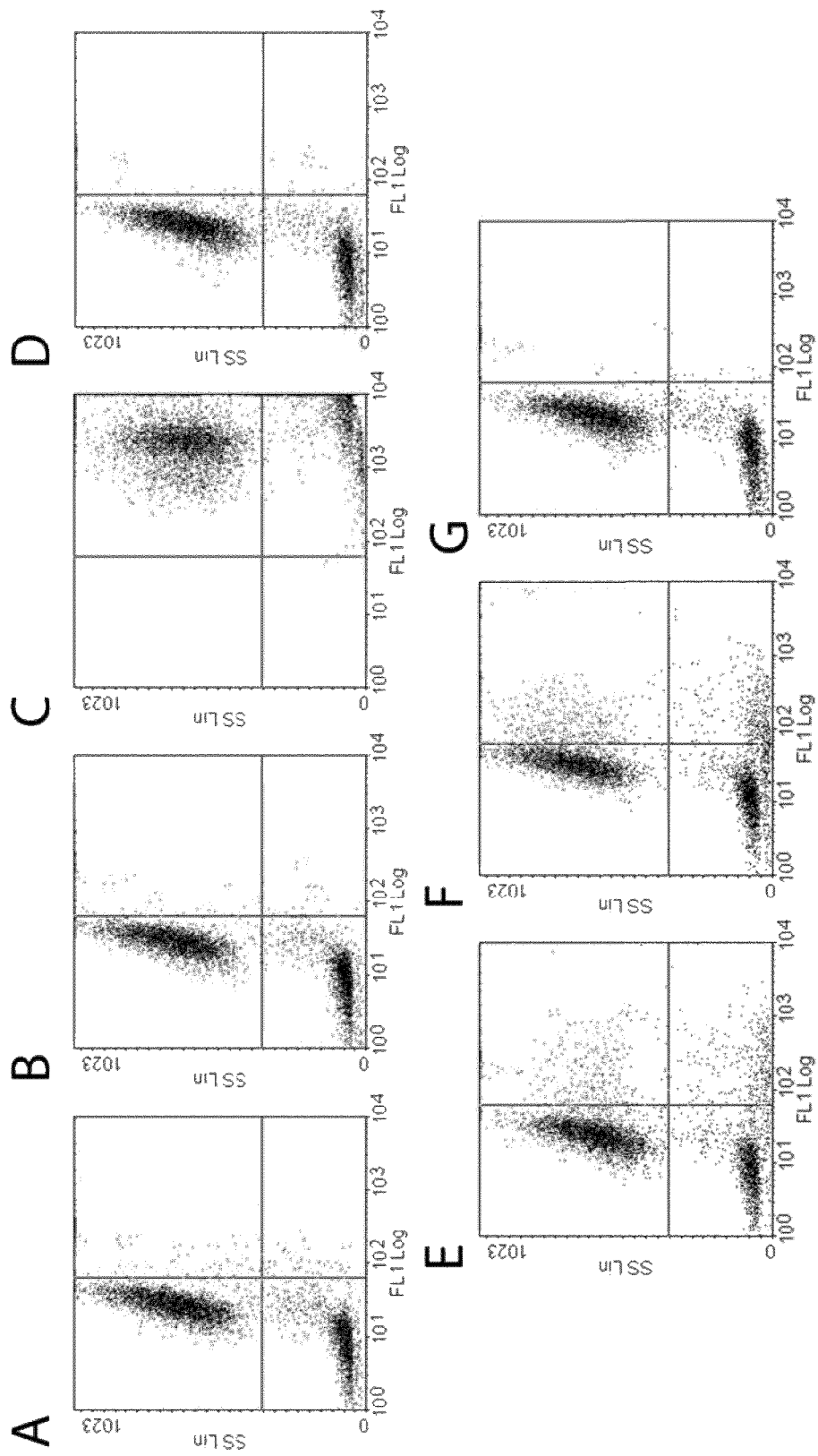

FIG. 10: Binding of Fuc-GM1-specific mAbs to the whole blood of a healthy human volunteers. Binding of A) isotype IgG1, B) isotype IgG3, C) anti-MHC class 1 mAb, D) mAb F12, E) mAb FL133.63, F) mAb FL133.67 and G) mAb FL134.33 to the whole blood of a healthy human volunteer assessed by indirect immunofluorescence and flow cytometic analysis. Whole blood was first incubated with primary antibodies at 10 µg/ml, which was then detected with anti-mouse IgG FITC at 10 µg/ml. Prior to analysis, red blood cells were lysed. Mouse IgG1 isotype, mouse IgG3 isotype and mAb F12 were used as negative controls. Anti-MHC class I mAb was used as positive control. Dot plot quadrants were set using the negative controls.

Figure 11:
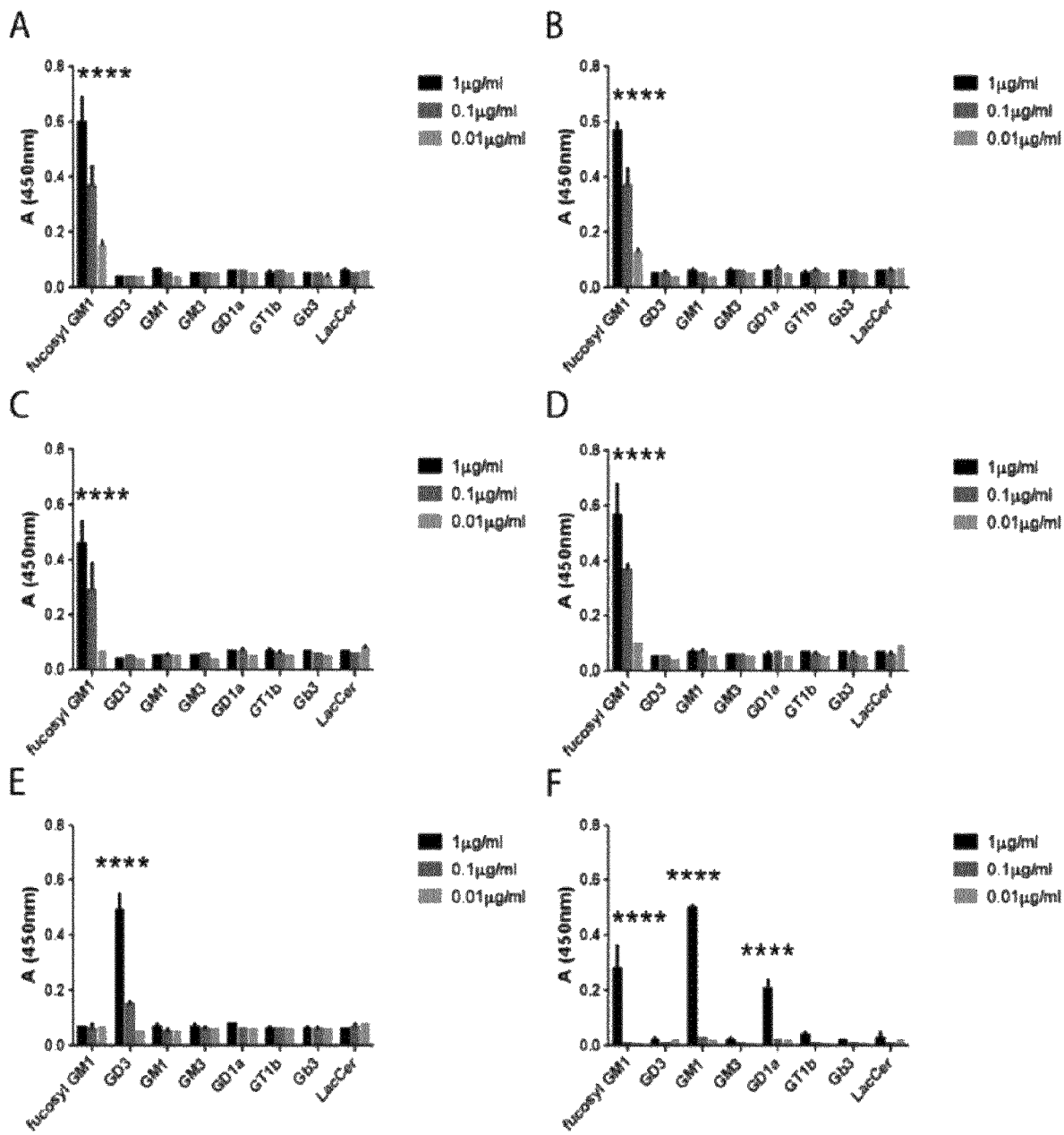

FIG. 11: Binding of Fuc-GM1 mAbs to various purified glycolipids. Binding of A) FL133.63, B) FL133.67, C) FL134.33 to various purified gangliosides analysed by ELISA, reading absorbance at 450 nm against 620 nm background. Binding of the primary antibodies was detected by biotinylated anti-mouse IgG and Streptavidin-HRP. D) F12, E) anti-GD3 mAb R24 and F) anti-GM1 toxin CTxB-HRP were used as positive controls. MAbs for the remaining gangliosides have not yet been developed. * represents p<0.05 compared to lactosylceramide, analysed 1/100 dilution only.

Figure 12:
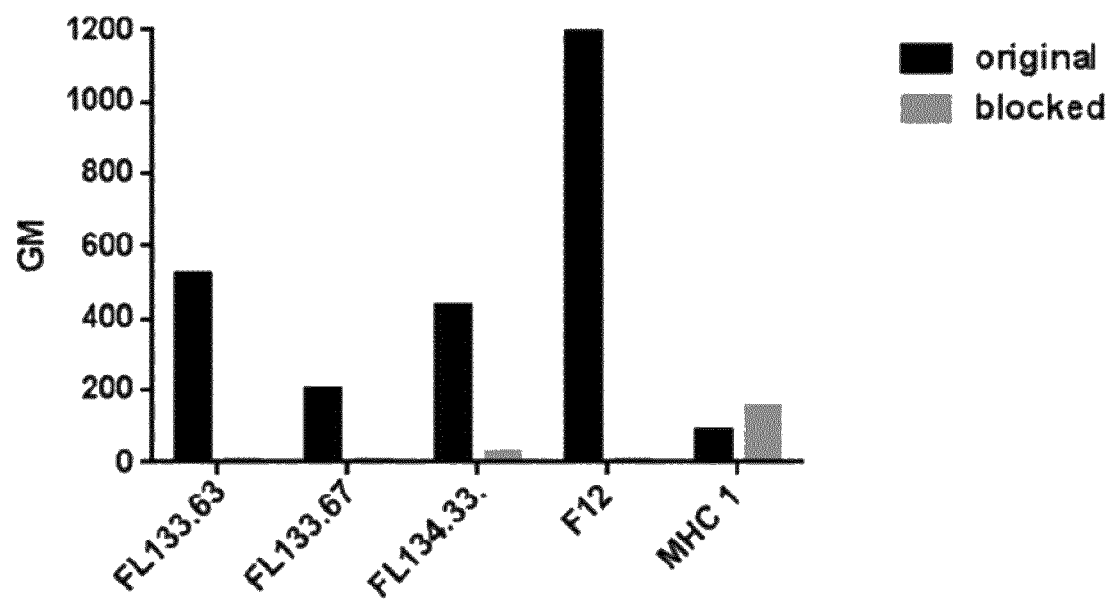

FIG. 12: Competitive binding of Fuc-GM1 mAbs pre-incubated with purified ganglioside Fuc-GM1 to the DMS79 cell line. 2 µg of mAbs were first incubated with 5 µg of purified Fuc-GM1 for 1 hour at room temperature. Binding to the cell surface of DMS79 cells was assayed by indirect immunofluorescence and flow cytometic analysis. Isotype IgG1 (data not shown) and MHC I were used as negative controls. F12 was used as positive control. Primary antibodies that were not pre-incubated with purified Fuc-GM1 were also used as positive controls. The intensity of antibody binding is expressed by geometric mean.

FIG. 13: Binding of FL133.63 and FL134.33 were screened against The Consortium for Functional Glycomics glycan array which is composed of 610 mammalian glycan targets. The fine specificity between a) FL133.63, b) FL134.33 are compared.

Figure 14:
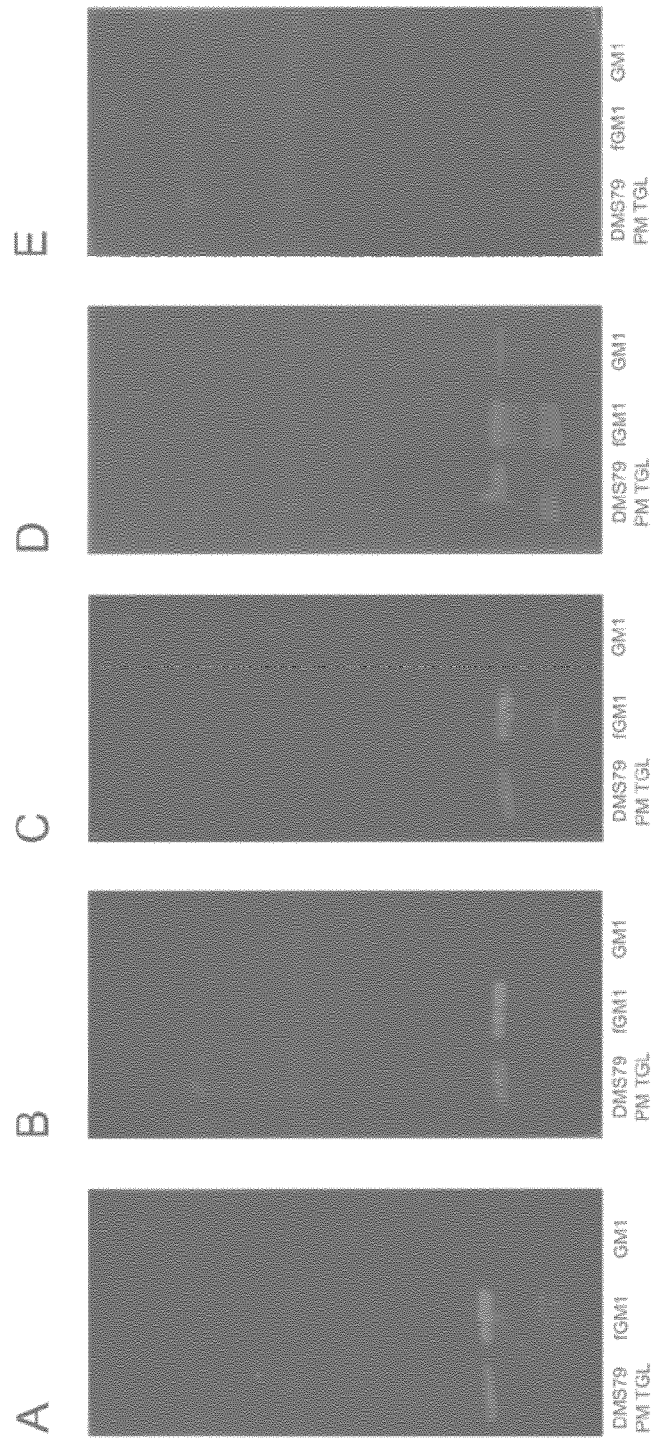

FIG. 14: Binding of Fuc-GM1 mAbs to purified Fuc-GM1 and DMS79 PM TGL. Binding of A) FL133.63, B) FL133.67 and C) FL134.33 to DMS 79 PM TGL ($1 \times 10^7$ cells per lane), to purified gangliosides Fuc-GM1 (5 µg per lane) and GM1 (5 µg per lane). Binding was analysed by TLC analysis with immunodetection. Primary antibodies were used at 1 µg/ml. Binding of primary antibodies was detected by IRDye 680CW anti-mouse IgG used at 1/10 000. D) TLC plate immunoblotted with anti-Fuc-GM1 mAb F12 was used as positive control. E) TLC plate immunoblotted with secondary antibody only was used as negative control.

Figure 15:
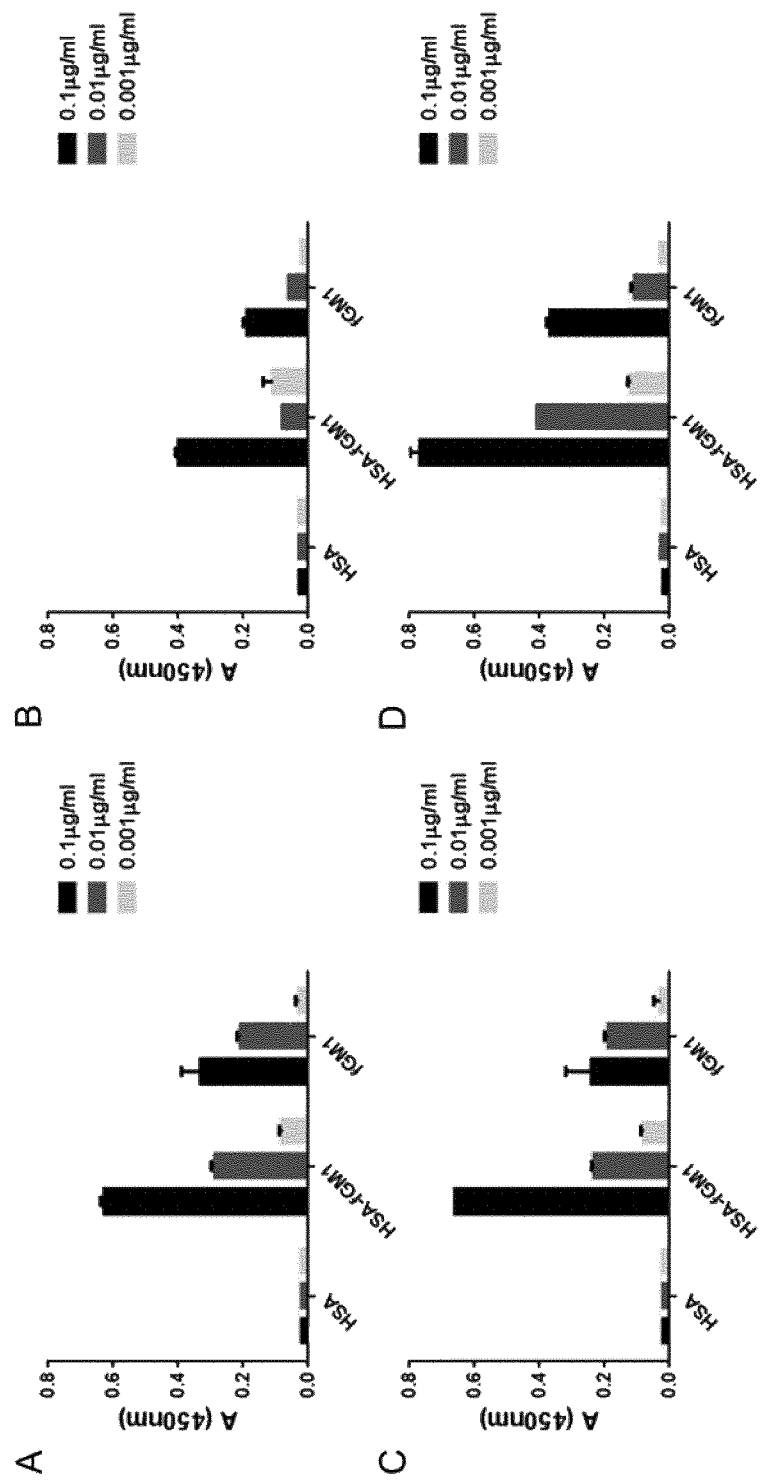

FIG. 15: Binding of anti-Fuc-GM1 mAbs to HSA-Fuc-GM1 conjugates. A) mAb FL133.63, B) mAb FL133.67, C) mAb FL134.33 D) mAb F12 binding to HSA-Fuc-GM1 conjugates was analysed by ELISA, reading absorbance at 450 nm against 620 nm background. Primary antibodies were detected using anti-mouse IgG biotin and streptavidin HRP conjugate. Original HSA was used as negative control. MAb F12 was used as positive control.

Figure 16:
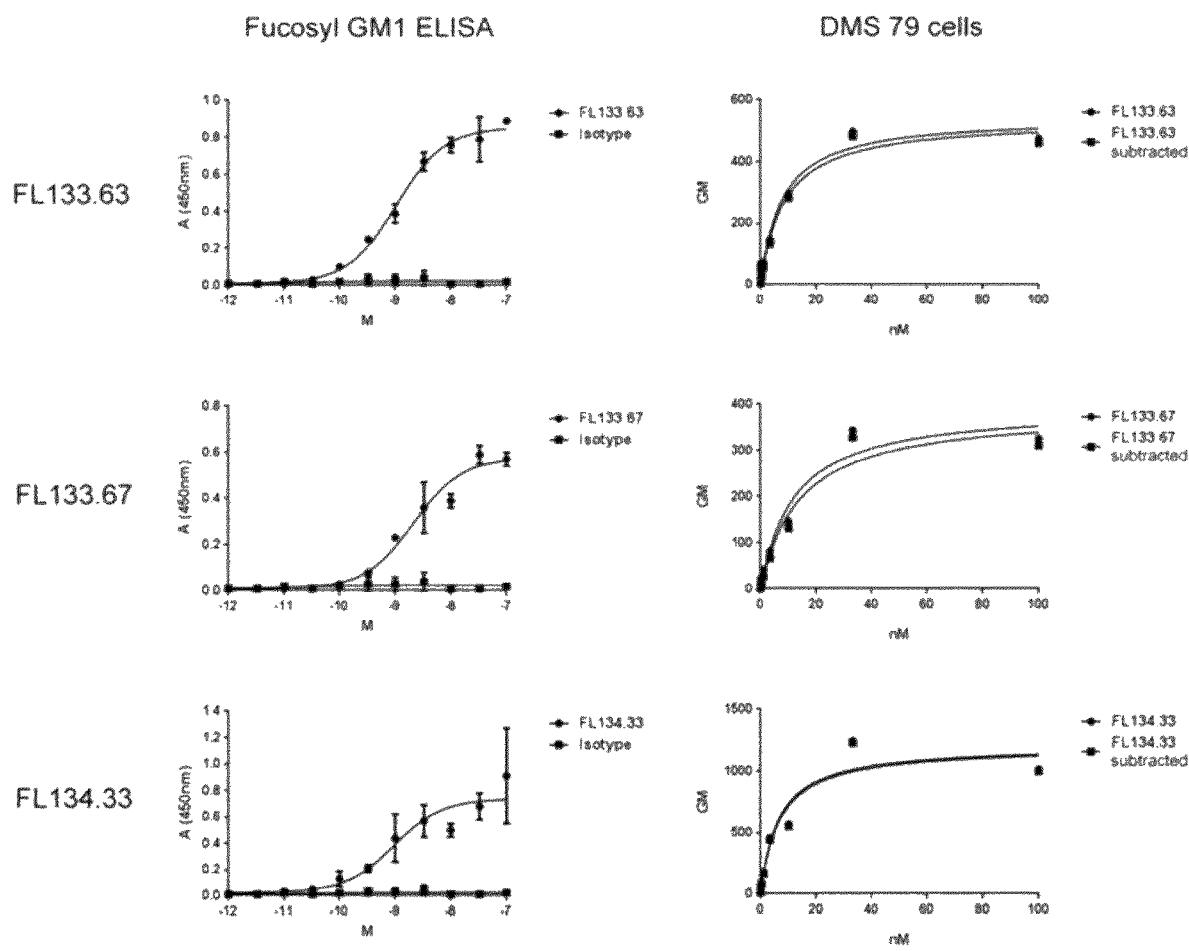

FIG. 16: Binding of anti-Fuc-GM1 mAbs to purified Fuc-GM1 and DMS79 cells. Anti-Fuc-GM1 mAbs (FL133.63, FL133.67 and FL134.33) were assessed for binding by ELISA to purified Fuc-GM1 in the concentration range 100-0.001 nM. Isotype IgG1 was used as a negative control. EC50 values were established using non-linear dose response curve fitting (GraphPad Prism). Using the same concentration range, the mAbs were also assessed for binding to SCLC cell line DMS79 by flow cytometry. Isotype IgG1 was used as a negative control. Kd values were established using non-linear binding curve fitting (one site-specific binding) in Graphpad Prism.

FIG. 17: Fuc-GM1 mAb mediated ADCC and CDC of DMS79 cells. MAb FL133.63, FL133.67 and FL134.33 mediated A) ADCC and B) CDC of the Fuc-GM1 positive cell line DMS79. Anti-Lewiso$^{y/b}$ mAb SC101 was used as the positive control. * represents p<0.05.

Figure 18:
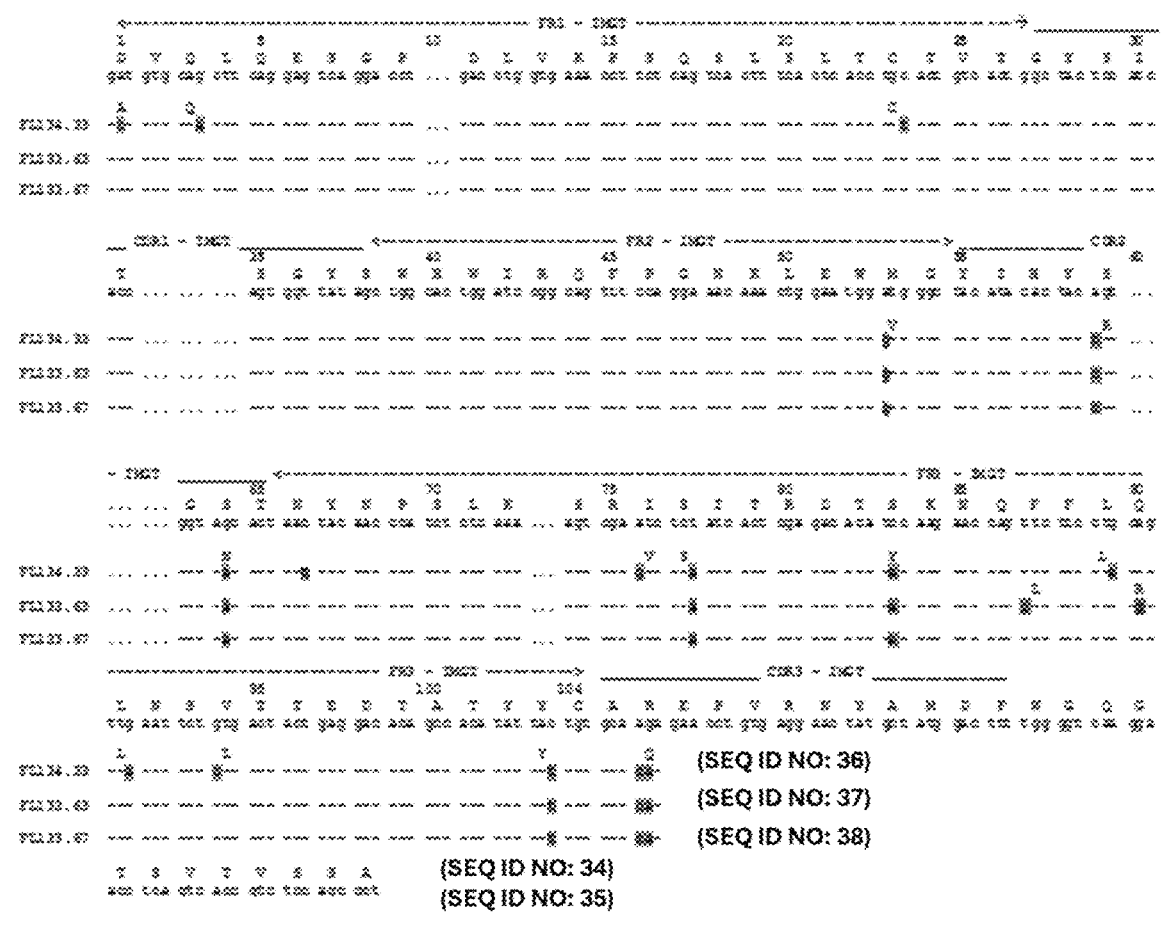

FIG. 18: Sequences of the VH regions of mAbs FL134.33, FL133.63 and FL133.67. The germline antibody sequence is shown as amino acid codons. Below, mutations in each Fuc-GM1 specific antibody are shown.

Figure 19:
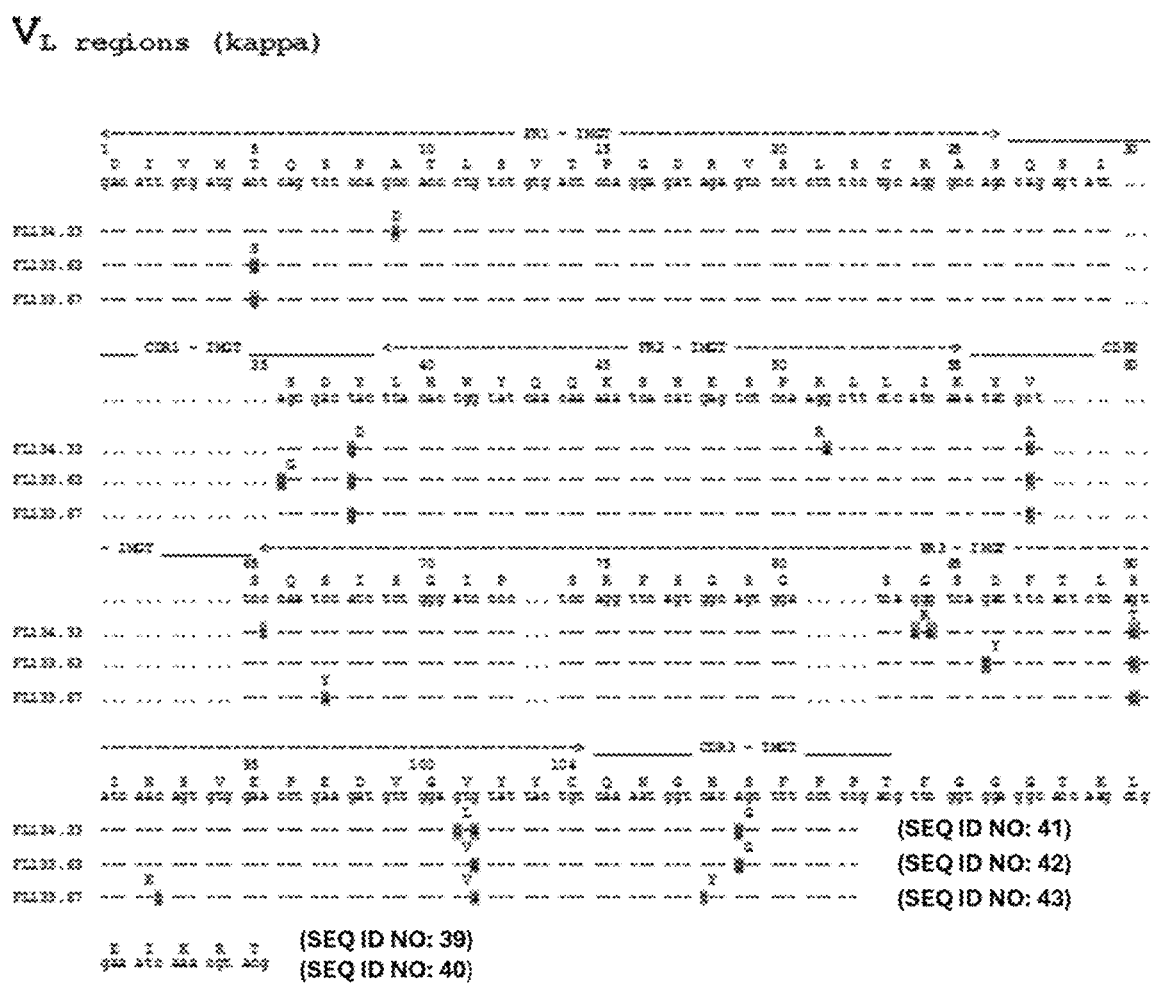

FIG. 19: Sequences of the VL regions of mAbs FL134.33, FL133.63 and FL133.67. The germline antibody sequence is shown as amino acid codons. Below, mutations in each Fuc-GM1 specific antibody are shown.

Figure 20:
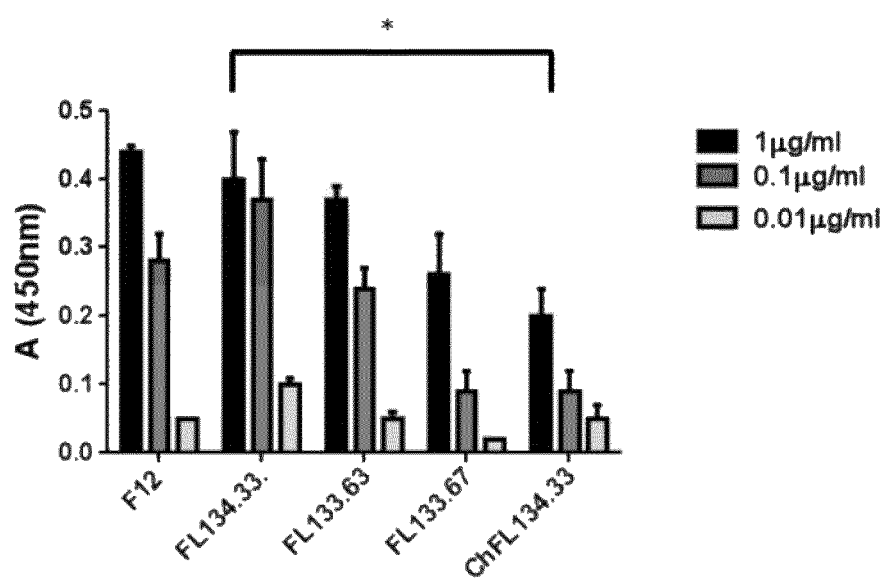

FIG. 20: Specificity of antibodies binding to purified antigens by ELISA. Fuc-GM1 coated plates were incubated with antibodies and detected using anti-mouse Fc specific or anti-human γ chain specific IgG biotin and streptavidin HRP. MAb F12 was used as positive control.

FIG. 21: Assessment of cell surface binding of antibodies by indirect immunofluorescence. mAbs FL134.33, FL133.63, FL133.67 and CH134.33 were incubated with cells and binding was detected using anti-mouse Fc specific or anti-human γ chain specific IgG FITC. A) histograms generated by flow cytometry with cell lines B) Bar chart of the Gm values for all cell lines. MAb F12 was used as positive control.

EXAMPLES

Methods

All experiments were carried out following applicable safety regulations. Laboratory methods were performed by following standard operating procedures with modifications applied to specific conditions.

Immunisations

Animal work was carried out under a Home Office project license. All reagents used were purchased from Sigma-Aldrich (Poole, UK) unless otherwise stated. All immunisation experiments were performed using either Balb/c or CD1 mice aged between 6 and 8 weeks. The mice were bred and maintained in specified pathogen-free conditions by the staff at the Biomedical Services Unit at the University of Nottingham. The mice were immunised with the antigen diluted in a maximum of 100 µl PBS, either subcutaneously (s.c.) or intraperitoneally (i.p.), using a 0.5 ml insulin syringe. The frequency of injections differed in each immunisation and is outlined in the appropriate Result chapters. To assess the mouse antibody response to the immunisation, 7 days after each immunisation the mice were bled via the tail vein. The bloods were centrifuged twice at maximum speed (17968×g) for 2 min (SIGMA, 1-15PK Microfuge, Osterode am Harz, Germany) to remove the red blood cells and the serum was stored at −20° C. until further use.

Cell culture

All tissue culture was performed aseptically in a class II safety cabinet. The human-derived cancer cell lines were maintained in Roswell Park Memorial Institute media (RPMI 1640) supplemented with 10% heat-inactivated foetal bovine serum (HI-FBS) except H128, which was maintained in RPMI 1640 supplemented with 20% HI-FBS, and DMS53, which was maintained in Weymouth media supplemented with 10% HI-FBS. Newly purchased cell lines were delivered on dry ice, keeping them frozen at −80° C. To remove the cell culture freezing media, the cells were thawed in a 37° C. water bath and transferred to a 30 ml universal container (Sterilin, Newport, UK) together with 10 ml of appropriate culture media. Cells were centrifuged at 1000 g for 5 min. The supernatant was then removed and the cell pellet was resuspended in 7 ml of the appropriate culture media. Cells were then transferred into a T25 Cellstar cell culture flask (VWR, Lutterworth, UK) and incubated at 37° C. in 5% $CO_2$. Once the cells reached about 80% confluency, they were either split or transferred into a bigger cell culture flask. In the case of the adherent cell lines, the spent culture media was aspirated from the flask and 5 ml of 1× trypsin/EDTA was added. The trypsinised cells were incubated at 37° C. until the cell detached (usually around 10 min). Detached cells were then collected into a 30 ml universal container and 5 ml of culture media was added to reduce the effect of trypsin on the cells. Cells were then centrifuged at 1000 g for 5 min. The supernatant was removed and the cell pellet was resuspended with fresh culture media. Cells were then transferred into a T75 Cellstar culture flask. The cells that grow as floating aggregates were split once their culture media was spent (turned from an orange to yellow colour) or once the cells appeared unhealthy/started dying. The cells, including the culture media, were transferred straight into T75 culture flasks and 10 ml of fresh culture media was added. To build up and maintain the stocks of newly purchased cell lines, cells from 80% confluent T75 culture flask were collected by the method described above. The cells were counted using a haemocytometer and trypan blue viability stain applied at 1:1 ratio. Cells were resuspended at $5 \times 10^6$ cells/ml in 5% dimethyl sulphide (DMSO)/appropriate culture media and 1 ml was added per 2 ml microtube (Sarstedt, Leicester, UK). Vials were first placed to −80° C. freezer for a minimum of 24 h and then moved into liquid nitrogen where they were maintained at −170° C.

If large stocks of live cells were needed for various experiments, cells were gradually expanded into T175 culture flasks and maintained in healthy condition by renewing the spent culture media and splitting to ensure log phase growth of the cells. When working with non-adherent cell lines, the cells were transferred into a universal container and let to stand undisturbed for 5 min. This allowed the floating aggregates containing the live cells to settle on the bottom of the universal container and the supernatant containing the dead cells could then be removed. The cell pellet was then resuspended with appropriate culture media and the cells were transferred back into the culture flask.

Antibodies

Anti-HLA-ABC (clone W6/32) and anti-CD44 were purchased from eBiosciences (Hatfield, UK). Anti-CD59 (BRIC 229) was purchased from IBGRL (Bristol, UK). Anti-sialyl Lewis$^a$ (CA19.9), anti-Lewis$^b$ (2-25 Le), anti-Lewisx (P12), anti-GD2 (clone 2Q549), anti-GM2, anti-Gb3, anti-prohibitin (clone 11-14-10) were purchased from Abcam (Cambridge, UK). Anti-NeuGc GM3 (clone M2590) was purchased from COSMO BIO CO., LTD (Tokyo, Japan). Anti-CD46, anti-CD14 (clone M5E2), anti-CD11c (clone B-1y6) and IgG1 isotype were purchased from BD Biosciences (Crawley, UK). Anti-Lewis Y (BR96) was purchased from ATCC (Middlesex, UK). Anti-sialyl Lewis X (KM93) and anti-CA125 (OC125) were purchased from Calbiochem (Darmstadt, Germany). Anti-Globo H (clone MBr1) was purchased from ENZO Life Sciences (Exeter, UK). Anti-Fuc-GM1 (F12) was purchased from Fujirebio (Tokyo, Japan). Anti-transferrin (UNCONJ) was purchased from Invitrogen (Paisley, UK). Anti-EGFR (IF4) and anti-calnexin were purchased from Cell Signalling Technology (Danvers, MA, USA). Anti-EpCAM (BerEP4) was purchased from Dako (Cambridgeshire, UK). Anti-EGFR (Erbitux) and anti-Her2 (Herceptin) were gift from NHS. Anti-GD3 (R24) was a gift from Philip O. Livingston from Memorial Sloan Kettering Cancer Center. Streptavidin-HRPO conjugate was purchased from Invitrogen (Paisley, UK). Rabbit anti-mouse immunoglobulins FITC and swine anti-rabbit IgG1 FITC were purchased from Dako (Cambridgeshire, UK). Streptavidin PE was purchased from eBiosciences (Hatfield, UK). Cholera Toxin, B subunit Biotin was purchased from Stratech Scientific Ltd., (Newmarket, UK). IRDye 680RD donkey anti-mouse and IRDye 800CW Streptavidin were purchased from LI-COR, Nebraska, USA.

Preparation of Antigen

Dry cell pellets (washed once in phosphate buffered saline (PBS)) were stored in a −80° C. freezer until used. To extract the plasma membrane (PM), cell pellets from $2 \times 10^8$ cells were pooled together and manually homogenized in 2 ml of 50 mM mannitol/5 mM Hepes (pH7.4) and 10 mM of calcium chloride solution using successively smaller needles (23 G, 25 G and finally 29 G). The sample was then rested on ice for 20 min and then centrifuged at 3000×g for 15 min to remove the intracellular membranes and the nuclei. The supernatant was moved into polyallomer ultracentrifuge tubes (Beckmann, High Wycombe, UK) and centrifuged at 48,000×g for 30 min at 4° C. to separate the PM containing pellet from the cytosol containing supernatant. The pellet was then resuspended with 200 μl of PBS and stored at −20° C. until used.

PM TGL were extracted by adding 2 ml of methanol and 2 ml of chloroform, either straight to the PM pellet in the polyallomer ultracentrifuge tube or to the PM resuspended in 200 μl PBS. The material was then transferred into 15 ml polypropylene tubes, thoroughly vortexed and allowed to incubate on a roller for 30 min at room temperature (RT). After centrifugation at 2000×g for 10 min, TGL-containing supernatant was collected and incubated at −20° C. overnight. Next day, the sample was centrifuged at the same settings again, the supernatant collected and stored at 4° C.

Adjuvants

To enhance the immune response to antigen, various adjuvants were used during the course of this thesis. α-Gal-Cer (alpha-galactosyl ceramide), α-GalCer analog 7 or α-GalCer analog 8, (ENZO Life Sciences, Exeter, UK) were dried down together with the rest of the lipids during the formulation of the liposomes (10 μg-25 μg per mouse). Anti-mouse CD40 (R&D Systems, Abingdon, UK), type C CpG oligonucleotide and monophosphoryl lipid A from S.mennesota (MPLA) (InvivoGen, San Diego, CA, USA) were used at 10 μg per mouse and were mixed into the already formed liposomes. Freund's complete or incomplete adjuvants were used to enhance immune response to protein antigens. They were mixed with the antigen in 1:1 ratio (v:v).

Conjugation of Purified Ganglioside to Protein

Purified ganglioside was covalently conjugated to HSA by indirect reductive amination in which the aldehyde containing ganglioside reacts with amine (lysine) containing proteins to form a stable amine bond. To introduce the reactive aldehyde group to the ganglioside, the method of ozonolysis was employed as previously described (Song et al., 2011). Reactive ozone was freshly generated from dry air (Air drier MAG-600, Ozone Solutions, Hull, Iowa, US) by ozone generator OZV-8 (Ozone Solutions). Ozone was passed through the glycolipid-containing sample resuspended in a minimal volume of 500 μl of 2:1 chloroform:methanol for 1 min while the blue colour persisted. Then, 50 μl of dimethyl sulphide was added to destroy the residual ozone, and after incubating for 1 hour at room temperature, the solution was dried under a stream of nitrogen. Ozonolysed Fuc-GM1 (Matreya, PA, USA) resuspended in DMSO was added to human serum albumin (HSA) resuspended in carbonate-bicarbonate buffer, pH>9 in 10-times molar excess. 10 μl of 5M sodium borohydride ($H_4BNa$) in 1M NaOH was then added per 1 ml of reaction. Each sample was then incubated for 2 hours at room temperature. Unreacted aldehyde sites were blocked by adding 20 μl of 3M ethanolamine per 1 ml of reaction for 15 min. The conjugates were purified by dialysis against PBS.

Protein-Fuc-GM1 conjugates were analysed by whole protein MALDI—TOF analysis. To prepare the samples, ziptip C4 pipette tips (Millipore, MA, US) were first activated by 50% (v/v) acetonitrile:$H_2O$ solution and then equilibrated with 0.1% TFA in $H_2O$. The sample was then bound to the resin of the ziptip by pipetting up and down 15 times. Sample bound to the resin was then washed with 0.1% TFA in $H_2O$ 15 times and dispensed on MALDI plate by elution solution (Saturated Sinapic Acid in 50% (v/v) acetonitrile:$H_2O$ with 0.1% TFA).

Generation of mAbs

At least one week before the fusion, a number of flasks with NSO myeloma cells were grown in RPMI media supplemented with 10% HI-FCS. The flask containing the healthiest looking cells was selected and re-fed one day before the fusion. The removed spent NSO media was stored at −4° C. On the day of the fusion, all reagents were first heated to 37° C. The NSO cells were harvested and counted 4 times. They were then washed by centrifuging twice at 1000×g for 5 min using serum free RPMI. Immunised mice were sacrificed and the spleen was removed, keeping the incision site sterile using 70% (v/v) ethanol. A single cell suspension was prepared by forcing RPMI medium into the spleen through a needle and by simultaneously applying pressure with a pair of forceps. Splenocytes were then centrifuged at 1000×g for 10 min in RPMI medium and counted 4 times. Splenocytes were then fused with NSO myeloma cells at a 10:1 cell ratio. In more detail, $1\times10^8$ splenocytes and $1\times10^7$ NSO myeloma cells were combined and centrifuged at 1000×g for 5 min. The supernatant was removed and 800 μl of polyethylene glycol 1500, which serves to permeabilize cell plasma membranes, was gently mixed into the cell pellet over 1 min. Then, with gentle mixing, 1 ml of RPMI medium was slowly added to the cells over 1 min. A further 5 ml of RPMI was slowly layered on top of the cells over 5 min. Finally, a further 20 ml RPMI was layered on top. To aid the fusion process, cells were then centrifuged at 1200×g for 7 min. The supernatant was removed, cells were carefully resuspended in RPMI media supplemented with 10% HI-FBS, 5% hypoxanthine methotrexate thymidine (HMT selection reagent; Invitrogen, Paisley, UK), 5% of hybridoma cloning factor (HCF; PAA, Piscataway, US) and 10% of filtered spent NSO supernatant. Cells were then plated into 96 well culture plates (Thermo Fisher Scientific, Rockford, UK)) and incubated at 37° C., 5% $CO_2$.

Approximately two weeks after the fusion, when the established hybridomas occupied about ⅓ of the well, they were screened for the production of antigen specific antibodies by enzyme linked immunosorbent assay (ELISA). Hybridoma colonies producing antibodies with desired specificity were chosen for further cloning, the aim of which is to generate single cell colonies. This is a crucial step in generating a monoclonal antibody. To do this, the chosen hybridomas were seeded into 96 well culture plates at a cell density of 0.3 cells per well. Hybridomas were incubated at 37° C., 5% $CO_2$ until the colonies were big enough to be screened again. Cloning was repeated a minimum of two times, until all clones exhibited positive binding to the antigen.

MAb Purification

Twice cloned hybridomas were expanded in GIBCO hybridoma serum free media (Life Technologies, Paisley, UK) supplemented with 10% low Ig newborn calf serum (Life Technologies). Spent media was collected and centrifuged at 2000×g for 15 min to remove the hybridoma cells together with cell debris. Supernatant containing antibody was then filtered through a 0.2 μm Minisart single use filter (Sartorius Stedim, Surrey, UK). Antibodies were purified by FPLC using 1 ml recombinant protein G columns (GE Healthcare, Buckinghamshire, UK), eluted with 100 mM glycine pH12 and, after neutralisation, dialysed against 2 L PBS overnight. The final concentration of the purified antibodies was determined by spectrophotometer, reading absorbance at 280 nm. Mouse monoclonal antibody isotyping test kit (ABD Serotec, Kidlington, UK) was used according to the manufacturer's guidelines.

Enzyme Linked Immunosorbent Assay (ELISA)

For glycolipid ELISA, 96-well flexible PVC flat-bottom plates (BD biosciences, Oxford, UK) were coated with either 100 ng of purified ganglioside per well, or WC TGL extract equivalent to $1\times10^4$ cells per well, or PM TGL equivalent to $5\times10^4$ cells per well resuspended in 100% ethanol and left to dry overnight at room temperature.

Purified gangliosides were resuspended to 1 mg/ml in 2:1 (v/v) chloroform:methanol. Extraction of PM TGL is described above. Preparation of antigen. WC TGL was prepared by adding 1 ml methanol and 1 ml of chloroform to the dry cell pellet. Cells were vigorously vortexed and let to incubate on a roller for 30 min at RT. After centrifugation at 2000×g for 10 min, TGL-containing supernatant was collected and stored at −20° C. overnight. Next day, the sample was recentrifuged, the supernatant was collected and stored at 4° C.

For protein ELISA, 96-well flexible PVC flat-bottom plates were coated with 100 ng of protein/well resuspended in carbonate-bicarbonate buffer (pH 9.6) and left to incubate overnight at 4° C. Next day, the plates were blocked with 2% bovine serum albumin (BSA) in PBS for 1 hour at RT. Blocking buffer was then flicked out and primary antibodies or mouse sera prepared in 1% BSA in PBS were then added to the wells. After 1 hour incubation at RT, plates were washed 3 times in PBS. Binding of the primary antibodies was detected by appropriate secondary and tertiary antibodies. Plates were then washed and developed by adding 90 µl of 3,3'5,5'-tetramethylbenzidine (TMB) in phosphate/citrate/perborate buffer per well. The reaction was stopped by addition of 30 µl of 2M $H_2O$. The results were analysed by spectrophotometer, reading absorbance at 450 nm against 620 nm background. The mean and standard deviations of data were calculated using Microsoft Excel. Significant differences between the groups were calculated using Ordinary one-way ANOVA with multiple comparisons against the negative control where $p<0.05$ was considered as statistically significant.

Glycome Analysis

To clarify the fine specificities of the FL133 and 134 mAbs, the antibodies were FITC labelled and sent to the Consortium for Functional Glycomics http://www.functionalglycomics.org/static/consortium/resources/resourcecoreh8.shtml) where they were screened against ≥600 natural and synthetic glycans. Briefly, synthetic and mammalian glycans with amino linkers were printed onto N-hydroxysuccinimide (NHS)-activated glass microscope slides, forming amide linkages. This work was done by Core H of the CFG at Emory University. FG27 was tested at 1 µg/ml in PBS at room temperature. Briefly, antibody samples were applied to the printed surface of the microarray and incubated in a humidified chamber for 1 h. The slide was then rinsed 4 times with PBS, followed by addition of fluorescently labeled (Alexa Fluor 488) anti-rabbit IgG, and was incubated for 1 h. The slide was then rinsed 4 times in PBS, and fluorescence was measured with a Perkin-Elmer microarray XL4000 scanner and analyzed using Imagene software (BioDiscovery).

Further details of the protocol used is set out below:

Glycan Binding Assay with Unlabelled Monoclonal Antibody

1. Introduction:
   1.1. Core H primary objective is to determine the binding specificity of Glycan Binding Proteins (GBPs) and various organisms submitted by investigators using the printed glycan microarray.
2. Reference:
   2.1. www.functionalglycomics.org
3. Materials Needed:
   3.1. Glycan printed slides (Core D), printed on the side of the slide with the white etched bar code and black marks—DO NOT TOUCH THIS AREA
   3.2. Cover slips (Fisher scientific, 12-545F)
   3.3. Humidified Slide processing chambers (Fisher scientific, NC9091416), or homemade system using Petri Dish, with wet paper towels in the bottom of the chamber
   3.4. 100 ml Coplin jars for washing slides
   3.5. Tris-HCl (Fisher scientific, BP152-1)
   3.6. NaCl (Fisher scientific, S271-3)
   3.7. CaCl2 (Fisher scientific, C79-500)
   3.8. MgCl2 (Fisher scientific, BP214-500)
   3.9. Potassium Phosphate Monobasic (Fisher scientific, P285-3)
   3.10. dH20
   3.11. Cyanine 5-Streptavidin (ZYMED 43-4316)
   3.12. Appropriate secondary antibody, fluorescently labeled if available
   3.13. BSA (Fisher scientific, Bp1600-100)
   3.14. Tween-20 (EMD Biosciences, 655205)
   3.15. Sodium Azide (fisher scientific, S227-500)
   3.16. ProScanArray Scanner (Perkin Elmer)
4. Buffers:
   4.1. TSM=20 mM Tris-HCl, pH 7.4 150 mM NaCl, 2 mM CaCl2, 2 mM MgCl2
   4.2. TSM Wash Buffer (TSMW)=TSM Buffer+0.05% Tween-20
   4.3. TSM Binding Buffer (TSMBB)=TSM buffer+0.05% Tween 20+1% BSA
5. Protocol:
   5.1. Make working stocks of washing buffers (TSM, TSM Wash Buffer, and H2O) or collect reagents and bring to room temperature if they have been in the refrigerator.
     5.1.1. Buffer (A) TSM-20 mM Tris-HCl, pH 7.4 150 mM NaCl, 2 mM CaCl2, 2 mM MgCl2
     5.1.2. Buffer (B) TSM Wash Buffer (TSMW)-TSM Buffer+0.05% Tween-20
     5.1.3. Buffer (C) TSM Binding Buffer (TSMBB)-TSM buffer+0.05% Tween 20+1% BSA
     5.1.4. dH2O
   5.2. Prepare 100 µl of sample by diluting antibody in TSMBB or appropriate Binding Buffer based on properties of Antibody to a final concentration of 5-50 ug/ml or an appropriate concentration required for the analysis.
   5.3. Remove slide(s) from desiccator and label slide with sample name near barcode, outside of the black marks.
   5.4. Hydrate the slide by placing in a glass Coplin staining jar containing 100 ml of TSMW for 5 min.
   5.5. Remove excess liquid from slide by setting the slide upright to drain the liquid off.
   5.6. Carefully apply 70 µl of sample (see 5.2) close to the left edge slide in between the black marks.
   5.7. Slowly place cover slip on slide, trying to avoid the formation of bubbles in the sample under the cover slip. Remove any bubbles by gently tapping the cover slip with a pipette tip if necessary, or slowly lifting one side of the cover slip. Make sure the cover slip is between the black marks.

Thin Layer Chromatography (TLC)

TLC plates (Nano Silica Gel on TLC plates) were loaded with purified lipids at 1 µg/lane, or with WC TGL ($1\times10^6$ cells/lane), or with PM TGL ($1\times10^7$ cells/well) extracted from cell lines as described above. To aid loading large amounts of cell derived TGL, the TGL were first dried down using a heating block set to 60° C. and then resuspended in a maximum of 20 µl of 2:1 chloroform/methanol. Once loaded, lipids were mobilised by running the plates twice in solvent 1 (chloroform:methanol:$dH_2O$, 60:30:5) to a distance of 5 cm and once in solvent 2 (hexane:diethylether:glacial acetic acid, 80:20:1.5) to a distance of 8 cm. Lipids were then visualised either by orcinol (20 mg orcinol in 20 ml of 5% $H_2SO_4$) which was developed at 120° C. for 20 min or by immunoblotting.

For immunoblotting, after the glycolipids were mobilised, the TLC plates were first blocked with a thin spray coat of polyisobutylmetacrylate 50 mg/50 ml in acetone. Plates were then further blocked by incubation in 1% (w/v) BSA in PBS for 1 hour at RT. Plates were then incubated in primary antibodies (10 μg in 10 ml per plate) or mouse sera (dilution of 1/100 in 10 ml per plate) which were detected with anti-mouse IgG biotin (1/1000) and donkey anti-mouse IRD 800 CW (LICOR Biosciences Ltd, Cambridge, UK). Each antibody incubation was performed with gentle rocking and lasted for 1 hour. The incubation of tertiary antibody was performed in the dark. All antibodies were prepared in 1% (w/v) BSA in PBS. Following each antibody incubation, plates were washed by pouring PBS directly over them. Finally, the plates were washed, left to dry overnight in the dark and analysed by the Odyssey SA Infrared Imaging System (LICOR).

Antibody and Complement Dependent Cytotoxicity

Antibody and complement dependent cytotoxicity were assessed using radiolabelled sodium chromate in normal saline ($Cr^{51}$) which is released by the dead cells due to the increased permeability of their plasma cell membranes. In detail, $2 \times 10^6$ target cells were labelled with 40 μl (1 mBq) of $Cr^{51}$ (Perkin Elmer, Cambridge, UK) and left to incubate for a minimum of 1 hour at 37° C. After the incubation, labelled target cells were washed twice in 25 ml of SF RPMI media at 1400×g for 5 min. They were then resuspended in 25 ml of SF RPMI media and left to rest for 20 min at 37° C. They were then centrifuged again to remove the SF RPMI media, resuspended in 1 ml of culture media (RPMI supplemented with 10% FCS and 1% penicillin-streptomycin) and counted. Finally, the labelled target cells were resuspended to $1 \times 10^5$ cells/1 ml and 50 μl ($5 \times 10^3$ cells) were added to relevant wells of a 96 well round bottomed plate. Dilutions of antibodies were prepared in culture media making sure that working dilutions were 4 times the final concentrations. The volume of 50 μl of diluted antibodies was added to relevant wells.

Peripheral mononuclear cells (PBMCs) were isolated from a healthy volunteer on the day of the experiment using green capped heparin coated vacutainer tubes (BD, Plymouth, UK). The whole blood was first diluted 1:1 in SF RPMI. To separate the PBMCs, 25 ml of diluted blood was gently layered on top of 15 ml of Histopaque-1077 in 50 ml falcon tube. The bloods were centrifuged at 2100×g for 20 min with acceleration set to 1 and deceleration set to 0. The buffy coat, containing PBMC, was then harvested using a 10 ml pipette and washed twice in 20 ml of SF RPMI at 2000×g for 5 min. PBMCs were then counted, resuspended at $5 \times 10^6$ cells/1 ml culture media, and 100 μl cells were added to relevant wells.

To prepare blood serum, blood from a healthy volunteer was collected into red capped clot activator-containing vacutainer tubes (BD, Plymouth, UK). Clotted blood was transferred into 30 ml universal container and centrifuged twice at 2000×g for 5 min to ensure removal of all red blood cells. Finally, 20% blood serum in culture media was prepared and 100 μl were added to relevant wells.

Maximum cell death was induced by applying 1 drop (25 μl) of Triton X—100 to 50 μl of labelled target cells and 125 μl of culture media. Spontaneous cell death was assessed by incubating 50 μl of labelled target cells in 150 μl of culture media. To assess the level of direct PBMC induced killing, 50 μl of target cells were incubated with 100 μl of PBMCs and 50 μl of culture media.

The plates were incubated for 24 hours at 37° C. after which 50 μl of supernatant was transferred into Lumaplates and allowed to dry down for 24 hours. The lumaplates were then analysed using a TopCount Scintillation Counter (Perkin Elmer, Cambridge, UK).

Affinity Studies

Affinity constants were determined using the principle of surface plasmon resonance (SPR) with a Biacore X (GE Healthcare, Buckinghamshire, UK). Polyvalent HSA-Fuc-GM1 conjugate (in-house conjugate at 5 μg/ml, 686 response units per chip) was coupled to the flow cell of CM5 biosensor chip via amine coupling according to the manufacturer's instructions. A reference flow cell treated in a similar manner, but omitting the conjugate, was used as a reference cell. The binding kinetic parameters were determined from several known concentrations of antibody diluted and dialysed in HBS-P buffer (10 mmol/L HEPES, pH 7.4, 150 mmol/L NaCl, 0.005% surfactant P20) using the Fuc-GM1—coated flow cell at a flow rate of 50 μl/min. The curve-fitting software (BiaEvaluation) provided by the Biacore instrument was used to generate estimates of the association and dissociation rates from which affinities are calculated using a bivalent analyte model.

Data Analysis

Statistical significance of ELISA results were determined using one way ANOVA Dunnett's multiple comparisons test. Differences were deemed statistically significant at the level of P<0.05. Symbol * represents P≤0.05, symbol  represents P≤0.01, symbol * represents P≤0.001 and symbol **** represents P≤0.0001.

Binding to blood: 50 μl of healthy donor blood was incubated with 50 μl primary antibody at 4° C. for 1 hr. The blood was washed with 150 μl of RPMI 10% NBCS and spun at 1,000 rpm for 5 mins. Supernatant was discarded and 50 μl FITC conjugated anti-mouse IgG Fc specific mAb (1/100 in RPMI 10% NBCS) was used as the secondary antibody. Cells were incubated at 4° C. in the dark for 1 hr then washed with 150 μl RPMI 10% NBCS and spun at 1,000 rpm for 5 mins. After discarding the supernatant, 50 μl well Cal-Lyse (Invitrogen, Paisley, UK) was used followed by 500 μl well distilled water to lyse red blood cells. The blood was subsequently spun at 1,000 rpm for 5 mins. Supernatant was discarded and 0.4% formaldehyde was used to fix the cells. Samples were analysed on a FC-500 flow cytometer (Beckman Coulter). To analyse and plot raw data, WinMDI 2.9 software was used.

RNA Extraction and cDNA Synthesis

Approximately $1 \times 10^6$ cells from hybridomas FL134.33, FL133.63 and FL133.67 were taken from tissue culture, washed once in PBS and treated with 500 μl of trizol (life technologies). The homogenized samples were treated with 0.1 ml of chloroform and centrifuged to separate RNA from contaminating DNA and protein. RNA was precipitated using 0.25 ml of propan-2-ol and centrifuged to form a small pellet. The pellet was then washed with ethanol 75% and resuspended in RNAse-free water. RNA was treated with DNAase (DNAse I recombinant, RNase free, Roche) to remove genomic DNA following manufacturers recommendations. First strand cDNA was prepared from 1 μg of total RNA using an AMV reverse transcriptase kit (Roche Diagnostics. Basel, Switzerland) with oligo $(dT)_{15}$ primer following manufacturers instructions. After cDNA synthesis, the enzyme was denatured by incubation at 95° C. for 5 minutes. The cDNA was then stored at −20° C.

Variable Region PCR

The antibodies were assessed previously by an isotyping test kit (Serotec. Kidlington, UK) and it was determined that FL134.33 was of subtype IgG1, and FL133.63 and 133.67 were of IgG3 (Data not shown). The variable regions were determined by PCR using a previously published set of primers (Jones & Bendig, 1991). PCR amplification was carried out with 13 VK region-specific primers and one CK specific primer for the light chain and 12 VH region-specific primers and one constant region subclass-specific primer for the heavy chain. 50 μl PCR reactions were setup using 1 U of polymerase (AmpliTaq Gold 360, Applied Biosystems. California, USA), a mixture of 2'-deoxynucleoside 5'-triphosphates (dNTP) to a final concentration of 0.2 mM each, Magnesium Chloride to a final concentration of 1.5 mM, and both forward and reverse primers at 1 μM. The hot start step of the reactions was carried out for five minutes at 95° C. Then the amplification was carried for 35 cycles: 94° C. for one minute, followed by 60° C. for one minute and 72° C. for two minutes. Finally the polishing step was done at 72° C. for 20 minutes The amplified products were assessed using agarose gel electrophoresis prepared with 1% UltraPure agarose (Invitrogen. Carlsbad, USA) in TAE buffer with ethidium bromide, and run at 90 volts. Gels were visualized using UV transillumination.

PCR Products Purification (Heavy and Light Chain)

PCR products were purified using a QIAquick Gel extraction kit (Qiagen. Venlo, Netherlands) to avoid carryover of residual nucleotides or primers and obtain clean sequence graphs. 150 μl of heavy and light chain PCR products were loaded into a 1% agarose gel and ran at 85 volt. The DNA fragments were excised from the gel, dissolved and purified on columns according to the manufacturers protocol. Final concentration of the resulting DNA was determined by UV spectroscopy (Nanodrop, Thermoscientific. Waltham, USA)

Proof-Reading PCR

Primers to carry out the proof-reading PCR were designed to maintain reading frame and preserve the amino acid sequence, based on the sequence data. The start codons, Kozak consensus sequence for initiation of translation process were considered, and restriction enzyme sites to allow integration into the double expression vector were incorporated. PCR amplification was carried out using the cloning primers and a proofreading polymerase (PHUsion, NEB. Ipswich, UK) with the cDNA as template. The reaction was done in triplicate to improve yield of product. 50 μl reactions were setup as stated before. The hot start step was carried out for three minutes at 98° C. Then the amplification was carried for 35 cycles: 98° C. for 30 seconds, followed by 58° C. for 30 seconds and 68° C. for 60 seconds. Polishing step was done at 72° C. for 10 minutes.

TOPO Cloning of PCR Products

PCR products generated with the proof-reading polymerase were treated with Taq polymerase (NEB) for 15 mints at 72° C. to add adenine overhangs, and cloned into a TA (TOPO) vector (pCR2.1, Invitrogen) and transformed into chemically competent TOP10F cells for subsequent enzymatic digestion and ligation into the pDCOrig-hIgG1 vector, following the manufacturers instructions. Transformed bacteria were grown in LB agar plates or liquid media supplemented with 80 μg/ml of ampicillin.

Nucleic Acid Purification

Plasmid DNA was prepared from an overnight culture of the transformed bacteria in liquid culture supplemented with the appropriate antibody at 37° C. and 120 rpm. Small quantities were prepared using the spini miniprep kit (Qiagen) and larger quantities with the plasmid maxi kit (Qiagen), both following the manufacturers instructions. Purification of DNA was carried out by means of agarose gel electrophoresis as previously described and the use of a gel extraction kit to recover the DNA, following the manufacturers procedure.

Restriction Enzyme Digestion and Double Expression Vector Cloning

Enzymatic digestion of DNA was performed on 10 μl of DNA and the addition of 8 units of each of the restriction enzymes, in the presence of bovine serum albumin (BSA) and each enzyme's own optimum buffer. Incubation was done at each enzyme's temperature of activity for two hours. The double expression vector PDCOrig-hIgG1 and the light chain insert were digested, agarose gel-purified and ligated overnight at 16° C. using T4 DNA ligase (NEB) following the manufacturers indications. A second digestion of the vector and the heavy chain followed, another purification via gel extraction and a second ligation overnight at 16° C. Following each digestion the vector was transformed into chemically competent TOP10F cells (Invitrogen). Transformed bacteria were grown in LB agar plates or liquid media supplemented with 35 μg/ml of zeocin (Invivogen).

Sequencing and Transfection of the Chimerised Antibody Vector

PCR products and plasmids were sequenced using appropriate 5' and 3' primers at the University of Nottingham DNA sequencing facility and were analysed using the GeneTool software Package and the IMGT database for mouse immunoglobulin nucleotide sequences. CHO cells were transfected using of lipofectamine (Invitrogen) and Optimem reduced serum medium (Gibco, Life technologies. Waltham, USA). Cells were cultured in suspension in CHO-S-SFMII medium (Gibco) until it was spent. Supernatant was collected and the antibody purified by preparative chromathography (Akta FPLC, GE Healthcare, Little Chalfont, UK) using a protein-G sepharose prepacked column (HiTrap protein G HP, GE Healthcare). After purification the antibody was dialised and the final yield was determined by UV spectrometry.

Example 1—Generation and Initial Characterisation of FUC-GM1 mAbs

Mice were immunised with classical liposomes containing 10 μg of fucosyl GM1 per immunisation per mouse administered i.p. Alpha-GalCer was used as an adjuvant in the $1^{st}$ and the $3^{rd}$ immunisation whilst anti-CD40 mAb was used as an adjuvant in the $2^{nd}$ and $4^{th}$ immunisation. All mice received 4 immunisations. The first three immunisations were administered at two week intervals, whilst the last immunisation was administered four weeks after the third. From the second immunisation onwards, mice were bled one week after immunisation and sera were then screened for IgG and IgM binding to purified fucosyl GM1 by ELISA. Following immunisation, mice raised a significant IgG immune response to fucosyl GM1 with the end point titre 1/100. Mouse sera IgG were also assessed for binding to the cell surface of the DMS79 cell line, which expresses fucosyl GM1. Unfortunately, only weak binding to the cell line was seen. It is possible to speculate that the mouse sera recognised an epitope of the fucosyl GM1 antigen which is not accessible once the lipid is integrated into the plasma membrane of the cell.

As purified glycolipid incorporated into liposomes failed to generate high titre IgG responses other methods of immunisation were evaluated. Traditionally, carbohydrates and glycolipids are classed as T cell independent antigens evoking mainly an IgM antibody response. High affinity IgG antibody responses are generated mainly in response to protein antigens. It was therefore hypothesised that the provision of linked T cell help would generate a greater and more consistent high affinity IgG antibody response to carbohydrate and glycolipid antigens. Fucosyl GM1 was therefore conjugated to human serum albumin (HSA).

Conjugation of fucosyl GM1 to proteins followed a two step process. First, purified ganglioside fucosyl GM1 was subjected to ozonolysis, where the reactive ozone oxidises the carbon-carbon double bond present in the sphingosine moiety of the glycosphingolipid to create a free aldehyde group. In the next step, ozonolysed fucosyl GM1 was conjugated to HSA by the process of reductive amination. Here, the newly generated aldehydes of the ozonolysed fucosyl GM1 was allowed to react with the primary amine group on lysines on HSA to first form labile Shiff bases which, when reduced by sodium borohydride, form highly stable secondary amine bonds. A schematic representation of the generation of conjugates is illustrated in (FIG. 4).

Following the ozonolysis, samples from both the original and the ozonolysed fucosyl GM1 were analysed by Fourier Transform Mass Spectrometry (FTMS). The original sample contained several species of fucosyl GM1 with varying lengths of the fatty acid chains. The most abundant species had molecular weight of 1,746 Da. The ozonolysed sample also contained species with varying sizes of fatty acid chains. In the ozonolysed fucosyl GM1 sample, the main species had a molecular weight of 1,566 Da, exhibiting a mass shift of exactly 180 Da, corresponding to the loss of the sphingosine moiety. Additionally, the original fucosyl GM1 species were not detectable in the ozonolysed sample (FIG. 5). Ozonolysed fucosyl GM1 resuspended in DMSO was added to HSA resuspended in carb-bicarb buffer. To this, the reducing agent sodium borohydrate (H4BNa) was added and the reaction allowed to incubate for 8 hours at room temperature and then resuspended in 100 µl of PBS/EDTA buffer. Then, sulfo-MBS crosslinker was added and left to incubate for 1 hour at room temperature.

Successful generation of HSA-fucosyl GM1 conjugates was assessed by ELISA, western blotting and mass spectrometry. By ELISA, the original HSA as well as all three HSA-fucosyl GM1 conjugate samples were detected by mouse serum containing IgG antibodies against HSA (1/10, 000 endpoint titres) whilst only the HSA-fucosyl GM1 conjugates were detected by anti-fucosyl GM1 mAb F12 (1/10,000 endpoint titre) (FIG. 6A). Generation of HSA-fucosyl GM1 conjugates in all three samples was also confirmed by western blot analysis. Anti-HSA mouse serum bound to original HSA, to HSA which had been subjected to reductive amination but no fucosyl GM1 was added, to HSA-Lewis Y conjugate, to HSA-GD3 conjugate and to all three samples of HSA-fucosyl GM1 conjugates. On the other hand, anti-fucosyl GM1 mAb F12 detected HSA-fucosyl GM1 conjugates only, and they were of the expected size of 67 kDa. This analysis also indicated slight increase in the molecular weight of the HSA-fucosyl GM1 conjugates when compared to the original HSA. This was consistent with the addition of fucosyl GM1 molecules to the HSA (FIG. 6B).

Mice were immunized with HSA-Fuc-GM1 conjugates (10 µg per immunisation), together with Fuc-GM1-containing liposomes (10 µg per immunisation) and the Fuc-GM1 positive SCLC cell line DMS79 ($1 \times 10^6$ cells per immunisation). 15 mice divided into 5 groups, with each group consisting of 3 mice and varied in the types and sequence of immune adjuvants that were used.

Group 1 first received three immunisations with Fuc-GM1 liposomes followed by two immunisations with HSA-Fuc-GM1 conjugates. As adjuvants, α-GalCer was used in the first immunisation, anti-CD40 was used in the following two immunisations and incomplete Freund's adjuvant (IFA) was used as an adjuvant for the HSA-Fuc-GM1 conjugates. To improve the chances of generating mAbs able to recognise Fuc-GM1 on the cell surface, group 2 was first immunised with $1 \times 10^6$ DMS79 cells followed by two immunisations with Fuc-GM1 containing liposomes and two immunisations with the HSA-Fuc-GM1 conjugates. α-GalCer was used in the second and third immunisations whilst incomplete Freund's adjuvant was used with the HSA-Fuc-GM1 conjugates. Group 3 was first immunised with HSA-Fuc-GM1 conjugates followed by immunisation with the Fuc-GM1 liposomes. Complete Freund's adjuvant was used as adjuvant with the HSA-Fuc-GM1 conjugates, anti-CD40 was used as the adjuvant in the second immunisation and α-GalCer in the third. Group 4 had the order of these antigens reversed; mice were first immunised with two doses of Fuc-GM1 liposomes followed by one immunisation with HSA-Fuc-GM1 conjugates. α-GalCer was used as the adjuvant in the first immunisation, anti-CD40 in the second and IFA in the third. Group 5 was immunised with three doses of HSA-Fuc-GM1 conjugates. CFA was used as the adjuvant in the first immunisation and IFA was used in the following two immunisations. The groups and their immunogens are summarised in (Table 1).

TABLE 1

Summary of groups and immunogens used in immunisation.

| Group | 1 | 2 | 3 | 4 | 5 | boost |
|---|---|---|---|---|---|---|
| 1 | Fuc-GM1 liposomes + αGalCer | Fuc-GM1 liposomes + anti-CD40 | Fuc-GM1 liposomes + anti-CD40 | Conjugate + IFA | Conjugate + IFA | |

TABLE 1-continued

Summary of groups and immunogens used in immunisation.

| Group | 1 | 2 | 3 | 4 | 5 | boost |
|---|---|---|---|---|---|---|
| 2 | DMS79 cells | Fuc-GM1 liposomes + αGalCer | Fuc-GM1 liposomes + αGalCer | Conjugate + IFA | Conjugate + IFA | Fuc-GM1 liposomes + αGalCer |
| 3 | Conjugate + CFA | Fuc-GM1 liposomes + anti-CD40 | Fuc-GM1 liposomes + αGalCer | | | |
| 4 | Fuc-GM1 liposomes + αGalCer | Fuc-GM1 liposomes + anti-CD40 | Conjugate + IFA | | | |
| 5 | Conjugate + CFA | Conjugate + IFA | Conjugate + IFA | | | |

Mice were immunised via the i.p. route. The first three immunisations were administered at 2 week intervals. Group 1 and 2 also received a fourth immunisation 6 weeks following the third, and a fifth immunisation 3 weeks following the fourth.

Following each immunisation except the first, mice were tail bled and mouse serum IgG was screened for binding to HSA-Fuc-GM1 conjugates by ELISA. In addition, since we were intending to generate mAb recognising exclusively Fuc-GM1 (as opposed to Fuc-GM1 attached to a lysine residue), mice sera were also screened for binding to purified Fuc-GM1. These analyses showed that all mice generated an IgG immune response to HSA-Fuc-GM1 conjugates (end point titres 1/10,000), but only 6 out of the 15 mice generated the desired purified Fuc-GM1 response. A significant IgG response to purified Fuc-GM1 was detected in two mice from Group1 (3×liposomes+2×conjugate), both with end point titre 1/1,000. In addition, detectable titres were present in two mice from Group 2 (DMS79 cells+2×liposomes+2× conjugate) with end point titre 1/1000 for mouse 2P and 1/100 for mouse 2R and in two mice from G5 (3×conjugate) with end point titre 1/100 for mouse 5P and 1/1000 for mouse 5R. Only data from the mice showing positive anti-Fuc-GM1 responses are shown in (FIG. 7).

The serum analysis indicated that 6 mice had developed an IgG immune response to purified Fuc-GM1. To assess whether these antibodies could also recognise Fuc-GM1 in the context of an intact cell plasma membrane, they were screened for binding to DMS79 cells by flow cytometry. This analysis showed that only the two mice from Group 2 (which had been immunised with DMS79 cells followed by 2 doses of liposomes and 2 doses of conjugate) generated antibodies that could bind to Fuc-GM1 on the surface of the cells (GM≈500). None of the other groups which developed a Fuc-GM1 specific IgG response also bound to the surface of live cells, suggesting that inclusion of live DMS79 cells into the immunisation protocol was of crucial value (FIG. 8).

Following the acquisition of data indicating a promising anti-Fuc-GM1 IgG response, mouse 2R was sacrificed and its splenocytes were fused with NSO myeloma cells. Five days before the fusion, the mouse immune response was boosted with 10 µg of Fuc-GM1 and α-GalCer in liposomes administered i.v. Once established, individual hybridoma colonies were screened for the production of IgG antibodies binding to purified Fuc-GM1 by ELISA. Four hybridomas with the strongest antibody binding were identified and cloned twice at 0.3 cells per well. Following each round of cloning, hybridoma supernatants were re-screened for secretion of IgG antibodies binding to purified Fuc-GM1 by ELISA (results not shown). Following the cloning, hybridomas FL133.63, FL133.67 and FL134.33 were selected, expanded and mAbs were purified from the hybridoma supernatants. Using the isotype testing kit, mAbs FL133.63 and FL133.67 were found to be IgG3, kappa whilst mAb FL134.33 was identified as IgG1, kappa.

Following the cloning, expansion and purification, it was important to assess binding of these mAbs to the cell surface of Fuc-GM1 positive cancer cell lines. All antibodies were used at the same concentration of 10 µg/ml to allow direct comparison. MAb FL133.63 bound strongly to cell line DMS79 (GM≈1000) and weakly to cell line DMS53 (GM≈100). MAb FL133.67 bound strongly to DMS79 (GM≈1000) but did not bind to any other Fuc-GM1 positive cell lines. MAb FL134.33 bound strongly to DMS79 (GM≈1000), moderately to H128 (GM≈300) and weakly to DMS53 (GM≈100). The positive control mAb F12 bound to all 4 cell lines exhibiting much stronger intensity of staining with GM≈2000 for DMS79, GM≈700 for DMS53, GM≈500 for H128 and GM≈100 for cell line H69; of all the mAbs, mAb F12 alone bound to the cell line H69. MAb FL134.33 exhibited unusual behaviour in binding to cell line H128 with a stronger intensity than to cell line DMS53; DMS53 is reported to express higher amounts of Fuc-GM1 than cell line H128, a result confirmed here by mAb F12 staining (FIG. 9).

All three mAbs were screened for binding to the whole blood of a healthy human volunteer, and exhibited no binding to any nucleated cells present. Isotypes IgG1, IgG3 and F12 were used as negative controls, whilst an anti-MHC class 1 mAb was used as positive control (FIG. 10).

Example 2—Defining the Epitopes Recognised by Fuc-GM1 mAbs

The specificity of mAbs FL133.63, FL133.67 and FL134.33 for Fuc-GM1 was assessed by glycolipid ELISA, where the mAbs were tested for binding to a range of available purified gangliosides, namely Fuc-GM1, GD3, GM1, GM3, GD1a, GT1b, Gb3 and lactosyl ceramide. All three mAbs recognised exclusively ganglioside Fuc-GM1 at concentrations from 1-0.01 µg/ml. The positive control mAb F12 also recognise Fuc-GM1 at concentrations from 1-0.01 µg/ml. Ganglioside GD3 was detected by the positive control mAb R24, at concentrations from 1-0.01 µg/ml. Gangliosides Fuc-GM1, GM1 and GD1a were detected by positive control cholera toxin B subunit (CTxB) at 1 µg/ml. IgG mAbs specific to GM3, GT1 b, Gb3 and LacCer have not yet been developed (FIG. 11).

To further validate binding of mAbs FL133.63, FL133.67 and FL134.33 to Fuc-GM1 they were assessed in a competition assay between purified Fuc-GM1 and this ganglioside expressed on the cell line DMS79. In this experiment, mAbs were pre-incubated with purified Fuc-GM1 before they were used as the primary reagent in flow cytometry. Pre-incubation of mAb FL133.63 with ganglioside Fuc-GM1 reduced its binding to the DMS 79 cell line from GM=523 to GM=4, binding of mAb FL133.67 was reduced from GM=201 to GM=3, binding of mAb FL134.33 was reduced from GM=434 to GM=29, and binding of positive control mAb F12 was reduced from GM=1195 to GM=6. Pre-incubation of the negative control mAb anti-MHC class 1 with ganglioside Fuc-GM1 had no effect on its binding to DMS 79 cells (FIG. 12).

To further clarify the fine specificities of the FL133/134 mAbs, they were screened against 600 natural and synthetic glycans by the Consortium for Functional Glycomics. Binding of FL133.63 (FIG. 13A) to the glycan array showed that unexpectedly (Table 2) it failed to bind FucGM1 (free sugar) when attached directly to the chip FucGM1sp0 (Chart number 63) or to FucGM1 (free sugar) attached to the chip via an 9 carbon spacer Fuc-Gm1sp9 (chart number 64).

Surprisingly, mAb F12 also bound weakly to purified ganglioside GM1, binding that had not been detected in previous assays (FIG. 14).

The affinity of anti-Fuc-GM1 mAbs to their antigens was determined by SPR with a Biacore X. HSA-Fuc-GM1 conjugates originally used for the generation of the three anti-Fuc-GM1 mAbs were used as targets for the analysis. Binding of the anti-Fuc-GM1 mAbs to the conjugates was confirmed by ELISA (FIG. 15).

To couple HSA-Fuc-GM1 conjugates to the CM5 biosensor chip, the chip was first washed with HSB-P buffer, after which the crosslinking agent EDC-NHS was applied. HSA-Fuc-GM1 conjugates were then injected into the flow cell at 20 μg/ml diluted in acetate 4.5 coupling buffer. After injecting a volume of 5 μl, 686 response units of conjugates were attached to the chip.

Finally, the unreacted coupling agent was blocked by ethanolamine. The binding kinetic parameters were determined from several known concentrations of antibody diluted in HBS-P buffer using the HSA-Fuc-GM1 coated flow cell. The curve-fitting software (BiaEvaluation) pro-

TABLE 2

Binding of FL133.63 to sugars on the glycome array

| Chart Number | FL133.63 | Average RFU | StDev | % CV |
|---|---|---|---|---|
| 331 | Neu5Aca2-3Galb1-3(Fuca1-4)GlcNAcb1-3Galb1-3(Fuca1-4)GlcNAcb-Sp0 | 367 | 15 | 4 |
| 239 | Neu5Aca2-3Galb1-3(Fuca1-4)GlcNAcb-Sp8 | 121 | 40 | 33 |
| 240 | Neu5Aca2-3Galb1-3(Fuca1-4)GlcNAcb1-3Galb1-4(Fuca1-3)GlcNAcb-Sp0 | 110 | 15 | 14 |
| 274 | Neu5Aca2-6Galb-Sp8 | 28 | 17 | 62 |
| 63 | Fuca1-2Galb1-3GalNAcb1-4(Neu5Aca2-3)Galb1-4Glcb-Sp0 | 7 | 3 | 38 |
| 64 | Fuca1-2Galb1-3GalNAcb1-4(Neu5Aca2-3)Galb1-4Glcb-Sp9 | 10 | 13 | 122 |

Binding of FL134.33 (FIG. 13B) to the glycan array showed that unexpectedly (Table 3) it failed to bind FucGM1 (free sugar) when attached directly to the chip FucGM1sp0 (Chart number 63) and bound very weakly when FucGM1 (free sugar) was attached to the chip via an 9 carbon spacer Fuc-Gm1sp9 (chart number 64).

vided with the Biacore instrument was used to generate estimates of the association and dissociation rates, from which affinities were calculated using the best fitting bivalent analyte model. This model calculates affinities for bivalent proteins, but is only able to calculate meaningful data for the attachment of the first arm of the antibody.

TABLE 3

Binding of FL134.33 to sugars on the glycome array

| Chart Number | FL134.33 | Average RFU | StDev | % CV |
|---|---|---|---|---|
| 64 | Fuca1-2Galb1-3GalNAcb1-4(Neu5Aca2-3)Galb1-4Glcb-Sp9 | 183 | 48 | 26 |
| 545 | GlcNAcb1-3Galb1-4GlcNAcb1-3Galb1-4GlcNAcb1-2Mana1-6(GlcNAcb1-3Galb1-4GlcNAcb1-3Galb1-4GlcNAcb1-2Mana1-3)Manb1-4GlcNAcb1-4GlcNAcb-Sp12 | 54 | 23 | 43 |
| 542 | Galb1-4GlcNAcb1-3Galb1-4GlcNAcb1-2Mana1-6(Galb1-4GlcNAcb1-3Galb1-4GlcNAcb1-2Mana1-3)Manb1-4GlcNAcb1-4GlcNAcb-Sp24 | 44 | 48 | 110 |
| 63 | Fuca1-2Galb1-3GalNAcb1-4(Neu5Aca2-3)Galb1-4Glcb-Sp0 | 39 | 18 | 46 |
| 7 | Fuca-Sp9 | 25 | 4 | 17 |

Finally, the specificity of these mAbs for Fuc-GM1 was also demonstrated by TLC analysis. Purified ganglioside Fuc-GM1, purified ganglioside GM1 and DMS79 PM TGL were loaded onto silica plates. All three Fuc-GM1 mAbs recognised purified Fuc-GM1 and a band present in DMS79 PM TGL mobilising the same distance as purified Fuc-GM1. None of the antibodies bound to purified ganglioside GM1. The recognition pattern of Fuc-GM1 mAbs generated here was identical to that of the positive control mAb F12, which also recognised purified Fuc-GM1 and DMS79 PM TGL.

According to this model, Fuc-GM1 mAbs have average association rate constants $k_{on}$ ($3.56 \times 10^4$ $Ms^{-1}$ form Ab FL133.63, $9.43 \times 10^3$ $Ms^{-1}$ for mAb FL133.67 and $2.01 \times 10^3$ $Ms^{-1}$ for mAb FL134.33) but very fast dissociation rate constants $k_{off}$ ($0.0637$ $s^{-1}$ for mAb FL133.63, $0.0783$ $s^{-1}$ for mAb FL133.67 and $0.117$ $s^{-1}$ for mAb FL134.33) giving an overall low functional affinity for these mAbs ($1.8 \times 10^{-6}$ M for mAb FL133.63, $8.3 \times 10^{-6}$ M for mAb FL133.67 and $5.8 \times 10^{-5}$ M for mAb FL134.33 (Table 4).

TABLE 4

Kinetic binding parameters of anti-Fuc-GM1 mAbs determined by SPR.

| mAb | Association rate $k_{on}$ (1/Ms) | Dissociation rate $k_{off}$ (1/s) | Equilibrium dissociation constant Kd (M) |
|---|---|---|---|
| FL133.63 | $3.56 \times 10^4$ | 0.0637 | $1.8 \times 10^{-6}$ |
| FL133.67 | $9.43 \times 10^3$ | 0.0783 | $8.3 \times 10^{-6}$ |
| FL134.33 | $2.01 \times 10^3$ | 0.117 | $5.8 \times 10^{-5}$ |

$EC_{50}$ and equilibrium dissociation constant (Kd) of the 3 Fuc-GM1 antibodies were determined by titrating them on purified Fuc-GM1 and DMS79 cells, respectively (FIG. 16). Functional affinity represented by $EC_{50}$ values from Fuc-GM1 ELISA and flow cytometry analysis on DMS 79 cells were higher than those given by SPR assessment. MAb FL133.63 had $EC_{50}$ of $1 \times 10^{-9}$ on Fuc-GM1 ELISA and Kd=$7.5 \times 10^{-9}$ on DMS79 cells. This is 1,000 fold higher than the affinity established by SPR. MAb FL133.67 had $EC_{50}$ of $2.1 \times 10^{-9}$ on Fuc-GM1 ELISA and Kd=$1.2 \times 10^{-8}$ on DMS79 cells. This is 100 to 1000 fold higher than the affinity established by SPR. MAb FL134.33 had $EC_{50}$ of $9.2 \times 10^{-10}$ on Fuc-GM1 ELISA and Kd=$6.3 \times 10^{-9}$ on DMS79 cells. This is 10,000 fold higher than the affinity established by SPR. These results suggest that the SPR analysis measured monovalent antibody binding. When binding to the antigens on the cell surface, avidity of the antibodies is greatly enhanced.

Example 3—Functional Assays

Since all three Fuc-GM1 mAbs bound to the DMS79 cell line, it was also important to establish their effector functions. Mab FL134.33 (IgG1) demonstrated 50% to 80% cytotoxicity by ADCC (depending on the donor) but only 20% cytotoxicity by CDC. Both mAbs FL133.63 (IgG3) and FL133.67 (IgG3) showed 20% cytotoxicity by ADCC but 60-80% cytotoxicity mediated by CDC. These results are in agreement with previous reported studies which showed that mAbs with IgG1 isotypes are more potent in inducing ADCC and mAbs of IgG3 isotype are more potent in inducing CDC (Lopez et al., 1983, Niwa et al., 2005, Bruggemann et al., 1987, Natsume et al., 2008). In contrast, positive control murine mAb SC101 (IgG1) demonstrated 70% ADCC and 80% CDC mediated cytotoxicity of DMS79 cells (FIG. 17).

Example 4—Chimeric mAb

MAbs FL133.63, FL133.67 and FL134.33 were sequenced and the sequences of the VH and VL chains have been compared to the sequences of the germline IgG antibody using program IMGT/V_QUEST. Together, all data demonstrate evidence of somatic hypermutation and also suggests presence of some affinity maturation. VH chains of all three Fuc-GM1 antibodies were mapped to gene V3, subgroup 1 and allele 02. Compared to the germline sequence, VH region of mAb FL134.33 contained 14 substitution mutations and change of 7 amino acids, mAb FL133.63 contained 8 substitution mutations and change of 6 amino acids while mAb FL133.67 contained 6 substitution mutations and change of 4 amino acids (FIG. 18 and Table 5).

In FR2, all three mAbs contained a transition mutation a157>g resulting in amino acid change M53>V. In CDR2, all three mAbs contained a transversion mutation a157>c resulting in amino acid change 559>R and a transition mutation g191>a resulting in amino acid change 564>N. In FR3, all three mAbs contained a silent transversion mutation t231>a, a transversion mutation c248>a resulting in amino acid change 583>Y and finally a silent transition mutation c309>t.

MAb FL134.33 also contained a transversion mutation a2>c resulting in amino acid change D1>A, a silent transition mutation g9>a and silent transition mutation c69>t in FR1; a silent transition mutation c198>t, a transition mutation a226>g resulting in amino acid change 176>V, a silent transition mutation g267>a, a silent transition mutation g273>a and a transversion mutation g280>c resulting in amino acid change V94>L in FR3.

MAb FL133.63 also contained a transition mutation t259>c resulting in amino acid change F87>L and a transition mutation a269>g resulting in amino acid change Q90>R.

TABLE 5

$V_H$ region mutation and amino acid change

| Antibody | V gene and allele | FR1 | CDR1 | FR2 | CDR2 | FR3 |
|---|---|---|---|---|---|---|
| FL134.33 (IgG1) | IGHV3-1*02 | a2 > c, D1 > A<br>g9 > a<br>c69 > t | | a157 > g, M53 > V | a175 > c, S59 > R<br>g191 > a, S64 > N | c198 > t<br>a226 > g, I76 > V<br>t231 > a<br>c248 > a, S83 > Y<br>g267 > a<br>g273 > a<br>g280 > c, V94 > L<br>c309 > t |
| FL133.63 (IgG3) | IGHV3-1*02 | | | a157 > g, M53 > V | a175 > c, S59 > R<br>g191 > a, S64 > N | t231 > a<br>c248 > a, S83 > Y<br>t259 > c, F87 > L<br>a269 > g, Q90 > R<br>c309 > t |

TABLE 5-continued

| | | V$_H$ region mutation and amino acid change | | | | |
|---|---|---|---|---|---|---|
| Antibody | V gene and allele | FR1 | CDR1 | FR2 | CDR2 | FR3 |
| FL133.67 (IgG3) | IGHV3-1*02 | | | a157 > g, M53 > V | a175 > c, S59 > R<br>g191 > a, S64 > N | t231 > a<br>c248 > a, S83 > Y<br>c309 > t |

V$_L$ chains of all three Fuc-GM1 antibodies were mapped to gene K5, subgroup 39 and allele 01. Compared to the germline sequence, V$_L$ region of mAb FL134.33 contained 10 substitution mutations and change of 6 amino acids, mAb FL133.63 contained 7 substitution mutations and change of 6 amino acids while mAb FL133.67 contained 7 substitution mutations and change of 6 amino acids (FIG. 19 and Table 6).

TABLE 6

| | | V$_L$ region mutation and amino acid change | | | | |
|---|---|---|---|---|---|---|
| Antibody | V gene and allele | FR1 | CDR1 | FR2 | CDR2 | FR3 |
| FL134.33 (IgG1) | IGKV5-39*01 | c26 > a, A9 > D | t112 > g, Y38 > D | g153 > a | c170 > t, A57 > V<br>c195 > t | g250 > a, G84 > R<br>g252 > a, G84 > R<br>g269 > c, S90 > T<br>g301 > c, V101 > L |
| FL133.63 (IgG3) | IGKV5-39*01 | c14 > g, T5 > S | a106 > g, S36 > G<br>t112 > g, Y38 > D | | c170 > t, A57 > V | g256 > t, D86 > Y<br>g269 > c, S90 > T<br>g303 > a |
| FL133.67 (IgG3) | IGKV5-39*01 | c14 > g, T5 > S | t112 > g, Y38 > D | | c170 > t, A57 > V | c200 > a, S67 > Y<br>g269 > c, S90 > T<br>c276 > g, N92 > K |

In CDR1, all three mAbs contained a transversion mutation t112>g resulting in amino acid change Y38>D. In CDR2, all three mAbs contained a transition mutation c170>t resulting in amino acid change A57>V. In FR3, all three mAbs contained a transversion mutation g269>c resulting in amino acid change S90>T and a silent transition mutation g303>a.

MAb FL134.33 also contained a transversion mutation c26>a resulting in amino acid change A9>D in FR1; a silent transition mutation g153>a in FR2; a silent transition mutation c195>t in CDR2; transition mutations g250>a and g252>a resulting in amino acid change G84>R and a transversion mutation g301>c resulting in amino acid change V101>L in FR3.

MAb FL133.63 also contained a transversion mutation c14>g resulting in amino acid change T5>S in FR1; a transition mutation al 06>g resulting in amino acid change S36>G in CDR1 and a transversion mutation a256>t resulting in amino acid change D86>Y in FR3.

MAb FL133.67 also contained a transversion mutation c14>g resulting in amino acid change T5>S in FR1; a transversion mutation c200>a resulting in amino acid change S67>Y and a transversion mutation c276>g resulting in amino acid change N92>K.

Out of the three antibodies of which variable region sequences have been obtained, FL134.33 was the antibody of choice for chimerisation. To allow the cloning of both sequences of the antibody, primers had to be designed specifically for them and restriction enzyme sites had to be incorporated in them. The double expression vector contains restriction sites for the enzymes BamHI and BsiWI for the light chain, and enzymes HindIII and AfeI for the heavy chain. Primers variable region inserts must have also sites that after digestion generate overhangs compatible with those of the vector. In the case of FL134.33, however, a restriction site for the digestion with BamHI was not able to be added into the primer, since said site was also present in the internal sequence of the light chain. For that reason, an alternative digestion site that generates the overhangs compatible with those of BamHI was needed. The restriction enzyme with said characteristics was found to be BglII.

The primers designed and used to carry on with PCR amplification and subsequent cloning procedures were 5'-ATTAAGATCTAAGATGGTGTCCACTTCTCAGCTC-3' (SEQ ID NO: 1) for the light (K) chain forward including the BglII restriction site and 5'-AATTCGTACGTTTGAT-TTCCAGCTTGGTGCCT-3' (SEQ ID NO: 2) for the light (K) chain reverse including the BsiWI restriction site. Additionally, 5'-TAATAAGCTTAAGATGAGAGTGCTGAT-TCTTTTG-3' (SEQ ID NO: 3) was the primer for the heavy chain forward, including the HindIII restriction site and 5'-AGAGCAGCGCTGGAGACGGTGACTGAGGT-3' (SEQ ID NO: 4) for the heavy chain reverse including the AfeI restriction site. PCR reaction was set up with both forward and reverse primers and using a proof-reading polymerase. Amplification of both light and heavy chains was confirmed by the presence of products in agarose gel electrophoresis. The heavy and light chains were cloned into the TOPO vector and transformed into chemically competent cells supplemented with ampicillin for selective growth. Six colonies carrying the light chain and six carrying the heavy chain were selected to grow in liquid culture and plasmid DNA was prepared by miniprep. With the advantage that the internal restriction site of BamHI represents, enzymatic digestion could prove a confident way of knowing if the correct sequence was actually cloned into the vector. Enzymatic digestion was then carried out using EcoRI (two sites present at both 5' and 3' ends of the cloning site) and BamHI plus BsiWI (internal site in the middle of the sequence and primer-incorporated site respectively) and assessed by agarose gel electrophoresis. EcoRI digestion of the vector showed a sequence of the expected size (400 bp) in two colonies screened for the light chain and in three for the heavy chain. BamHI plus BsiWI showed a sequence of the expected size (200 bp) in two colonies screened for the light chain and in three for the heavy chain. After confirmation of correct cloning via sequencing, one colony of each heavy and light chain was selected and grown overnight in ampicillin supplemented media for posterior plasmid DNA preparation via maxiprep.

Although direct cloning of the PCR products into the double expression vector had previously shown to be relatively inefficient, it was still tried with the expectations of it working properly. After cloning of the PCR product of the light chain into the pDCOrig-hIgG1 vector, transformation was carried out and cells were cultured in zeocin supplemented media overnight. Plasmid DNA was prepared by miniprep, followed by enzymatic digestion of the plasmid with BamHI and BsiWI. Expectations were that if the correct heavy chain was incorporated into the vector, a small 200 bp band would appear on the gel (from the internal BamHI present in the sequence). If however the heavy chain was not incorporated and the original chain remained in the vector, then it would show a 400 bp band (the original sequence lacked an internal BamHI site). A small number of colonies presented the expected bad of the correct insert, and posterior sequence confirmed the successful direct cloning of the light chain into the vector. After this, one colony was selected and grown overnight in zeocin supplemented media for posterior plasmid DNA preparation via maxiprep.

By the time the light chain was confirmed to have been incorporated into the pDCOrig-hIgG1 vector, TOPO cloning of the heavy chain was also ready and the plasmid prepared. So, instead of attempting a direct cloning of the PCR product, the heavy chain was obtained via enzymatic digestion of the already prepared TOPO vector with enzymes HindIII and AfeI via agarose gel purification and extraction. After cloning of the gel-purified sequence of the heavy chain into the pDCOrig-hIgG1 vector containing the light chain, transformation was carried out and cells were cultured in zeocin supplemented media overnight. Plasmid DNA was prepared by miniprep, followed by enzymatic digestion with Hind III plus AfeI, and HindIII plus BamHI plus AfeI. Expectations were that with only two enzymes, the digestion would show a band at of about 400 bp, and with the three enzymes (since the heavy chain also contains a BamHI site around the middle of it) would show a band of about 200 bp. Colonies that presented the small 200 bp were sent for sequencing and after confirmation of correct cloning, one of them was selected and grown overnight in zeocin supplemented media for posterior plasmid DNA preparation via maxiprep. The yield of the plasmid preparation was determined by spectroscopy at 776 ng/µl. Once the sequence of both light and heavy chain of antibody FL134.33 was confirmed the plasmid was used to transfect CHO cells.

Once the sequence was confirmed to include the expected murine heavy and light variable regions coupled with the human constant regions, a transient transfection was performed. 15 µg of the vector containing the chimeric antibody CH134.33 was incubated with CHO-S cells in the presence of lipofectamine and cultured in suspension 500 ml of culture media for one week. The supernatant containing the mAb was purified on a Protein G column and eluted at pH 8. The final yield of the antibody was 0.4 mg.

Assays for Antibody Function

The mAbs tested in the assays were as follows: FL134.33, FL133.63, FL133.67 and Ch134.33 to make direct comparison between the murine version and the chimeric version, as well as between the three murine antibodies. All antibodies bound well to Fuc-GM1 (FIG. 20). The antibodies were also tested for binding against four cell lines DMS79, DMS53 (ATCC. Middlesex, UK), H128 and H69 (ECACC. Salisbury, UK) showing varying levels of Fuc-$G_{m1}$ expression. The positive control was the commercially available anti-Fuc-$G_{m1}$ (Fujirebio. Tokyo, Japan) and the negative control was a murine IgG1 isotype (Dako. Stockport, UK). The strongest signal was given by the positive control F12 in all cell lines except DMS79, where FL134.33 was shown to be stronger. The chimeric ch134.33 showed good binding to DMS79 cells (FIG. 21).

REFERENCES

Altschul, S. F., W. Gish, W. Miller, E. W. Myers, and D. J. Lipman. 1990. 'Basic local alignment search tool', *J Mol Biol*, 215: 403-10.

Altschul, S. F., T. L. Madden, A. A. Schaffer, J. Zhang, Z. Zhang, W. Miller, and D. J. Lipman. 1997. 'Gapped BLAST and PSI-BLAST: a new generation of protein database search programs', *Nucleic Acids Res*, 25: 3389-402.

Alvarez-Rueda, N., S. Leprieur, B. Clemenceau, S. Supiot, V. Sebille-Rivain, A. Faivre-Chauvet, F. Davodeau, F. Paris, J. Barbet, J. Aubry, and S. Birkle. 2007. 'Binding activities and antitumor properties of a new mouse/human chimeric antibody specific for GD2 ganglioside antigen', *Clin Cancer Res*, 13: 5613s-20s.

Ausubel, F M. 1992. *Short protocols in molecular biology* (John Wiley & Sons).

Azinovic, I., G. L. DeNardo, K. R. Lamborn, G. Mirick, D. Goldstein, B. M. Bradt, and S. J. DeNardo. 2006. 'Survival benefit associated with human anti-mouse antibody (HAMA) in patients with B-cell malignancies', *Cancer Immunol Immunother*, 55: 1451-8.

Barbas, C. F., 3rd, D. Hu, N. Dunlop, L. Sawyer, D. Cababa, R. M. Hendry, P. L. Nara, and D. R. Burton. 1994. 'In vitro evolution of a neutralizing human antibody to human immunodeficiency virus type 1 to enhance affinity and broaden strain cross-reactivity', *Proc Natl Acad Sci USA*, 91: 3809-13.

Bird, R. E., K. D. Hardman, J. W. Jacobson, S. Johnson, B. M. Kaufman, S. M. Lee, T. Lee, S. H. Pope, G. S. Riordan, and M. Whitlow. 1988. 'Single-chain antigen-binding proteins', *Science*, 242: 423-6.

Bodanzsky, M., and A. Bodanzsky. 1984. *The practice of peptide synthesis* (Springer Verlag: New York).

Brezicka, F. T., S. Oiling, B. Bergman, H. Berggren, C. P. Engstrom, J. Holmgren, S. Larsson, and L. Lindholm. 1991. 'Immunohistochemical detection of two small cell lung carcinoma-associated antigens defined by MAbs F12 and 123C3 in bronchoscopy biopsy tissues', *APMIS*, 99: 797-802.

Brezicka, F. T., S. Oiling, O. Nilsson, J. Bergh, J. Holmgren, S. Sorenson, F. Yngvason, and L. Lindholm. 1989. 'Immunohistological detection of fucosyl-GM1 ganglioside in human lung cancer and normal tissues with monoclonal antibodies', *Cancer Res*, 49: 1300-5.

Brezicka, T., B. Bergman, S. Oiling, and P. Fredman. 2000. 'Reactivity of monoclonal antibodies with ganglioside antigens in human small cell lung cancer tissues', *Lung Cancer*, 28: 29-36.

Chou, H. H., H. Takematsu, S. Diaz, J. Iber, E. Nickerson, K. L. Wright, E. A. Muchmore, D. L. Nelson, S. T. Warren, and A. Varki. 1998. 'A mutation in human CMP-sialic acid hydroxylase occurred after the Homo-Pan divergence', *Proc Natl Acad Sci USA,* 95: 11751-6.

D'Arcy, C. A., and M. Mannik. 2001. 'Serum sickness secondary to treatment with the murine-human chimeric antibody IDEC-C2B8 (rituximab)', *Arthritis Rheum,* 44: 1717-8.

Dickler, M. N., G. Ragupathi, N. X. Liu, C. Musselli, D. J. Martino, V. A. Miller, M. G. Kris, F. T. Brezicka, P. O. Livingston, and S. C. Grant. 1999. 'Immunogenicity of a fucosyl-GM1-keyhole limpet hemocyanin conjugate vaccine in patients with small cell lung cancer', *Clin Cancer Res,* 5: 2773-9.

Drivsholm, L., A. Vangsted, T. Pallesen, M. Hansen, P. Dombernowsky, F. Hirsch, and H. H. Hansen. 1994. 'Fucosyl-GM1 in small-cell lung cancer. A comparison with the tumour marker neuron-specific enolase', *Ann Oncol,* 5: 623-6.

Eppstein, D. A., Y. V. Marsh, M. van der Pas, P. L. Feigner, and A. B. Schreiber. 1985. 'Biological activity of liposome-encapsulated murine interferon gamma is mediated by a cell membrane receptor', *Proc Natl Acad Sci USA,* 82: 3688-92.

Feizi, T. 1985. 'Demonstration by monoclonal antibodies that carbohydrate structures of glycoproteins and glycolipids are onco-developmental antigens', *Nature,* 314: 53-7.

Fredman, P., T. Brezicka, J. Holmgren, L. Lindholm, O. Nilsson, and L. Svennerholm. 1986. 'Binding specificity of monoclonal antibodies to ganglioside, Fuc-GM1', *Biochim Biophys Acta,* 875: 316-23.

Gram, H., L. A. Marconi, C. F. Barbas, 3rd, T. A. Collet, R. A. Lerner, and A. S. Kang. 1992. 'In vitro selection and affinity maturation of antibodies from a naive combinatorial immunoglobulin library', *Proc Natl Acad Sci USA,* 89: 3576-80.

Hellstrom, I., H. J. Garrigues, U. Garrigues, and K. E. Hellstrom. 1990. 'Highly tumor-reactive, internalizing, mouse monoclonal antibodies to Le(y)-related cell surface antigens', *Cancer Res,* 50: 2183-90.

Holliger, P., T. Prospero, and G. Winter. 1993. '"Diabodies": small bivalent and bispecific antibody fragments', *Proc Natl Acad Sci USA,* 90: 6444-8.

Holliger, P., and G. Winter. 1993. 'Engineering bispecific antibodies', *Curr Opin Biotechnol,* 4: 446-9.

Houghton, A. N., D. Mintzer, C. Cordon-Cardo, S. Welt, B. Fliegel, S. Vadhan, E. Carswell, M. R. Melamed, H. F. Oettgen, and L. J. Old. 1985. 'Mouse monoclonal IgG3 antibody detecting GD3 ganglioside: a phase I trial in patients with malignant melanoma', *Proc Natl Acad Sci U S A,* 82: 1242-6.

Huston, J. S., D. Levinson, M. Mudgett-Hunter, M. S. Tai, J. Novotny, M. N. Margolies, R. J. Ridge, R. E. Bruccoleri, E. Haber, R. Crea, and et al. 1988. 'Protein engineering of antibody binding sites: recovery of specific activity in an anti-digoxin single-chain Fv analogue produced in *Escherichia coli*', *Proc Natl Acad Sci USA,* 85: 5879-83.

Hwang, K. J., K. F. Luk, and P. L. Beaumier. 1980. 'Hepatic uptake and degradation of unilamellar sphingomyelin/cholesterol liposomes: a kinetic study', *Proc Natl Acad Sci USA,* 77: 4030-4.

Irie, R. F., and D. L. Morton. 1986. 'Regression of cutaneous metastatic melanoma by intralesional injection with human monoclonal antibody to ganglioside GD2', *Proc Natl Acad Sci USA,* 83: 8694-8.

Jespers, L. S., A. Roberts, S. M. Mahler, G. Winter, and H. R. Hoogenboom. 1994. 'Guiding the selection of human antibodies from phage display repertoires to a single epitope of an antigen', *Biotechnology* (N Y), 12: 899-903.

Johnson, D. H. 1995. 'Future directions in the management of small cell lung cancer', *Lung Cancer,* 12 Suppl 3: S71-5.

Karlin, S., and S. F. Altschul. 1990. 'Methods for assessing the statistical significance of molecular sequence features by using general scoring schemes', *Proc Natl Acad Sci U S A,* 87: 2264-8. —. 1993. 'Applications and statistics for multiple high-scoring segments in molecular sequences', *Proc Natl Acad Sci U S A,* 90: 5873-7.

Kartal Yandim, M., E. Apohan, and Y. Baran. 2013. 'Therapeutic potential of targeting ceramide/glucosylceramide pathway in cancer', *Cancer Chem other Pharmacol,* 71: 13-20.

Krug, L. M., G. Ragupathi, C. Hood, M. G. Kris, V. A. Miller, J. R. Allen, S. J. Keding, S. J. Danishefsky, J. Gomez, L. Tyson, B. Pizzo, V. Baez, and P. O. Livingston. 2004. 'Vaccination of patients with small-cell lung cancer with synthetic fucosyl GM-1 conjugated to keyhole limpet hemocyanin', *Clin Cancer Res,* 10: 6094-100.

Lefranc, M. P., V. Giudicelli, C. Ginestoux, J. Jabado-Michaloud, G. Folch, F. Bellahcene, Y. Wu, E. Gemrot, X. Brochet, J. Lane, L. Regnier, F. Ehrenmann, G. Lefranc, and P. Duroux. 2009. 'IMGT, the international ImMunoGeneTics information system', *Nucleic Acids Res,* 37: D1006-12.

Livingston, P. O., G. Y. Wong, S. Adluri, Y. Tao, M. Padavan, R. Parente, C. Hanlon, M. J. Calves, F. Helling, G. Ritter, and et al. 1994. 'Improved survival in stage III melanoma patients with GM2 antibodies: a randomized trial of adjuvant vaccination with GM2 ganglioside', *J Clin Oncol,* 12: 1036-44.

Loo, D., N. Pryer, P. Young, T. Liang, S. Coberly, K. L. King, K. Kang, P. Roberts, M. Tsao, X. Xu, B. Potts, and J. P. Mather. 2007. 'The glycotope-specific RAV12 monoclonal antibody induces oncosis in vitro and has antitumor activity against gastrointestinal adenocarcinoma tumor xenografts in vivo', *Mol Cancer Ther,* 6: 856-65.

Marks, J. D., A. D. Griffiths, M. Malmqvist, T. P. Clackson, J. M. Bye, and G. Winter. 1992. 'By-passing immunization: building high affinity human antibodies by chain shuffling', *Biotechnology* (N Y), 10: 779-83.

Martin-Satue, M., R. Marrugat, J. A. Cancelas, and J. Blanco. 1998. 'Enhanced expression of alpha(1,3)-fucosyltransferase genes correlates with E-selectin-mediated adhesion and metastatic potential of human lung adenocarcinoma cells', *Cancer Res,* 58: 1544-50.

Miotti, S., D. R. Negri, O. Valota, M. Calabrese, R. L. Bolhuis, J. W. Gratama, M. I. Colnaghi, and S. Canevari. 1999. 'Level of anti-mouse-antibody response induced by bi-specific monoclonal antibody OC/TR in ovarian-carcinoma patients is associated with longer survival', *Int J Cancer,* 84: 62-8.

Myers, E. W., and W. Miller. 1989. 'Approximate matching of regular expressions', *Bull Math Biol,* 51: 5-37.

Nilsson, O, F. T. Brezicka, J. Holmgren, S. Sorenson, L. Svennerholm, F. Yngvason, and L. Lindholm. 1986. 'Detection of a ganglioside antigen associated with small cell lung carcinomas using monoclonal antibodies directed against fucosyl-GM1', *Cancer Res,* 46: 1403-7.

Nilsson, O, J-E. Månsson, T. Brezicka, J. Holmgren, L. Lindholm, S. Sorenson, F. Yngvason, and L. Svennerholm. 1984. 'Fucosyl-GM1—A Ganglioside Associated with Small Cell Lung Carcinomas', *Glycoconjugate,* 1: 43-9.

Pearson, W. R., and D. J. Lipman. 1988. 'Improved tools for biological sequence comparison', *Proc Natl Acad Sci USA*, 85: 2444-8.

Pluckthun, A. 1991. 'Antibody engineering: advances from the use of *Escherichia coli* expression systems', *Biotechnology* (N Y), 9: 545-51.

Reff, M. E. 1993. 'High-level production of recombinant immunoglobulins in mammalian cells', *Curr Opin Biotechnol*, 4: 573-6.

Remington, R P. 1980. *Remington's pharmaceutical sciences* (Mack Pub. Co.).

Sambrook, J. 1989. *Molecular cloning: A laboratory manual* (Cold Spring Harbor Laboratory Press).

Schier, R., A. McCall, G. P. Adams, K. W. Marshall, H. Merritt, M. Yim, R. S. Crawford, L. M. Weiner, C. Marks, and J. D. Marks. 1996. 'Isolation of picomolar affinity anti-c-erbB-2 single-chain Fv by molecular evolution of the complementarity determining regions in the center of the antibody binding site', *J Mol Biol*, 263: 551-67.

Schroff, R. W., K. A. Foon, S. M. Beatty, R. K. Oldham, and A. C. Morgan, Jr. 1985. 'Human anti-murine immunoglobulin responses in patients receiving monoclonal antibody therapy', *Cancer Res*, 45: 879-85.

Sidman, K. R., W. D. Steber, A. D. Schwope, and G. R. Schnaper. 1983. 'Controlled release of macromolecules and pharmaceuticals from synthetic polypeptides based on glutamic acid', *Biopolymers*, 22: 547-56.

Stemmer, W. P. 1994. 'Rapid evolution of a protein in vitro by DNA shuffling', *Nature*, 370: 389-91.

Stewart, J M., and J D. Young. 1984. *Solid phase peptide synthesis* (Pierce Chemical Company: Rockford, Illinois).

Tokuda, N., Q. Zhang, S. Yoshida, S. Kusunoki, T. Urano, K. Furukawa, and K. Furukawa. 2006. 'Genetic mechanisms for the synthesis of fucosyl GM1 in small cell lung cancer cell lines', *Glycobiology*, 16: 916-25.

Torelli, A., and C. A. Robotti. 1994. 'ADVANCE and ADAM: two algorithms for the analysis of global similarity between homologous informational sequences', *Comput Appl Biosci*, 10: 3-5.

Traunecker, A., A. Lanzavecchia, and K. Karjalainen. 1991. 'Bispecific single chain molecules (Janusins) target cytotoxic lymphocytes on HIV infected cells', *EMBO J*, 10: 3655-9.

Trill, J. J., A. R. Shatzman, and S. Ganguly. 1995. 'Production of monoclonal antibodies in COS and CHO cells', *Curr Opin Biotechnol*, 6: 553-60.

Vangsted, A., L. Drivsholm, E. Andersen, T. Pallesen, J. Zeuthen, and H. Wallin. 1994. 'New serum markers for small-cell lung cancer. I. The ganglioside fucosyl-GM1', *Cancer Detect Prev*, 18: 221-9.

Vangsted, A. J., H. Clausen, T. B. Kjeldsen, T. White, B. Sweeney, S. Hakomori, L. Drivsholm, and J. Zeuthen. 1991. 'Immunochemical detection of a small cell lung cancer-associated ganglioside (FucGM1) antigen in serum', *Cancer Res*, 51: 2879-84.

Ward, E. S., D. Gussow, A. D. Griffiths, P. T. Jones, and G. Winter. 1989. 'Binding activities of a repertoire of single immunoglobulin variable domains secreted from *Escherichia coli*', *Nature*, 341: 544-6.

Zhang, G., H. Zhang, Q. Wang, P. Lal, A. M. Carroll, M. de la Llera-Moya, X. Xu, and M. I. Greene. 2010. 'Suppression of human prostate tumor growth by a unique prostate-specific monoclonal antibody F77 targeting a glycolipid marker', *Proc Natl Acad Sci USA*, 107: 732-7.

Zhang, S., C. Cordon-Cardo, H. S. Zhang, V. E. Reuter, S. Adluri, W. B. Hamilton, K. O. Lloyd, and P. O. Livingston. 1997. 'Selection of tumor antigens as targets for immune attack using immunohistochemistry: I. Focus on gangliosides', *Int J Cancer*, 73: 42-9.

Zhong, L. T., A. Manzi, E. Skowronski, L. Notterpek, A. L. Fluharty, K. F. Faull, I. Masada, S. Rabizadeh, M. Varsanyi-Nagy, Y. Ruan, J. D. Oh, L. L. Butcher, and D. E. Bredesen. 2001. 'A monoclonal antibody that induces neuronal apoptosis binds a metastasis marker', *Cancer Res*, 61: 5741-8.

---

The invention claimed is:

1. An isolated antibody that binds specifically to Fucα1-2Galβ1-3GalNAcβ1-4 (Neu5Acα2-3) Galβ1-4Glc-ceramide (Fuc-GM1 glycolipid) but does not bind to Fucα1-2Galβ1-3GalNAcβ1-4 (Neu5Acα2-3) Galβ1-4Glc (free sugar), wherein the antibody comprises the following complementarity determining regions (CDRs):
   (a) CDRH1, CDRH2 and CDRH3 as set forth in SEQ ID NO: 21, SEQ ID NO: 22 and SEQ ID NO: 23, respectively, and CDRL1, CDRL2, and CDRL3 as set forth in SEQ ID NO: 25, SEQ ID NO: 26 and SEQ ID NO: 27, respectively;
   (b) CDRH1, CDRH2 and CDRH3 as set forth in SEQ ID NO: 21, SEQ ID NO: 22 and SEQ ID NO: 23, respectively, and CDRL1, CDRL2, and CDRL3 as set forth in SEQ ID NO: 28, SEQ ID NO: 26 and SEQ ID NO: 29, respectively or;
   (c) CDRH1, CDRH2 and CDRH3 as set forth in SEQ ID NO: 21, SEQ ID NO: 22 and SEQ ID NO: 24, and CDRL1, CDRL2, and CDRL3 as set forth in SEQ ID NO: 28, SEQ ID NO: 26 and SEQ ID NO: 27.

2. The antibody of claim 1, wherein the antibody comprises:
   (a) the amino acid sequence set forth in SEQ ID NO: 30 and the amino acid sequence set forth in SEQ ID NO: 11;
   (b) the amino acid sequence set forth in SEQ ID NO: 31 and the amino acid sequence set forth in SEQ ID NO: 13; or
   (3) the amino acid sequence set forth in SEQ ID NO: 32 and the amino acid sequence set forth in SEQ ID NO: 33.

3. The antibody of claim 1, wherein the CDRs are carried by a human antibody framework.

4. The antibody of claim 1, further comprising a human constant region.

5. The antibody of claim 4, wherein the antibody comprises the heavy chain amino acid sequence set forth in SEQ ID NO: 18 and the light chain amino acid sequence set forth in SEQ ID NO: 20.

6. The antibody of claim 1, wherein the antibody is attached to a chemotherapeutic or cytotoxic agent.

7. A pharmaceutical composition comprising the antibody of claim 1 and a pharmaceutically acceptable excipient, diluent, carrier, buffer or stabiliser.

8. A method for treating a tumor in a subject in need thereof comprising administering to the subject an effective amount of the antibody of claim 1.

9. The method of claim 8, wherein the tumour is small cell lung cancer.

10. A nucleic acid encoding the antibody of claim 1.

* * * * *

SEQUENCE LISTING

```
<160> NUMBER OF SEQ ID NOS: 43

<210> SEQ ID NO 1
<211> LENGTH: 34
<212> TYPE: DNA
<213> ORGANISM: Artificial Sequence
<220> FEATURE:
<223> OTHER INFORMATION: Synthetic construct

<400> SEQUENCE: 1
attaagatct aagatggtgt ccacttctca gctc                              34

<210> SEQ ID NO 2
<211> LENGTH: 32
<212> TYPE: DNA
<213> ORGANISM: Artificial Sequence
<220> FEATURE:
<223> OTHER INFORMATION: Synthetic construct

<400> SEQUENCE: 2
aattcgtacg tttgatttcc agcttggtgc ct                                32

<210> SEQ ID NO 3
<211> LENGTH: 34
<212> TYPE: DNA
<213> ORGANISM: Artificial Sequence
```

<220> FEATURE:
<223> OTHER INFORMATION: Synthetic construct

<400> SEQUENCE: 3
taataagctt aagatgagag tgctgattct tttg                                        34

<210> SEQ ID NO 4
<211> LENGTH: 29
<212> TYPE: DNA
<213> ORGANISM: Artificial Sequence
<220> FEATURE:
<223> OTHER INFORMATION: Synthetic construct

<400> SEQUENCE: 4
agagcagcgc tggagacggt gactgaggt                                              29

<210> SEQ ID NO 5
<211> LENGTH: 124
<212> TYPE: PRT
<213> ORGANISM: Mus musculus

<400> SEQUENCE: 5

Asp Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
            20                  25                  30

Tyr Ser Trp His Trp Ile Arg Gln Phe Pro Gly Asn Lys Leu Glu Trp
        35                  40                  45

Val Gly Tyr Ile His Tyr Arg Gly Asn Thr Asn Tyr Asn Pro Ser Leu
    50                  55                  60

Lys Ser Arg Ile Ser Ile Thr Arg Asp Thr Tyr Lys Asn Gln Leu Phe
65                  70                  75                  80

Leu Arg Leu Asn Ser Val Thr Thr Glu Asp Thr Ala Thr Tyr Tyr Cys
                85                  90                  95

Ala Gln Glu Pro Val Arg Asn Tyr Ala Met Asp Tyr Trp Gly Gln Gly
            100                 105                 110

Thr Ser Val Thr Val Ser Ser Ala Thr Thr Thr Ala
        115                 120

<210> SEQ ID NO 6
<211> LENGTH: 374
<212> TYPE: DNA
<213> ORGANISM: Mus musculus

<400> SEQUENCE: 6
gatgtgcagc ttcaggagtc aggacctgac ctggtgaaac cttctcagtc actttcactc          60
acctgcactg tcactggcta ctccatcacc agtggttata ctggcactg gatccggcag         120 tttccaggaa acaaactgga atgggtgggc tacatacact accgtggtaa cactaactac        180
aacccatctc tcaaaagtcg aatctcaatc actcgagaca catacaagaa ccagctcttc        240
ctgcggttga attctgtgac tactgaggac acagccacat attattgtgc acaagaacct        300
gtgaggaact atgctatgga ctactggggt caaggaacct cagtcaccgt ctcctcagct        360
acaacaacag cccc                                                           374

<210> SEQ ID NO 7
<211> LENGTH: 130
<212> TYPE: PRT
<213> ORGANISM: Mus musculus

<400> SEQUENCE: 7

Asp Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
            20                  25                  30

Tyr Ser Trp His Trp Ile Arg Gln Phe Pro Gly Asn Lys Leu Glu Trp
        35                  40                  45

Val Gly Tyr Ile His Tyr Arg Gly Asn Thr Asn Tyr Asn Pro Ser Leu
    50                  55                  60

Lys Ser Arg Ile Ser Ile Thr Arg Asp Thr Tyr Lys Asn Gln Phe Phe
65                  70                  75                  80

Leu Gln Leu Asn Ser Val Thr Glu Asp Thr Ala Thr Tyr Tyr Cys
                85                  90                  95

Ala Gln Glu Pro Val Arg Asn Tyr Ala Met Asp Tyr Trp Gly Gln Gly
            100                 105                 110

Thr Ser Val Thr Val Ser Ser Ala Thr Thr Thr Ala Pro Ser Ile Tyr
        115                 120                 125

Pro Leu
    130

<210> SEQ ID NO 8
<211> LENGTH: 390
<212> TYPE: DNA
<213> ORGANISM: Mus musculus

<400> SEQUENCE: 8
gatgtgcagc ttcaggagtc aggacctgac ctggtgaaac cttctcagtc actttcactc      60
acctgcactg tcactggcta ctccatcacc agtggttata gctggcactg gatccggcag     120
tttccaggaa acaaactgga atgggtgggc tacatacact accgtggtaa cactaactac     180
aacccatctc tcaaaagtcg aatctcaata ctcgagaca catacaagaa ccagttcttc     240
ctgcagttga attctgtgac tactgaggac acagccacat attattgtgc acaagaacct     300
gtgaggaact atgctatgga ctactggggt caaggaacct cagtcaccgt ctcctcagct     360
acaacaacag ccccatcaat ctatccactg                                      390

<210> SEQ ID NO 9
<211> LENGTH: 120
<212> TYPE: PRT
<213> ORGANISM: Mus musculus

<400> SEQUENCE: 9

Ala Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
            20                  25                  30

Tyr Ser Trp His Trp Ile Arg Gln Phe Pro Gly Asn Lys Leu Glu Trp
        35                  40                  45

Val Gly Tyr Ile His Tyr Arg Gly Asn Thr Asn Tyr Asn Pro Ser Leu
    50                  55                  60

Lys Ser Arg Val Ser Ile Thr Arg Asp Thr Tyr Lys Asn Gln Phe Phe
65                  70                  75                  80

Leu Gln Leu Asn Ser Leu Thr Thr Glu Asp Thr Ala Thr Tyr Tyr Cys
                85                  90                  95

Ala Gln Glu Pro Val Arg Asn Tyr Ala Met Asp Phe Trp Gly Gln Gly
            100                 105                 110

Thr Ser Val Thr Val Ser Ser Ala
        115                 120

<210> SEQ ID NO 10
<211> LENGTH: 360
<212> TYPE: DNA
<213> ORGANISM: Mus musculus

<400> SEQUENCE: 10
gctgtgcaac ttcaggagtc aggacctgac ctggtgaaac cttctcagtc actttcactc      60
acctgtactg tcactggcta ctccatcacc agtggttata ctggcactg gatccggcag     120 tttccaggaa acaaactgga atgggtgggc tacatacact accgtggtaa cactaattac     180
aacccatctc tcaaaagtcg agtctcaatc actcgagaca catacaagaa ccagttcttc     240
ctacagttaa attctctgac tactgaggac acagccacat attattgtgc acaagaacct     300
gtgaggaact atgctatgga cttttggggt caaggaacct cagtcaccgt ctccagcgct     360

<210> SEQ ID NO 11
<211> LENGTH: 103
<212> TYPE: PRT
<213> ORGANISM: Mus musculus

<400> SEQUENCE: 11

Asp Ile Val Met Ser Gln Ser Pro Ala Thr Leu Ser Val Thr Pro Gly
1               5                   10                  15

Asp Arg Val Ser Leu Ser Cys Arg Ala Ser Gln Ser Ile Gly Asp Asp
            20                  25                  30

Leu His Trp Tyr Gln Gln Lys Ser His Glu Ser Pro Arg Leu Leu Ile
        35                  40                  45

Lys Tyr Val Ser Gln Ser Ile Ser Gly Ile Pro Ser Arg Phe Ser Gly
    50                  55                  60

Ser Gly Ser Gly Ser Tyr Phe Thr Leu Thr Ile Asn Ser Val Glu Pro
65                  70                  75                  80

Glu Asp Val Gly Val Tyr Tyr Cys Gln Asn Gly His Gly Phe Pro Pro
                85                  90                  95

Thr Phe Gly Gly Gly Thr Lys
            100

<210> SEQ ID NO 12
<211> LENGTH: 309
<212> TYPE: DNA
<213> ORGANISM: Mus musculus

<400> SEQUENCE: 12
gacattgtga tgagtcagtc tccagccacc ctgtctgtga ctccaggaga tagagtctct      60
ctttcctgca gggccagcca gagtattggc gacgacttac actggtatca acaaaaatca     120
catgagtctc caaggcttct catcaaatat gtttcccaat ccatctctgg atcccctcc     180 aggttcagtg gcagtggatc aggtcatat ttcactctca ctatcaacag tgtggaacct     240
gaagatgttg gagtatatta ctgtcaaaat ggtcacggct ttcctccgac gttcggtgga     300
ggcaccaag                                                            309

<210> SEQ ID NO 13
<211> LENGTH: 103
<212> TYPE: PRT
<213> ORGANISM: Mus musculus

<400> SEQUENCE: 13

Asp Ile Val Met Ser Gln Ser Pro Ala Thr Leu Ser Val Thr Pro Gly
1               5                   10                  15

Asp Arg Val Ser Leu Ser Cys Arg Ala Ser Gln Ser Ile Ser Asp Asp
            20                  25                  30

Leu His Trp Tyr Gln Gln Lys Ser His Glu Ser Pro Arg Leu Leu Ile
        35                  40                  45

Lys Tyr Val Ser Gln Tyr Ile Ser Gly Ile Pro Ser Arg Phe Ser Gly
    50                  55                  60

Ser Gly Ser Gly Ser Asp Phe Thr Leu Thr Ile Lys Ser Val Glu Pro
65              70                  75                  80

Glu Asp Val Gly Val Tyr Tyr Cys Gln Asn Gly Tyr Ser Phe Pro Pro
                85                  90                  95

Thr Phe Gly Gly Gly Thr Lys
            100

<210> SEQ ID NO 14
<211> LENGTH: 309
<212> TYPE: DNA
<213> ORGANISM: Mus musculus

<400> SEQUENCE: 14

```
gacattgtga tgagtcagtc tccagccacc ctgtctgtga ctccaggaga tagagtctct    60
ctttcctgca gggccagcca gagtattagc gacgacttac actggtatca acaaaaatca   120
catgagtctc caaggcttct catcaaatat gtttcccaat acatctctgg atcccctcc    180
aggttcagtg gcagtggatc agggtcagat ttcactctca ctatcaagag tgtggaacct   240
gaagatgttg gagtatatta ctgtcaaaat ggttacagct tcctccgac gttcggtgga    300
ggcaccaag                                                           309
```

<210> SEQ ID NO 15
<211> LENGTH: 109
<212> TYPE: PRT
<213> ORGANISM: Mus musculus

<400> SEQUENCE: 15

Asp Ile Val Met Thr Gln Ser Pro Asp Thr Leu Ser Val Thr Pro Gly
1               5                   10                  15

Asp Arg Val Ser Leu Ser Cys Arg Ala Ser Gln Ser Ile Ser Asp Asp
            20                  25                  30

Leu His Trp Tyr Gln Gln Lys Ser His Glu Ser Pro Arg Leu Leu Ile
        35                  40                  45

Lys Tyr Val Ser Gln Ser Ile Ser Gly Ile Pro Ser Arg Phe Ser Gly
    50                  55                  60

Ser Gly Ser Arg Ser Asp Phe Thr Leu Thr Ile Asn Ser Val Glu Pro
65              70                  75                  80

Glu Asp Val Gly Leu Tyr Tyr Cys Gln Asn Gly His Gly Phe Pro Pro
                85                  90                  95

Thr Phe Gly Gly Gly Thr Lys Leu Glu Ile Lys Arg Thr
            100                 105

<210> SEQ ID NO 16
<211> LENGTH: 327
<212> TYPE: DNA
<213> ORGANISM: Mus musculus

<400> SEQUENCE: 16

| | |
|---|---|
| gacattgtga tgactcagtc tccagacacc ctgtctgtga ctccaggaga tagagtctct | 60 |
| ctttcctgca gggccagcca gagtattagc gacgacttac actggtatca acaaaaatca | 120 |
| catgagtctc caagacttct catcaaatat gtttctcaat ccatctctgg gatcccctcc | 180 |
| aggttcagtg gcagtggatc aagatcagat ttcactctca ctatcaacag tgtggaacct | 240 |
| gaagatgttg gactatatta ctgtcaaaat ggtcacggct ttcctccgac gttcggtgga | 300 |
| ggcaccaagc tggaaatcaa acgtacg | 327 |

<210> SEQ ID NO 17
<211> LENGTH: 1347
<212> TYPE: DNA
<213> ORGANISM: Artificial Sequence
<220> FEATURE:
<223> OTHER INFORMATION: Human/mouse chimeric sequence

<400> SEQUENCE: 17

| | |
|---|---|
| gctgtgcaac ttcaggagtc aggacctgac ctggtgaaac cttctcagtc actttcactc | 60 |
| acctgtactg tcactggcta ctccatcacc agtggttata ctggcactg gatccggcag | 120 |
| tttccaggaa acaaactgga atgggtgggc tacatacact accgtggtaa cactaattac | 180 |
| aacccatctc tcaaaagtcg agtctcaatc actcgagaca catacaagaa ccagttcttc | 240 |
| ctacagttaa attctctgac tactgaggac acagccacat attattgtgc aagaaacct | 300 |
| gtgaggaact atgctatgga cttttgggt caaggaacct cagtcaccgt ctccagcgct | 360 |
| tccaccaagg gcccatcggt cttccccctg gcaccctcct ccaagagcac ctctgggggc | 420 |
| acagcggccc tgggctgcct ggtcaaggac tacttccccg aaccggtgac ggtgtcgtgg | 480 |
| aactcaggcg ccctgaccag cggcgtgcac accttcccgg ctgtcctaca gtcctcagga | 540 |
| ctctactccc tcagcagcgt ggtgaccgtg ccctccagca gcttgggcac ccagacctac | 600 |
| atctgcaacg tgaatcacaa gcccagcaac accaaggtgg acaagaaagt tgagcccaaa | 660 |
| tcttgtgaca aaactcacac atgcccaccg tgcccagcac ctgaactcct ggggggaccg | 720 |
| tcagtcttcc tcttcccccc aaaacccaag gacaccctca tgatctcccg gacccctgag | 780 |
| gtcacatgcg tggtggtgga cgtgagccac gaagaccctg aggtcaagtt caactggtac | 840 |
| gtggacggcg tggaggtgca taatgccaag acaaagccgc gggaggagca gtacaacagc | 900 |
| acgtaccgtg tggtcagcgt cctcaccgtc ctgcaccagg actggctgaa tggcaaggag | 960 |
| tacaagtgca aggtctccaa caaagccctc ccagccccca tcgagaaaac catctccaaa | 1020 |
| gccaaagggc agccccgaga accacaggtg tacaccctgc ccccatcccg ggatgagctg | 1080 |
| accaagaacc aggtcagcct gacctgcctg gtcaaaggct tctatccag cgacatcgcc | 1140 |
| gtggagtggg agagcaatgg gcagccggag aacaactaca agaccacgcc tcccgtgctg | 1200 |
| gactccgacg gctccttctt cctctacagc aagctcaccg tggacaagag caggtggcag | 1260 |
| caggggaacg tcttctcatg ctccgtgatg catgaggctc tgcacaacca ctacacgcag | 1320 |
| aagagcctct ccctgtctcc gggtaaa | 1347 |

<210> SEQ ID NO 18
<211> LENGTH: 449
<212> TYPE: PRT
<213> ORGANISM: Artificial Sequence
<220> FEATURE:
<223> OTHER INFORMATION: Human/mouse chimeric sequence

<400> SEQUENCE: 18

-continued

```
Ala Val Gln Leu Gln Glu Ser Gly Pro Asp Leu Val Lys Pro Ser Gln
 1               5                  10                  15

Ser Leu Ser Leu Thr Cys Thr Val Thr Gly Tyr Ser Ile Thr Ser Gly
             20                  25                  30

Tyr Ser Trp His Trp Ile Arg Gln Phe Pro Gly Asn Lys Leu Glu Trp
         35                  40                  45

Val Gly Tyr Ile His Tyr Arg Gly Asn Thr Asn Tyr Asn Pro Ser Leu
     50                  55                  60

Lys Ser Arg Val Ser Ile Thr Arg Asp Thr Lys Asn Gln Phe Phe
 65                  70                  75                  80

Leu Gln Leu Asn Ser Leu Thr Thr Glu Asp Thr Ala Thr Tyr Tyr Cys
                 85                  90                  95

Ala Gln Glu Pro Val Arg Asn Tyr Ala Met Asp Phe Trp Gly Gln Gly
             100                 105                 110

Thr Ser Val Thr Val Ser Ser Ala Ser Thr Lys Gly Pro Ser Val Phe
             115                 120                 125

Pro Leu Ala Pro Ser Ser Lys Ser Thr Ser Gly Gly Thr Ala Ala Leu
130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                 165                 170                 175

Gln Ser Ser Gly Leu Tyr Ser Leu Ser Ser Val Val Thr Val Pro Ser
             180                 185                 190

Ser Ser Leu Gly Thr Gln Thr Tyr Ile Cys Asn Val Asn His Lys Pro
         195                 200                 205

Ser Asn Thr Lys Val Asp Lys Lys Val Glu Pro Lys Ser Cys Asp Lys
     210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                 245                 250                 255

Arg Thr Pro Glu Val Thr Cys Val Val Val Asp Val Ser His Glu Asp
             260                 265                 270

Pro Glu Val Lys Phe Asn Trp Tyr Val Asp Gly Val Glu Val His Asn
         275                 280                 285

Ala Lys Thr Lys Pro Arg Glu Glu Gln Tyr Asn Ser Thr Tyr Arg Val
     290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                 325                 330                 335

Thr Ile Ser Lys Ala Lys Gly Gln Pro Arg Glu Pro Gln Val Tyr Thr
             340                 345                 350

Leu Pro Pro Ser Arg Asp Glu Leu Thr Lys Asn Gln Val Ser Leu Thr
         355                 360                 365

Cys Leu Val Lys Gly Phe Tyr Pro Ser Asp Ile Ala Val Glu Trp Glu
     370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                 405                 410                 415

Ser Arg Trp Gln Gln Gly Asn Val Phe Ser Cys Ser Val Met His Glu
```

```
                  420             425             430
Ala Leu His Asn His Tyr Thr Gln Lys Ser Leu Ser Leu Ser Pro Gly
        435             440             445

Lys

<210> SEQ ID NO 19
<211> LENGTH: 642
<212> TYPE: DNA
<213> ORGANISM: Artificial Sequence
<220> FEATURE:
<223> OTHER INFORMATION: Human/mouse chimeric sequence

<400> SEQUENCE: 19
gacattgtga tgactcagtc tccagacacc ctgtctgtga ctccaggaga tagagtctct    60
ctttcctgca gggccagcca gagtattagc gacgacttac actggtatca acaaaaatca   120
catgagtctc caagacttct catcaaatat gtttctcaat ccatctctgg gatcccctcc   180
aggttcagtg gcagtggatc aagatcagat tcactctca ctatcaacag tgtggaacct    240
gaagatgttg gactatatta ctgtcaaaat ggtcacggct ttcctccgac gttcggtgga   300
ggcaccaagc tggaaatcaa acgtacggta gcggccccat ctgtcttcat cttcccgcca   360
tctgatgagc agttgaaatc tggaactgcc tctgttgtgt gcctgctgaa taacttctat   420
cccagagagg ccaaagtaca gtggaaggtg gataacgccc tccaatcggg taactcccag   480
gagagtgtca cagagcagga cagcaaggac agcacctaca gcctcagcag caccctgacg   540
ctgagcaaag cagactacga gaaacacaaa gtctacgcct gcgaagtcac ccatcagggc   600
ctgagctcgc ccgtcacaaa gagcttcaac aggggagagt gt                      642

<210> SEQ ID NO 20
<211> LENGTH: 214
<212> TYPE: PRT
<213> ORGANISM: Artificial Sequence
<220> FEATURE:
<223> OTHER INFORMATION: Human/mouse chimeric sequence

<400> SEQUENCE: 20

Asp Ile Val Met Thr Gln Ser Pro Asp Thr Leu Ser Val Thr Pro Gly
1               5                   10                  15

Asp Arg Val Ser Leu Ser Cys Arg Ala Ser Gln Ser Ile Ser Asp Asp
            20                  25                  30

Leu His Trp Tyr Gln Gln Lys Ser His Glu Ser Pro Arg Leu Leu Ile
        35                  40                  45

Lys Tyr Val Ser Gln Ser Ile Ser Gly Ile Pro Ser Arg Phe Ser Gly
    50                  55                  60

Ser Gly Ser Arg Ser Asp Phe Thr Leu Thr Ile Asn Ser Val Glu Pro
65                  70                  75                  80

Glu Asp Val Gly Leu Tyr Tyr Cys Gln Asn Gly His Gly Phe Pro Pro
                85                  90                  95

Thr Phe Gly Gly Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160
```

```
Glu Ser Val Thr Glu Gln Asp Ser Lys Asp Ser Thr Tyr Ser Leu Ser
                165                 170                 175
Ser Thr Leu Thr Leu Ser Lys Ala Asp Tyr Glu Lys His Lys Val Tyr
            180                 185                 190
Ala Cys Glu Val Thr His Gln Gly Leu Ser Ser Pro Val Thr Lys Ser
        195                 200                 205
Phe Asn Arg Gly Glu Cys
    210
```

<210> SEQ ID NO 21
<211> LENGTH: 9
<212> TYPE: PRT
<213> ORGANISM: Mus musculus

<400> SEQUENCE: 21

```
Gly Tyr Ser Ile Thr Ser Gly Tyr Ser
1               5
```

<210> SEQ ID NO 22
<211> LENGTH: 7
<212> TYPE: PRT
<213> ORGANISM: Mus musculus

<400> SEQUENCE: 22

```
Ile His Tyr Arg Gly Asn Thr
1               5
```

<210> SEQ ID NO 23
<211> LENGTH: 12
<212> TYPE: PRT
<213> ORGANISM: Mus musculus

<400> SEQUENCE: 23

```
Ala Gln Glu Pro Val Arg Asn Tyr Ala Met Asp Tyr
1               5                   10
```

<210> SEQ ID NO 24
<211> LENGTH: 12
<212> TYPE: PRT
<213> ORGANISM: Mus musculus

<400> SEQUENCE: 24

```
Ala Gln Glu Pro Val Arg Asn Tyr Ala Met Asp Phe
1               5                   10
```

<210> SEQ ID NO 25
<211> LENGTH: 6
<212> TYPE: PRT
<213> ORGANISM: Mus musculus

<400> SEQUENCE: 25

```
Gln Ser Ile Gly Asp Asp
1               5
```

<210> SEQ ID NO 26
<211> LENGTH: 3
<212> TYPE: PRT
<213> ORGANISM: Mus musculus

<400> SEQUENCE: 26

```
Tyr Val Ser
1
```

```
<210> SEQ ID NO 27
<211> LENGTH: 9
<212> TYPE: PRT
<213> ORGANISM: Mus musculus

<400> SEQUENCE: 27

Gln Asn Gly His Gly Phe Pro Pro Thr
1               5

<210> SEQ ID NO 28
<211> LENGTH: 6
<212> TYPE: PRT
<213> ORGANISM: Mus musculus

<400> SEQUENCE: 28

Gln Ser Ile Ser Asp Asp
1               5

<210> SEQ ID NO 29
<211> LENGTH: 9
<212> TYPE: PRT
<213> ORGANISM: Mus musculus

<400> SEQUENCE: 29

Gln Asn Gly Tyr Ser Phe Pro Pro Thr
1               5

<210> SEQ ID NO 30
<211> LENGTH: 119
<212> TYPE: PRT
<213> ORGANISM: Mus musculus

<400> SEQUENCE: 30

Asp Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
                20                  25                  30

Tyr Ser Trp His Trp Ile Arg Gln Phe Pro Gly Asn Lys Leu Glu Trp
            35                  40                  45

Val Gly Tyr Ile His Tyr Arg Gly Asn Thr Asn Tyr Asn Pro Ser Leu
    50                  55                  60

Lys Ser Arg Ile Ser Ile Thr Arg Asp Thr Tyr Lys Asn Gln Leu Phe
65                  70                  75                  80

Leu Arg Leu Asn Ser Val Thr Thr Glu Asp Thr Ala Thr Tyr Tyr Cys
                85                  90                  95

Ala Gln Glu Pro Val Arg Asn Tyr Ala Met Asp Tyr Trp Gly Gln Gly
                100                 105                 110

Thr Ser Val Thr Val Ser Ser
            115

<210> SEQ ID NO 31
<211> LENGTH: 119
<212> TYPE: PRT
<213> ORGANISM: Mus musculus

<400> SEQUENCE: 31

Asp Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
                20                  25                  30

Tyr Ser Trp His Trp Ile Arg Gln Phe Pro Gly Asn Lys Leu Glu Trp
```

```
                35                  40                  45
Val Gly Tyr Ile His Tyr Arg Gly Asn Thr Asn Tyr Asn Pro Ser Leu
        50                  55                  60

Lys Ser Arg Ile Ser Ile Thr Arg Asp Thr Tyr Lys Asn Gln Phe Phe
65                  70                  75                  80

Leu Gln Leu Asn Ser Val Thr Thr Glu Asp Thr Ala Thr Tyr Tyr Cys
                85                  90                  95

Ala Gln Glu Pro Val Arg Asn Tyr Ala Met Asp Tyr Trp Gly Gln Gly
            100                 105                 110

Thr Ser Val Thr Val Ser Ser
            115

<210> SEQ ID NO 32
<211> LENGTH: 119
<212> TYPE: PRT
<213> ORGANISM: Mus musculus

<400> SEQUENCE: 32

Ala Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
                20                  25                  30

Tyr Ser Trp His Trp Ile Arg Gln Phe Pro Gly Asn Lys Leu Glu Trp
            35                  40                  45

Val Gly Tyr Ile His Tyr Arg Gly Asn Thr Asn Tyr Asn Pro Ser Leu
        50                  55                  60

Lys Ser Arg Val Ser Ile Thr Arg Asp Thr Tyr Lys Asn Gln Phe Phe
65                  70                  75                  80

Leu Gln Leu Asn Ser Leu Thr Thr Glu Asp Thr Ala Thr Tyr Tyr Cys
                85                  90                  95

Ala Gln Glu Pro Val Arg Asn Tyr Ala Met Asp Phe Trp Gly Gln Gly
            100                 105                 110

Thr Ser Val Thr Val Ser Ser
            115

<210> SEQ ID NO 33
<211> LENGTH: 108
<212> TYPE: PRT
<213> ORGANISM: Mus musculus

<400> SEQUENCE: 33

Asp Ile Val Met Thr Gln Ser Pro Asp Thr Leu Ser Val Thr Pro Gly
1               5                   10                  15

Asp Arg Val Ser Leu Ser Cys Arg Ala Ser Gln Ser Ile Ser Asp Asp
                20                  25                  30

Leu His Trp Tyr Gln Gln Lys Ser His Glu Ser Pro Arg Leu Leu Ile
            35                  40                  45

Lys Tyr Val Ser Gln Ser Ile Ser Gly Ile Pro Ser Arg Phe Ser Gly
        50                  55                  60

Ser Gly Ser Arg Ser Asp Phe Thr Leu Thr Ile Asn Ser Val Glu Pro
65                  70                  75                  80

Glu Asp Val Gly Leu Tyr Tyr Cys Gln Asn Gly His Gly Phe Pro Pro
                85                  90                  95

Thr Phe Gly Gly Gly Thr Lys Leu Glu Ile Lys Arg
            100                 105
```

<210> SEQ ID NO 34
<211> LENGTH: 120
<212> TYPE: PRT
<213> ORGANISM: Mus musculus

<400> SEQUENCE: 34

Asp Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
            20                  25                  30

Tyr Ser Trp His Trp Ile Arg Gln Phe Pro Gly Asn Lys Leu Glu Trp
        35                  40                  45

Met Gly Tyr Ile His Tyr Ser Gly Ser Thr Asn Tyr Asn Pro Ser Leu
    50                  55                  60

Lys Ser Arg Ile Ser Ile Thr Arg Asp Thr Ser Lys Asn Gln Phe Phe
65                  70                  75                  80

Leu Gln Leu Asn Ser Val Thr Thr Glu Asp Thr Ala Thr Tyr Tyr Cys
                85                  90                  95

Ala Arg Glu Pro Val Arg Asn Tyr Ala Met Asp Phe Trp Gly Gln Gly
            100                 105                 110

Thr Ser Val Thr Val Ser Ser Ala
        115                 120

<210> SEQ ID NO 35
<211> LENGTH: 360
<212> TYPE: DNA
<213> ORGANISM: Mus musculus

<400> SEQUENCE: 35
gatgtgcagc ttcaggagtc aggacctgac ctggtgaaac cttctcagtc actttcactc       60
acctgcactg tcactggcta ctccatcacc agtggttata gctggcactg gatccggcag      120
tttccaggaa acaaactgga atggatgggc tacatacact acagtggtag cactaactac      180
aacccatctc tcaaaagtcg aatctctatc actcgagaca catccaagaa ccagttcttc      240
ctgcagttga attctgtgac tactgaggac acagccacat attactgtgc aagagaacct      300
gtgaggaact atgctatgga cttttggggt caaggaacct cagtcaccgt ctccagcgct      360

<210> SEQ ID NO 36
<211> LENGTH: 98
<212> TYPE: PRT
<213> ORGANISM: Mus musculus

<400> SEQUENCE: 36

Ala Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
            20                  25                  30

Tyr Ser Trp His Trp Ile Arg Gln Phe Pro Gly Asn Lys Leu Glu Trp
        35                  40                  45

Val Gly Tyr Ile His Tyr Arg Gly Asn Thr Asn Tyr Asn Pro Ser Leu
    50                  55                  60

Lys Ser Arg Val Ser Ile Thr Arg Asp Thr Tyr Lys Asn Gln Phe Phe
65                  70                  75                  80

Leu Gln Leu Asn Ser Leu Thr Thr Glu Asp Thr Ala Thr Tyr Tyr Cys
                85                  90                  95

Ala Gln

<210> SEQ ID NO 37
<211> LENGTH: 98
<212> TYPE: PRT
<213> ORGANISM: Mus musculus

<400> SEQUENCE: 37

Asp Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
            20                  25                  30

Tyr Ser Trp His Trp Ile Arg Gln Phe Pro Gly Asn Lys Leu Glu Trp
        35                  40                  45

Val Gly Tyr Ile His Tyr Arg Gly Asn Thr Asn Tyr Asn Pro Ser Leu
    50                  55                  60

Lys Ser Arg Ile Ser Ile Thr Arg Asp Thr Tyr Lys Asn Gln Leu Phe
65                  70                  75                  80

Leu Arg Leu Asn Ser Val Thr Thr Glu Asp Thr Ala Thr Tyr Tyr Cys
                85                  90                  95

Ala Gln

<210> SEQ ID NO 38
<211> LENGTH: 98
<212> TYPE: PRT
<213> ORGANISM: Mus musculus

<400> SEQUENCE: 38

Asp Val Gln Leu Gln Glu Ser Gly Pro Asp Leu Val Lys Pro Ser Gln
1               5                   10                  15

Ser Leu Ser Leu Thr Cys Thr Val Thr Gly Tyr Ser Ile Thr Ser Gly
            20                  25                  30

Tyr Ser Trp His Trp Ile Arg Gln Phe Pro Gly Asn Lys Leu Glu Trp
        35                  40                  45

Val Gly Tyr Ile His Tyr Arg Gly Asn Thr Asn Tyr Asn Pro Ser Leu
    50                  55                  60

Lys Ser Arg Ile Ser Ile Thr Arg Asp Thr Tyr Lys Asn Gln Phe Phe
65                  70                  75                  80

Leu Gln Leu Asn Ser Val Thr Thr Glu Asp Thr Ala Thr Tyr Tyr Cys
                85                  90                  95

Ala Gln

<210> SEQ ID NO 39
<211> LENGTH: 109
<212> TYPE: PRT
<213> ORGANISM: Mus musculus

<400> SEQUENCE: 39

Asp Ile Val Met Thr Gln Ser Pro Ala Thr Leu Ser Val Thr Pro Gly
1               5                   10                  15

Asp Arg Val Ser Leu Ser Cys Arg Ala Ser Gln Ser Ile Ser Asp Tyr
            20                  25                  30

Leu His Trp Tyr Gln Gln Lys Ser His Glu Ser Pro Arg Leu Leu Ile
        35                  40                  45

Lys Tyr Ala Ser Gln Ser Ile Ser Gly Ile Pro Ser Arg Phe Ser Gly
    50                  55                  60

Ser Gly Ser Gly Ser Asp Phe Thr Leu Ser Ile Asn Ser Val Glu Pro
65                  70                  75                  80

Glu Asp Val Gly Val Tyr Tyr Cys Gln Asn Gly His Ser Phe Pro Pro
                85                  90                  95

Thr Phe Gly Gly Gly Thr Lys Leu Glu Ile Lys Arg Thr
            100                 105

<210> SEQ ID NO 40
<211> LENGTH: 327
<212> TYPE: DNA
<213> ORGANISM: Mus musculus

<400> SEQUENCE: 40
gacattgtga tgactcagtc tccagacacc ctgtctgtga ctccaggaga tagagtctct     60
ctttcctgca gggccagcca gagtattagc gacgacttac actggtatca acaaaaatca    120
catgagtctc caagacttct catcaaatat gtttctcaat ccatctctgg gatcccctcc    180
aggttcagtg gcagtggatc aagatcagat ttcactctca ctatcaacag tgtggaacct    240
gaagatgttg gactatatta ctgtcaaaat ggtcacggct tcctccgac gttcggtgga     300 ggcaccaagc tggaaatcaa acgtacg                                         327

<210> SEQ ID NO 41
<211> LENGTH: 96
<212> TYPE: PRT
<213> ORGANISM: Mus musculus

<400> SEQUENCE: 41

Asp Ile Val Met Thr Gln Ser Pro Asp Thr Leu Ser Val Thr Pro Gly
1               5                   10                  15

Asp Arg Val Ser Leu Ser Cys Arg Ala Ser Gln Ser Ile Ser Asp Asp
            20                  25                  30

Leu His Trp Tyr Gln Gln Lys Ser His Glu Ser Pro Arg Leu Leu Ile
        35                  40                  45

Lys Tyr Val Ser Gln Ser Ile Ser Gly Ile Pro Ser Arg Phe Ser Gly
    50                  55                  60

Ser Gly Ser Arg Ser Asp Phe Thr Leu Thr Ile Asn Ser Val Glu Pro
65                  70                  75                  80

Glu Asp Val Gly Leu Tyr Tyr Cys Gln Asn Gly His Gly Phe Pro Pro
                85                  90                  95

<210> SEQ ID NO 42
<211> LENGTH: 96
<212> TYPE: PRT
<213> ORGANISM: Mus musculus

<400> SEQUENCE: 42

Asp Ile Val Met Ser Gln Ser Pro Ala Thr Leu Ser Val Thr Pro Gly
1               5                   10                  15

Asp Arg Val Ser Leu Ser Cys Arg Ala Ser Gln Ser Ile Gly Asp Asp
            20                  25                  30

Leu His Trp Tyr Gln Gln Lys Ser His Glu Ser Pro Arg Leu Leu Ile
        35                  40                  45

Lys Tyr Val Ser Gln Ser Ile Ser Gly Ile Pro Ser Arg Phe Ser Gly
    50                  55                  60

Ser Gly Ser Gly Ser Tyr Phe Thr Leu Thr Ile Asn Ser Val Glu Pro
65                  70                  75                  80

Glu Asp Val Gly Val Tyr Tyr Cys Gln Asn Gly His Gly Phe Pro Pro
                85                  90                  95

```
<210> SEQ ID NO 43
<211> LENGTH: 96
<212> TYPE: PRT
<213> ORGANISM: Mus musculus

<400> SEQUENCE: 43

Asp Ile Val Met Ser Gln Ser Pro Ala Thr Leu Ser Val Thr Pro Gly
1               5                   10                  15

Asp Arg Val Ser Leu Ser Cys Arg Ala Ser Gln Ser Ile Ser Asp Asp
            20                  25                  30

Leu His Trp Tyr Gln Gln Lys Ser His Glu Ser Pro Arg Leu Leu Ile
        35                  40                  45

Lys Tyr Val Ser Gln Tyr Ile Ser Gly Ile Pro Ser Arg Phe Ser Gly
    50                  55                  60

Ser Gly Ser Gly Ser Asp Phe Thr Leu Thr Ile Lys Ser Val Glu Pro
65                  70                  75                  80

Glu Asp Val Gly Val Tyr Tyr Cys Gln Asn Gly Tyr Ser Phe Pro Pro
                85                  90                  95
```